United States Patent
Chauhan et al.

(10) Patent No.: US 10,237,292 B2
(45) Date of Patent: *Mar. 19, 2019

(54) SELECTING NETWORK SECURITY INVESTIGATION TIMELINES BASED ON IDENTIFIERS

(71) Applicant: Splunk Inc., San Francisco, CA (US)

(72) Inventors: Vijay Chauhan, Burlingame, CA (US); Cary Noel, Pleasant Hill, CA (US); Wenhui Yu, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 320 days.

This patent is subject to a terminal disclaimer.

(21) Appl. No.: 15/143,566

(22) Filed: Apr. 30, 2016

(65) Prior Publication Data

US 2017/0034196 A1 Feb. 2, 2017

Related U.S. Application Data

(63) Continuation of application No. 14/815,983, filed on Aug. 1, 2015, now Pat. No. 9,363,149.

(51) Int. Cl.
*H04L 12/26* (2006.01)
*H04L 29/06* (2006.01)
(Continued)

(52) U.S. Cl.
CPC .... *H04L 63/1425* (2013.01); *G06F 17/30864* (2013.01); *G06F 21/552* (2013.01);
(Continued)

(58) Field of Classification Search
CPC . H04L 63/1425; H04L 63/1416; H04L 41/22; G06T 11/206; G06F 3/0482;
(Continued)

(56) References Cited

U.S. PATENT DOCUMENTS 6,137,470 A * 10/2000 Sundstrom .............. H04L 41/22
715/786
6,470,384 B1 10/2002 O'Brien et al.
(Continued)

OTHER PUBLICATIONS

United States Patent and Trademark Office, U.S. Appl. No. 14/815,983, Non-Final Office Action dated Dec. 7, 2015.
(Continued)

*Primary Examiner* — Shen Shiau
(74) *Attorney, Agent, or Firm* — Wong & Rees LLP; Kirk D. Wong

(57) ABSTRACT

Techniques and mechanisms are disclosed that enable network security analysts and other users to efficiently conduct network security investigations and to produce useful representations of investigation results. As used herein, a network security investigation generally refers to an analysis by an analyst (or team of analysts) of one or more detected network events that may pose internal and/or external threats to a computer network under management. A network security application provides various interfaces that enable users to create investigation timelines, where the investigation timelines display a collection of events related to a particular network security investigation. A network security application further provides functionality to monitor and log user interactions with the network security application, where particular logged user interactions may also be added to one or more investigation timelines.

29 Claims, 49 Drawing Sheets

(51) Int. Cl.
*H04L 12/24* (2006.01)
*G06F 17/30* (2006.01)
*G06F 21/55* (2013.01)
*G06F 21/57* (2013.01)
*G06F 21/62* (2013.01)

(52) U.S. Cl.
CPC ............ *G06F 21/577* (2013.01); *H04L 41/22* (2013.01); *H04L 43/045* (2013.01); *H04L 63/1408* (2013.01); *H04L 63/1416* (2013.01); *G06F 17/30551* (2013.01); *G06F 21/62* (2013.01)

(58) Field of Classification Search
CPC ............ G06F 3/04842; G06F 17/30864; G06F 3/0484; G06F 17/30551; G06F 17/30554; G06F 3/0481; G06F 17/30442; G06F 9/542
See application file for complete search history.

(56) References Cited

U.S. PATENT DOCUMENTS

| | | | |
|---|---|---|---|
| 6,906,709 B1* | 6/2005 | Larkin | H04L 63/1433 345/419 |
| 7,607,169 B1 | 10/2009 | Njemanze et al. | |
| 8,661,062 B1 | 2/2014 | Jamail et al. | |
| 8,806,361 B1 | 8/2014 | Noel et al. | |
| 8,954,450 B2 | 2/2015 | Trahan et al. | |
| 9,043,717 B2 | 5/2015 | Noel et al. | |
| 9,158,811 B1 | 10/2015 | Choudhary et al. | |
| 9,363,149 B1* | 6/2016 | Chauhan | H04L 41/22 |
| 9,516,052 B1* | 12/2016 | Chauhan | H04L 63/1425 |
| 9,848,008 B2* | 12/2017 | Chauhan | H04L 63/1425 |
| 2003/0154396 A1 | 8/2003 | Godwin et al. | |
| 2004/0250134 A1* | 12/2004 | Kohler, Jr. | H04L 63/1425 726/23 |
| 2005/0060562 A1 | 3/2005 | Bhattacharya et al. | |
| 2007/0234426 A1 | 10/2007 | Khanolkar et al. | |
| 2008/0040191 A1 | 2/2008 | Chakravarty et al. | |
| 2008/0294663 A1* | 11/2008 | Heinley | G06F 3/0481 |
| 2009/0199118 A1 | 8/2009 | Sabato et al. | |
| 2009/0287630 A1 | 11/2009 | Kaiser | |
| 2010/0229112 A1 | 9/2010 | Ergan et al. | |
| 2011/0119100 A1* | 5/2011 | Ruhl | G06F 17/3089 705/7.11 |
| 2011/0179017 A1 | 7/2011 | Meyers et al. | |
| 2012/0290972 A1 | 11/2012 | Yook et al. | |
| 2013/0227689 A1 | 8/2013 | Pietrowicz et al. | |
| 2013/0246925 A1 | 9/2013 | Ahuja et al. | |
| 2014/0082513 A1* | 3/2014 | Mills et al. | |
| 2014/0092095 A1* | 4/2014 | Higgins | G06T 11/206 345/440 |
| 2015/0128267 A1 | 5/2015 | Gupta et al. | |
| 2015/0293685 A1* | 10/2015 | Chen | G06F 3/04847 715/804 |
| 2015/0295778 A1 | 10/2015 | Hsiao et al. | |
| 2015/0295779 A1 | 10/2015 | Ching et al. | |
| 2015/0295780 A1 | 10/2015 | Hsiao et al. | |
| 2015/0295796 A1 | 10/2015 | Hsiao et al. | |
| 2015/0324581 A1* | 11/2015 | Singla | G06F 11/32 726/22 |
| 2017/0031565 A1* | 2/2017 | Chauhan | G06F 3/04842 |
| 2017/0048264 A1 | 2/2017 | Chauhan et al. | |
| 2017/0063920 A1 | 3/2017 | Thomas et al. | |
| 2018/0069887 A1 | 3/2018 | Chauhan et al. | |

OTHER PUBLICATIONS

United States Patent and Trademark Office, U.S. Appl. No. 14/815,984, Non-Final Office Action dated Feb. 16, 2016.
United States Patent and Trademark Office, U.S. Appl. No. 14/815,981, Non-Final Office Action dated Mar. 7, 2016.
United States Patent and Trademark Office, U.S. Appl. No. 14/815,983, Notice of Allowance dated Mar. 14, 2016.
United States Patent and Trademark Office, U.S. Appl. No. 14/815,984, Final Office Action dated Jun. 21, 2016.
United States Patent and Trademark Office, U.S. Appl. No. 14/815,981, Final Office Action dated Jul. 13, 2016.
United States Patent and Trademark Office, U.S. Appl. No. 14/815,984, Final Office Action dated Jan. 26, 2018.
United States Patent and Trademark Office, U.S. Appl. No. 15/339,952, Notice of Allowance dated Oct. 23, 2017.
United States Patent and Trademark Office, U.S. Appl. No. 14/815,984, Non-Final Office Action dated Sep. 26, 2016.
United States Patent and Trademark Office, U.S. Appl. No. 14/815,981, Notice of Allowance dated Sep. 27, 2016.
United States Patent and Trademark Office, U.S. Appl. No. 14/815,984, Final Office Action dated Feb. 7, 2017.
United States Patent and Trademark Office, U.S. Appl. No. 14/815,984, Advisory Action dated Apr. 4, 2017.
United States Patent and Trademark Office, U.S. Appl. No. 14/815,984, Non-Final Office Action dated Jun. 26, 2018.
United States Patent and Trademark Office, U.S. Appl. No. 15/799,906, Non-Final Office Action dated Jun. 22, 2018.
United States Patent and Trademark Office, U.S. Appl. No. 15/339,952, Non-Final Office Action dated Jul. 21, 2017.
United States Patent and Trademark Office, U.S. Appl. No. 14/815,984, Non-Final Office Action dated Jul. 28, 2017.

* cited by examiner

4002 Cause display of a graphical user interface including a plurality of interface elements representing a plurality of investigation timelines

4004 Receive a selection of a particular interface element of the plurality of interface elements, the particular interface element representing a particular investigation timeline

4006 In response to receiving the selection of the particular interface element, cause display of the particular investigation timeline

SELECTING NETWORK SECURITY INVESTIGATION TIMELINES BASED ON IDENTIFIERS

CROSS-REFERENCE TO RELATED APPLICATIONS

This application claims benefit under 35 U.S.C. § 120 as a Continuation of U.S. application Ser. No. 14/815,983, filed Aug. 1, 2015, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

Embodiments relate generally to computer network security, and, more specifically, to techniques for enabling network security analysts to efficiently identify, investigate, and report on incidents related to the security of a computer network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The vast majority of organizations today rely on computer networks for an increasingly wide variety of business operations. As the reliance on computer networks has grown, so too has the importance securing those networks against internal and external threats. To monitor and address such threats, organizations increasingly rely on security information and event management (SIEM) software and other applications to protect their networks.

A conventional network security application generally may provide a number of graphical user interfaces that present information about data generated by network devices and applications that comprise a particular computer network. Tasked with investigating one or more particular security incidents, a network security analyst typically may review and collect information from any number of the provided interfaces and other data sources over the course of an investigation. To gather and cross-reference the information collected from these disparate sources, analysts may often use a cumbersome assortment of third party applications (e.g., text editors, word processors, email clients, etc.), and even pen and paper, in an attempt to understand the nature of particular network security incidents. The result of using such applications to conduct security investigations often produces an inconsistent investigation report that is difficult to understand and share with others.

BRIEF DESCRIPTION OF THE DRAWINGS

In the drawings:

FIG. 6B illustrates a data summary dialog that enables a user to select various data sources in accordance with the disclosed embodiments;

FIG. 40 is a flow diagram that illustrates generation of an investigation management console display in accordance with the disclosed embodiments.

DETAILED DESCRIPTION

Figure 1:
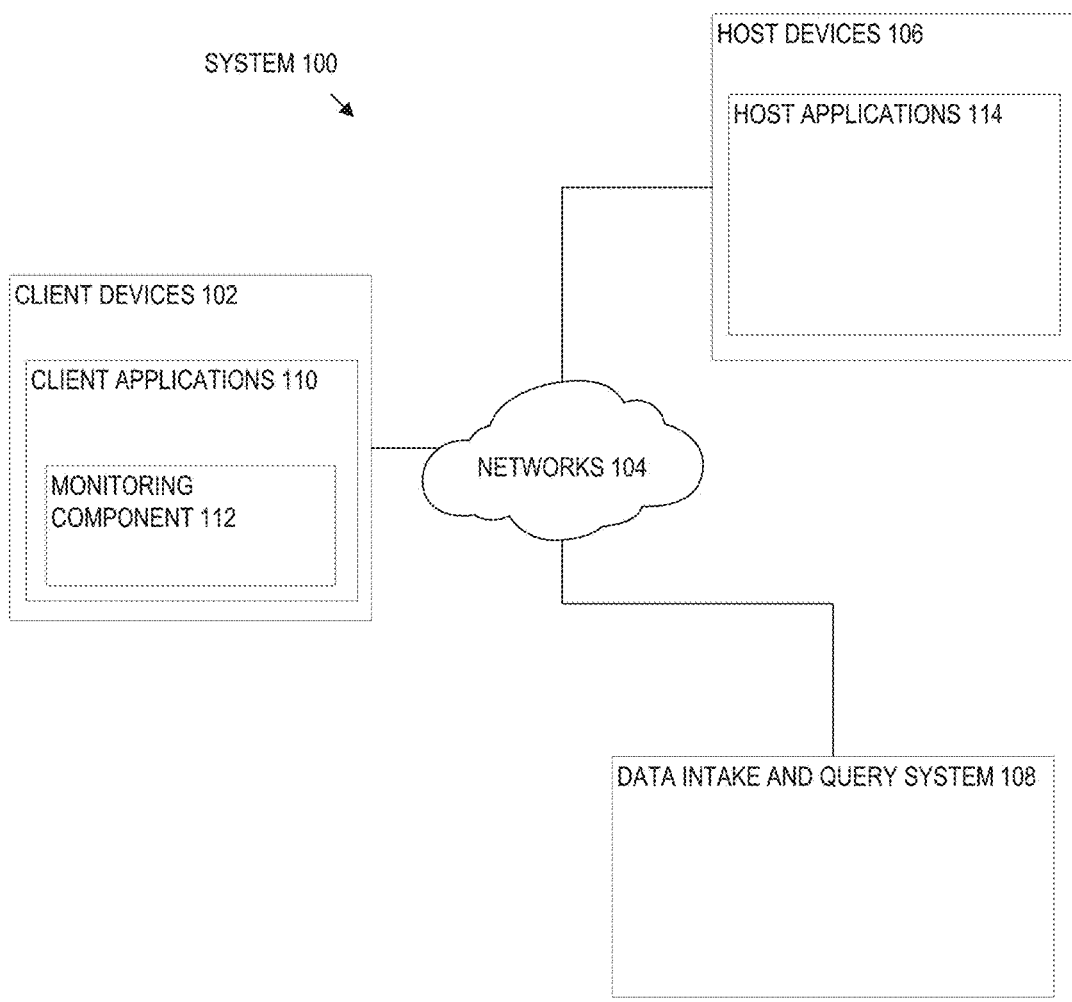
FIG. 1 illustrates a networked computer environment in which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7. Field Extraction
   2.8. Example Search Screen
   2.9. Data Modelling
   2.10. Acceleration Techniques
      2.10.1. Aggregation Technique
      2.10.2. Keyword Index
      2.10.3. High Performance Analytics Store
      2.10.4. Accelerating Report Generation
   2.11. Security Features
   2.12. Data Center Monitoring
   2.13. Cloud-Based System Overview
   2.14. Searching Externally Archived Data
      2.14.1. ERP Process Features
3.0. Functional Overview
   3.1. Investigation Workflow Logging
   3.2. Investigation Timelines
   3.3. Investigation Management
4.0. Implementation Examples
   4.1. Generating Investigation Timeline Views
   4.2. Generating Workflow Event Log Views
   4.3. Generating Management Console Views
5.0. Example Embodiments
6.0. Implementation Mechanism—Hardware Overview
7.0. Extensions and Alternatives 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. In general, machine-generated data can include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may, for example, enable an analyst to investigate different aspects of the machine data that previously were unavailable for analysis.

However, analyzing and searching massive quantities of machine data presents a number of challenges. For example, a data center, servers, or network appliances, may generate many different types and formats of machine data (e.g., system logs, network packet data (e.g., wire data, etc.), sensor data, application program data, error logs, stack traces, system performance data, etc.) from thousands of different components, which can collectively be very time-consuming to analyze. In another example, mobile devices may generate large amounts of information relating to data accesses, application performance, operating system performance, network performance, etc. The number of mobile devices that report these types of information can number in the millions. Also, the unstructured nature of much of this machine data can pose additional challenges because of the difficulty of applying semantic meaning to unstructured data, and the difficulty of indexing and querying unstructured data using traditional database systems.

These challenges can be addressed by using an event-based data intake and query system, such as the SPLUNK® ENTERPRISE system produced by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing unstructured data, which is commonly found in system log files, network data, and other data input sources. Although many of the techniques described herein are explained with reference to a data intake and query system similar to the SPLUNK® ENTERPRISE system, the techniques are also applicable to other types of data systems.

In the SPLUNK® ENTERPRISE system, machine-generated data is collected and stored as "events," where each event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, determined based on other configurable rules for assigning timestamps to events, etc.

Events can be derived from either "structured" or "unstructured" machine data. In general, structured data has a predefined format, where data items with specific data formats are stored at predefined locations in the data. For example, structured data may include data stored as fields in a database table. In contrast, unstructured data may not have a predefined format, that is, the data is not at fixed, predefined locations, but the data does have repeatable patterns and is not random. This means that unstructured data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, etc. The data generated by such data sources can include, for example and without limitation, server log files, activity log files, configuration files, messages, network packet data, performance measurements, sensor measurements, etc.

The SPLUNK® ENTERPRISE system also facilitates using a flexible schema to specify how to extract information from the event data, where the flexible schema may be developed and redefined as needed. Note that a flexible schema may be applied to event data "on the fly," when it is needed (e.g., at search time, index time, ingestion time, etc.). Because the schema is not applied to event data until it is needed (e.g., at search time, index time, ingestion time, etc.), it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store, and enables users to run queries against the stored data to, for example, retrieve events that meet criteria specified in a query, such as containing certain keywords or having specific values in defined fields. In this context, the term "field" refers to a location in the event data containing a value for a specific data item.

As noted above, the SPLUNK® ENTERPRISE system facilitates applying a late-binding schema to event data while performing queries on events. One aspect of a late-binding schema is "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data in order to identify where the associated field occurs in the event data by searching the event data for the sequence of characters defined in the regex rule.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or modifying the field extraction rules for use the next time the schema is used by the system. Because the SPLUNK® ENTERPRISE system maintains the underlying raw data and uses late-binding schemas for searching the raw data, it enables an analyst to investigate questions that arise as the analyst learns more about the events.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. FIG. 1 represents an example embodiment that is provided for purposes of illustrating a clear example; other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or internetworks using any of wired, wireless, terrestrial microwave, or satellite links, and may include the public Internet.

2.1. Host Devices

In an embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. For example, each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include various request and response packets. For example, in general, a client device 102 may initiate communication with a host application 114 by making a request for a specific resource (e.g., based on an HTTP request), and the application server may respond with the requested content stored in one or more response packets.

In an embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising database server may generate one or more logs that record information related to requests sent from other host applications 114 (e.g., web servers or application servers) for data managed by the database server.

2.2. Client Devices

Client devices 102 of FIG. 1 broadly represent any computing device capable of interacting with one or more host devices 106 via a network 104. Examples of client devices 102 may include, without limitation, smart phones, tablet computers, other handheld computers, wearable devices, laptop computers, desktop computers, servers, portable media players, gaming devices, and so forth. In general, a client device 102 can provide access to different content, for instance, content provided by one or more host devices 106. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser which a user may navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on to the application. Monitoring component 112 may also be a stand-alone process.

In one embodiment, a monitoring component 112 may be created when a client application 110 is developed, for example, by an application developer using a software development kit (SDK). The SDK may, for example, include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code such that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field in which a value is stored indicating a network latency measurement associated with one or more network requests, a "state" field to store a value indicating a state of a network connection, and so forth for any number of aspects of collected performance data.

2.4. Data Server System

Figure 2:
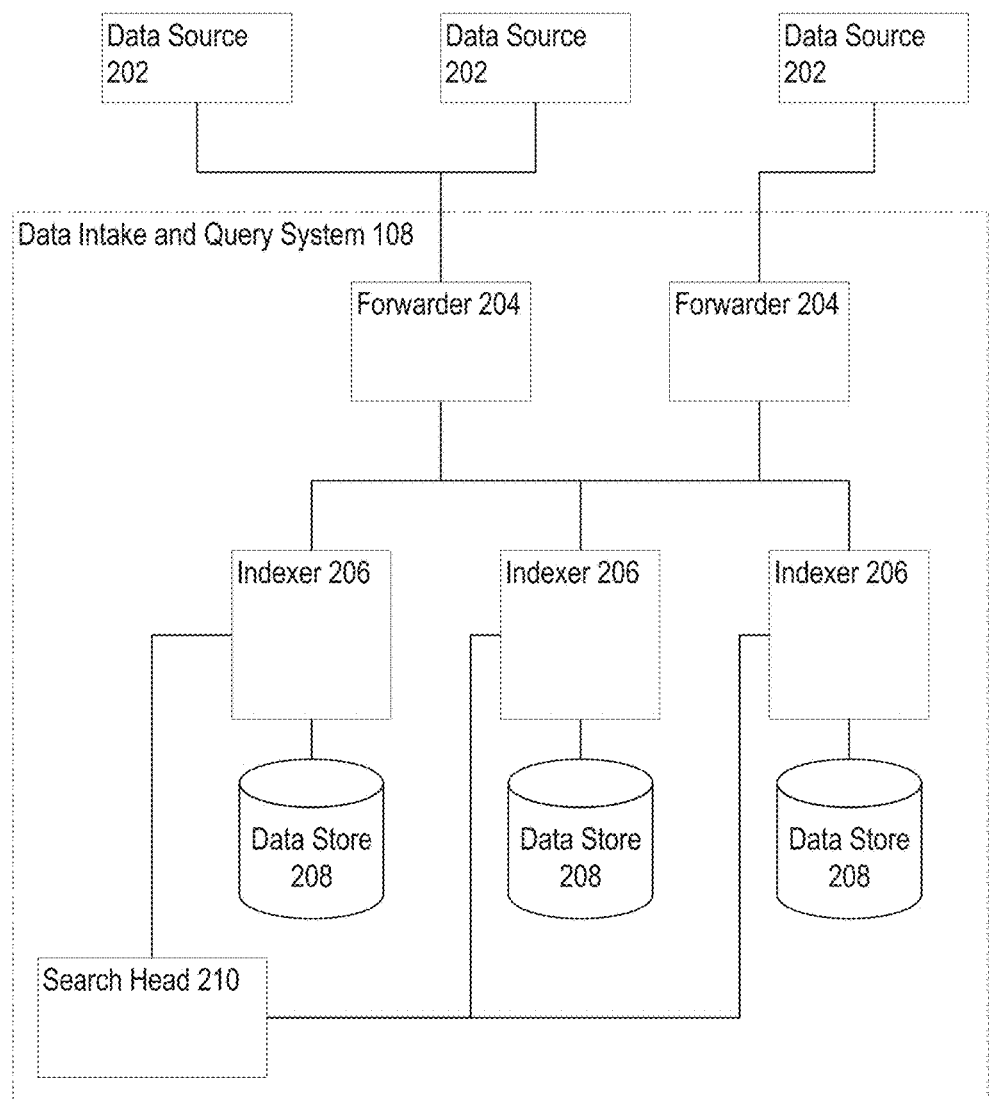
FIG. 2 illustrates a block diagram of an example data intake and query system in which an embodiment may be implemented.

FIG. 2 depicts a block diagram of an example data intake and query system 108, similar to the SPLUNK® ENTERPRISE system. System 108 includes one or more forwarders 204 that consume data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are herein described for an indexer. For example, a forwarder 204 may perform keyword extractions on raw data or parse raw data in to events and perform keyword extractions. A forwarder 204 may generate time stamps for events. Additionally or alternatively, a forwarder 204 may perform routing of events to indexers.

2.5. Data Ingestion

Figure 3:
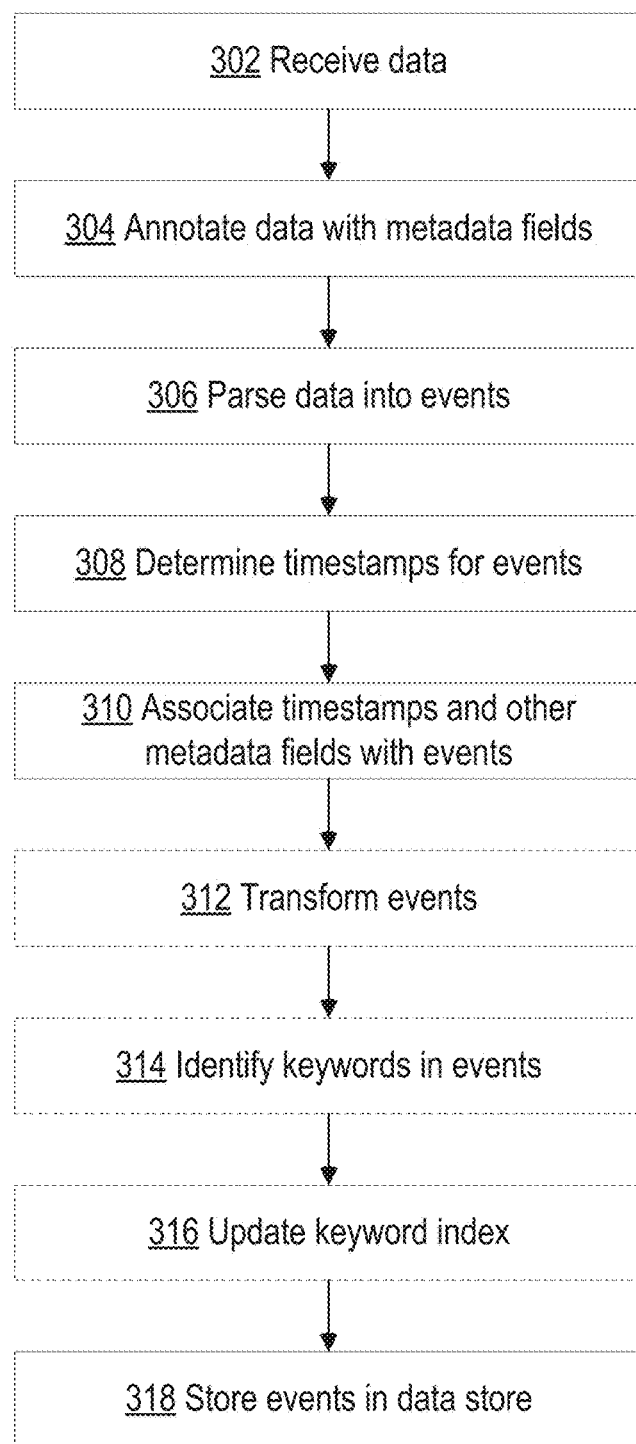
FIG. 3 is a flow diagram that illustrates how indexers process, index, and store data received from forwarders in accordance with the disclosed embodiments.

FIG. 3 depicts a flow chart illustrating an example data flow within a data intake and query system 108, in accordance with the disclosed embodiments. The data flow illustrated in FIG. 3 is provided for illustrative purposes only; one or more of the steps of the processes illustrated in FIG. 3 may be removed or the ordering of the steps may be changed. Furthermore, for the purposes of illustrating a clear example, one or more particular system components is described as performing various operations during each of the data flow stages. For example, a forwarder is described as receiving and processing data during an input phase, an indexer is described as parsing and indexing data during parsing and indexing phases, and a search head is described as performing a search query during a search phase. However, it is noted that other system arrangements and distributions of the processing steps across system components may be used.

2.5.1. Input

At block 302, a forwarder receives data from an input source. A forwarder, for example, initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks" or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field, for example, may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data if known, and possibly other values that provide information relevant to later processing steps. In an embodiment, a forwarder forwards the data to another system component for further processing, typically forwarding the annotated data blocks to an indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer what are the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data and apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or based on any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events in a data store, where a timestamp can be stored with each event to facilitate searching for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in faster memory to facilitate faster retrieval. For example, buckets containing the most recent events can be stored in flash memory instead of on hard disk.

Each indexer 206 may be responsible for storing and searching a subset of the events contained in a corresponding data store 208. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
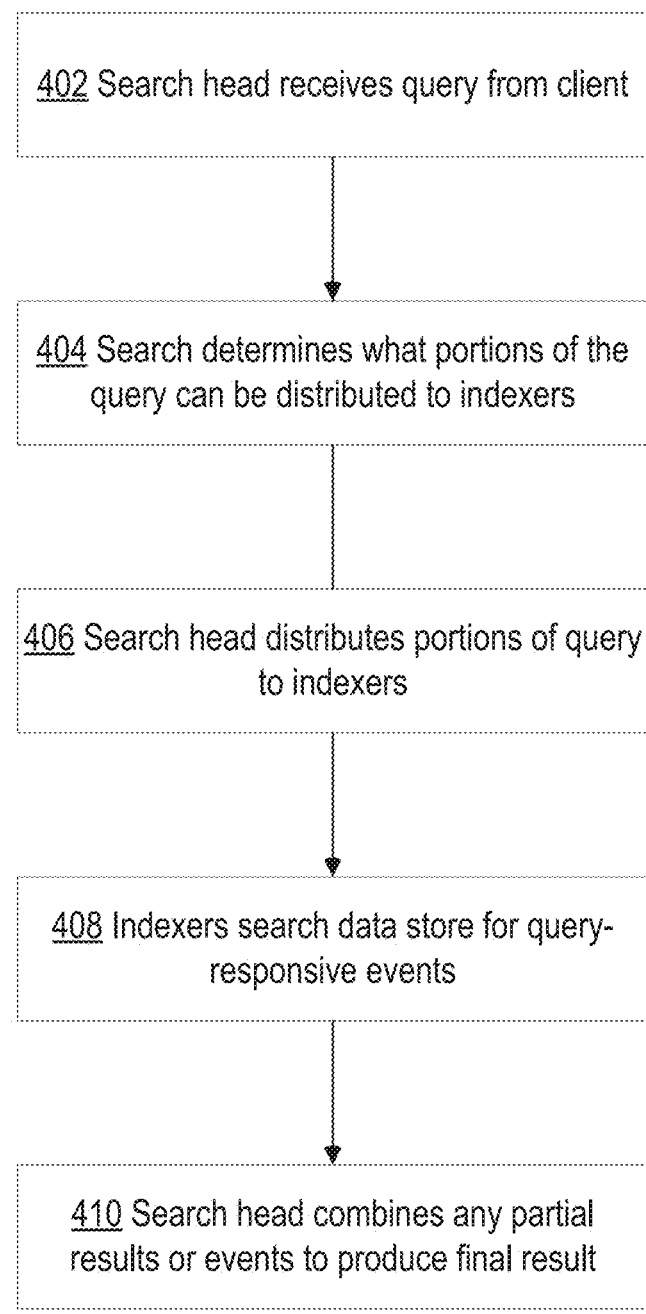
FIG. 4 is a flow diagram that illustrates how a search head and indexers perform a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portions can be delegated to indexers and what portions can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate artifacts, update configurations, fulfill search requests, etc. In an embodiment, the search head (or each search head) communicates with a master node that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers in order to discover the addresses of active indexers.

At block 408, the indexers to which the query was distributed search their data stores for events that are responsive to the query. To determine which events are responsive to the query, the indexer searches for events that match the criteria specified in the query. This criteria can include matching keywords or specific values for certain fields. In searches that use a late-binding schema, the searching operations at block 408 may involve using the late-binding schema to extract values for specified fields from events at the time the query is processed. In an embodiment, one or more rules for extracting field values may be specified as part of a source type definition. The indexers may then either send the relevant events back to the search head, or use the events to calculate a partial result, and send the partial result back to the search head.

At block 410, the search head combines the partial results and/or events received from the indexers to produce a result for the query. This result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources, it also allows users to search and visualize event data extracted from raw machine data received from heterogeneous data sources. The search head 210 includes various mechanisms for processing a query which may additionally reside in an indexer 206. A search query may expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "I" operates on the results produced by the first command, and so on for additional commands. A search query can also be expressed in other query languages, such as the Structured Query Language ("SQL") or any other query language.

In response to receiving the search query, search head 210 determines that it can use extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
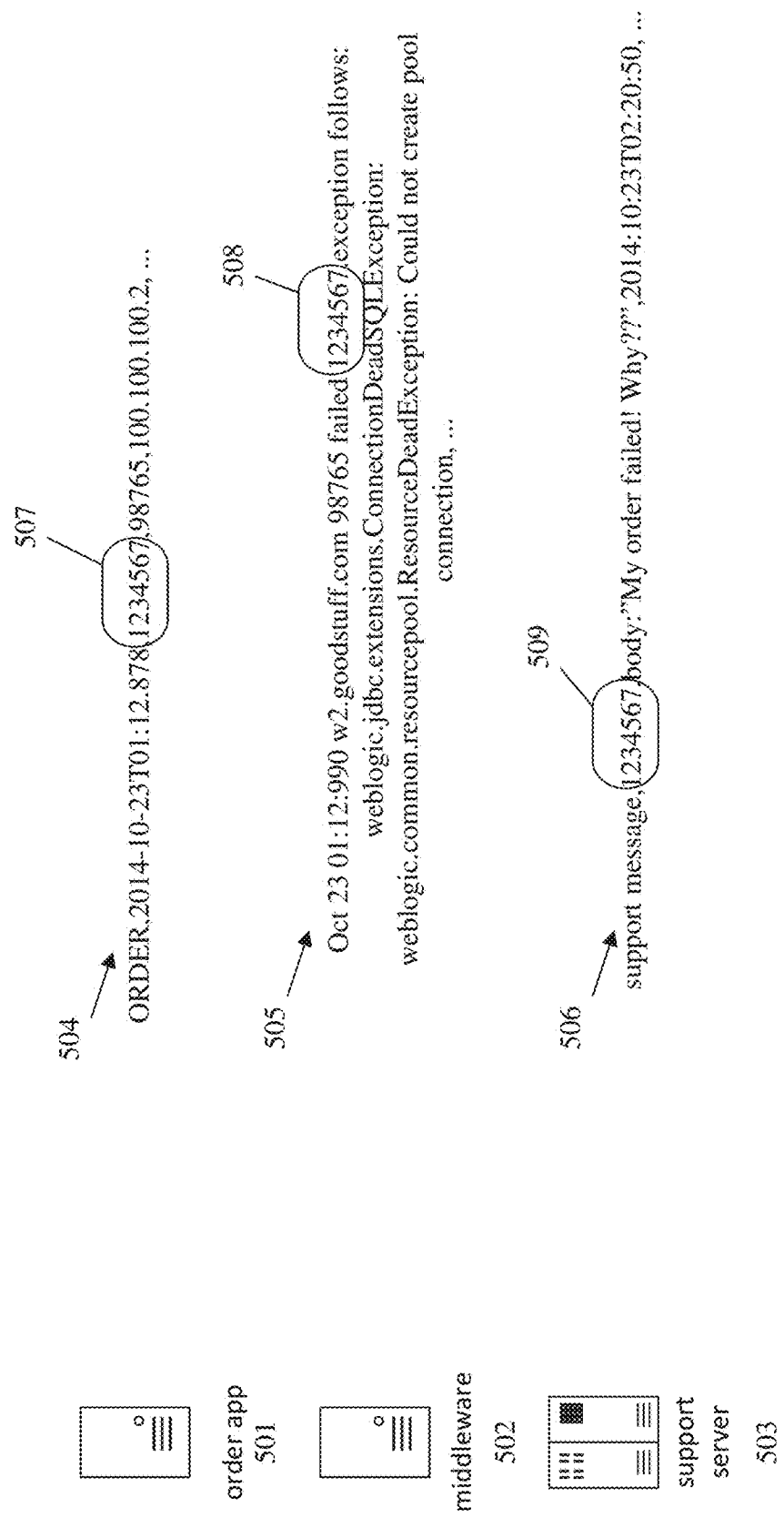
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. The order fails to be delivered to the vendor's server due to a resource exception at the destination server which is detected by the middleware code 502. The user then sends a message to customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems, the vendor, goodstuff.com, has the unique ability to obtain an insight into user activity, user experience, and system behavior. The search head 210 allows the vendor's administrator to search the log data from the three systems that are stored at the one or more indexers 206 to obtain correlated information and also a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 in order to gather relevant event data from the three systems. It then applies extraction rules to the event data in order to extract field values that it can correlate. The search head may apply a different extraction rule to each set of events from each system when the event data format differs between each system. In this example, the user interface can display, to the administrator, the event data corresponding to the common customer ID field values 507, 508, and 509. Thus, providing the administrator with an insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
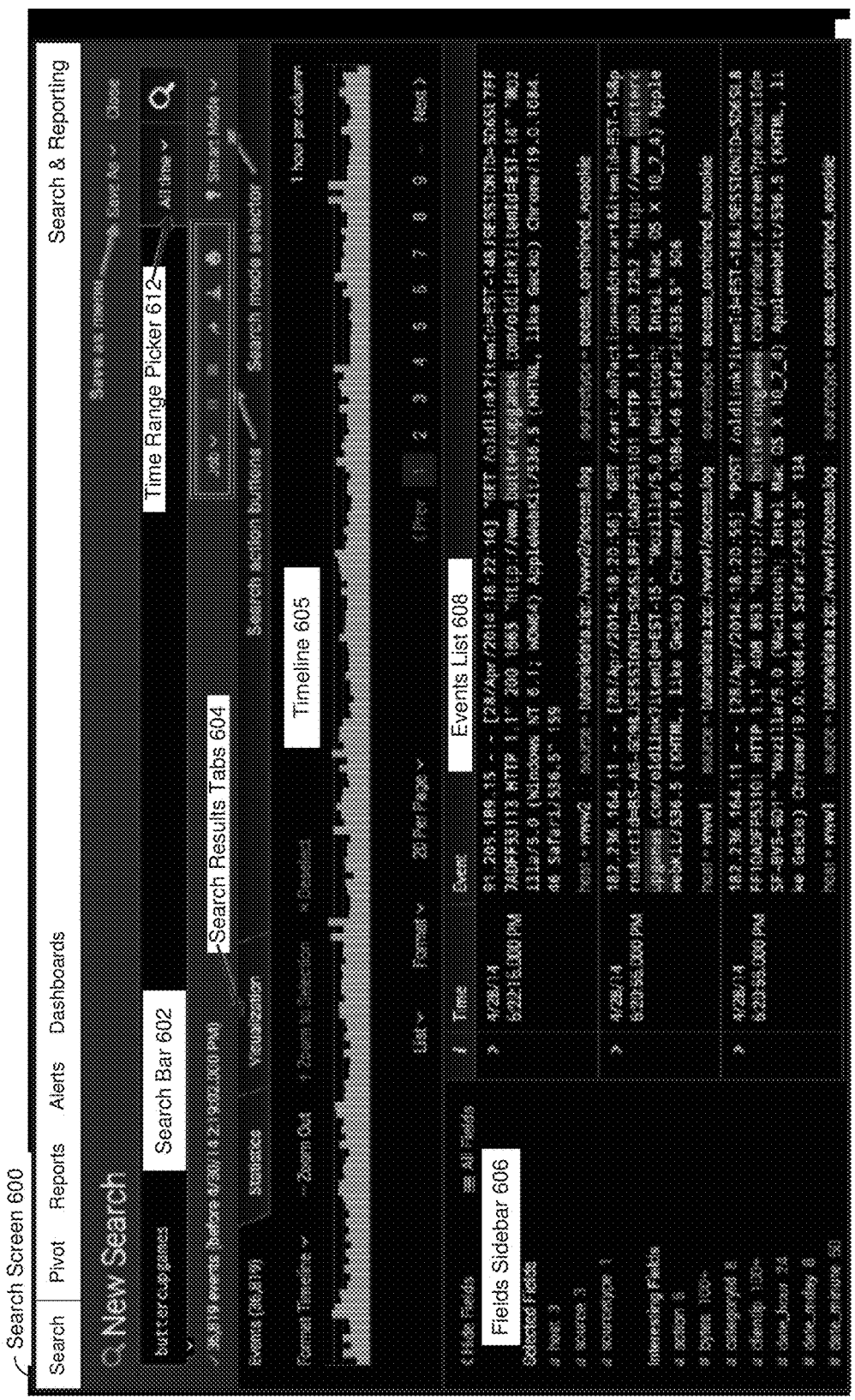
FIG. 6A illustrates a search screen in accordance with the disclosed embodiments.
Figure 6B:
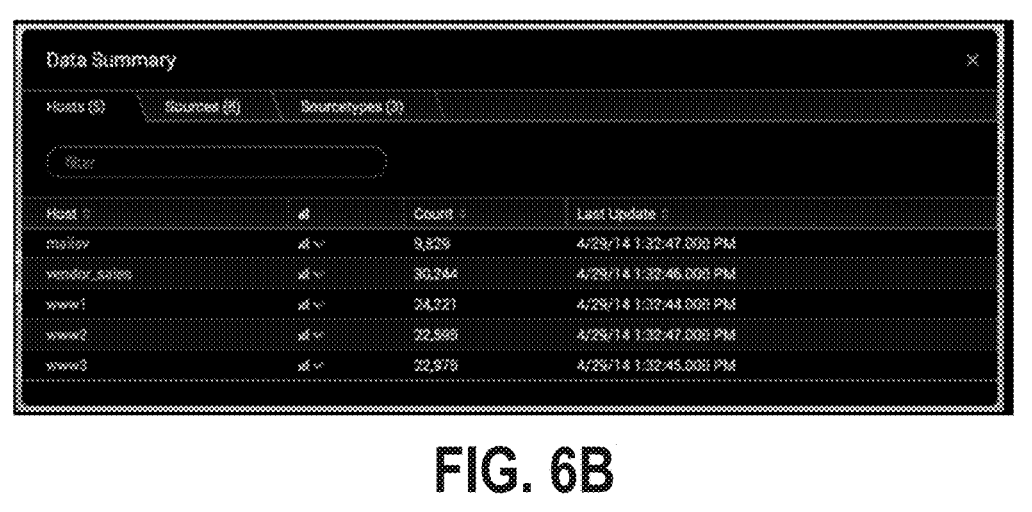

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Modelling

In an embodiment, the data intake and query system provides the user with the ability to produce reports (e.g., a table, chart, visualization, etc.) without having to enter SPL, SQL, or other query language terms into a search screen. Data modelling is used as the basis for the search feature. A data model may include one or more "objects" (or "data model objects") that define or otherwise correspond to a specific set of data. For example, a first data model object may define a broad set of data pertaining to e-mail activity generally, and another data model object may define specific datasets within the broad dataset, such as a subset of the e-mail data pertaining specifically to e-mails sent. Examples of data models can include, but are not limited to, electronic mail, authentication, databases, intrusion detection, malware, application state, alerts, compute inventory, network sessions, network traffic, performance, audits, updates, vulnerabilities, etc. Data models and their objects can be designed, for example, by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A data model may be defined by search criteria (e.g., a set of search constraints, late-binding schema extraction rules, etc.) and an associated set of fields. A data sub-model (e.g., a child of the parent data model) may be defined by a search (typically a narrower search) that produces a subset of the events that would be produced by the parent data model's search, and the sub-model's set of fields can include a subset of the set of fields of the parent data model and/or additional fields. Data model objects that reference the subsets can be arranged in a hierarchical manner, so that child subsets of events are proper subsets of their parents. A user iteratively applies a model development tool to prepare a query that defines a subset of events and assigns an object name to that subset. A child subset is created by further limiting a query that generates a parent subset. A late-binding schema of field extraction rules is associated with each object or subset in the data model. Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. No. 8,788,525, entitled "DATA MODEL FOR MACHINE DATA FOR SEMANTIC SEARCH", issued on Jul. 22, 2014, U.S. Pat. No. 8,788,526, entitled "DATA MODEL FOR MACHINE DATA FOR SEMANTIC SEARCH", issued on Jul. 22, 2014, and U.S. patent application Ser. No. 14/067,203, entitled "GENERATION OF A DATA MODEL FOR SEARCHING MACHINE DATA", filed on 30 Oct. 2013, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out.

Data models may be selected in a report generation interface. The report generator supports drag-and-drop organization of fields to be summarized in a report. When a model is selected, the fields with available extraction rules are made available for use in the report. A user selects some fields for organizing the report and others for providing detail according to the report organization. For example, region and salesperson fields may be organizing fields and sales data can be summarized (subtotaled and totaled) within this organization. Building reports using the report generation interface is further explained in U.S. patent application Ser. No. 14/503,335, entitled "GENERATING REPORTS FROM UNSTRUCTURED DATA", filed on Sep. 30, 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

The selection of a data model object for use in driving a report generation may be facilitated by a data model object selection interface. For example, an interactive data model selection graphical user interface of a report editor may display a listing of available data models, enabling a user to select one of the data models, display the data model objects associated with the data model selected, and enable a user to select one of the displayed data model objects for use in driving the report generation process.

Figure 7A:
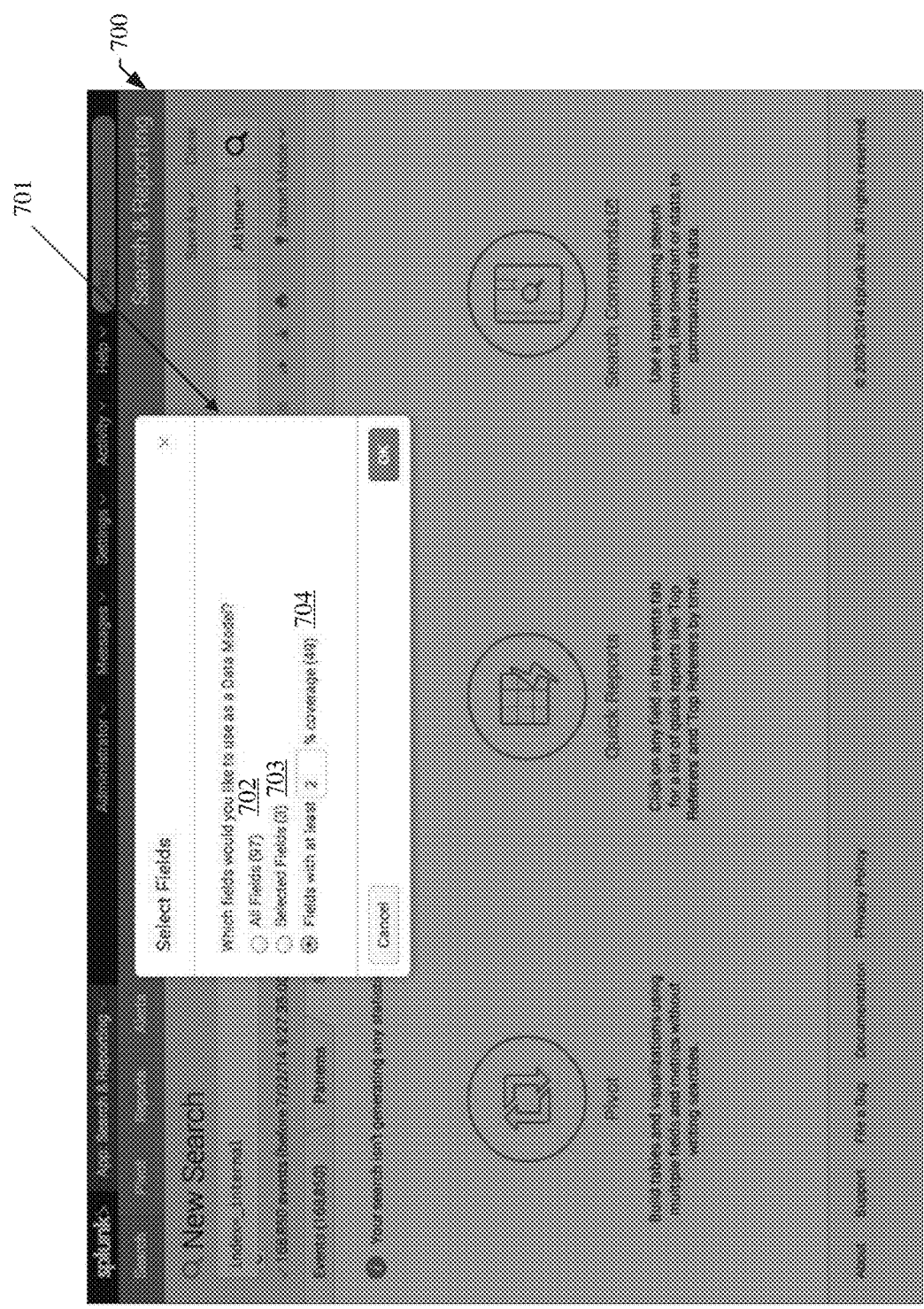
FIG. 7A-7D illustrate a series of user interface screens for an example data model driven report generation interface in accordance with the disclosed embodiments.

In FIG. 7A, once a data model object is selected by the user, a user interface screen 700 may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
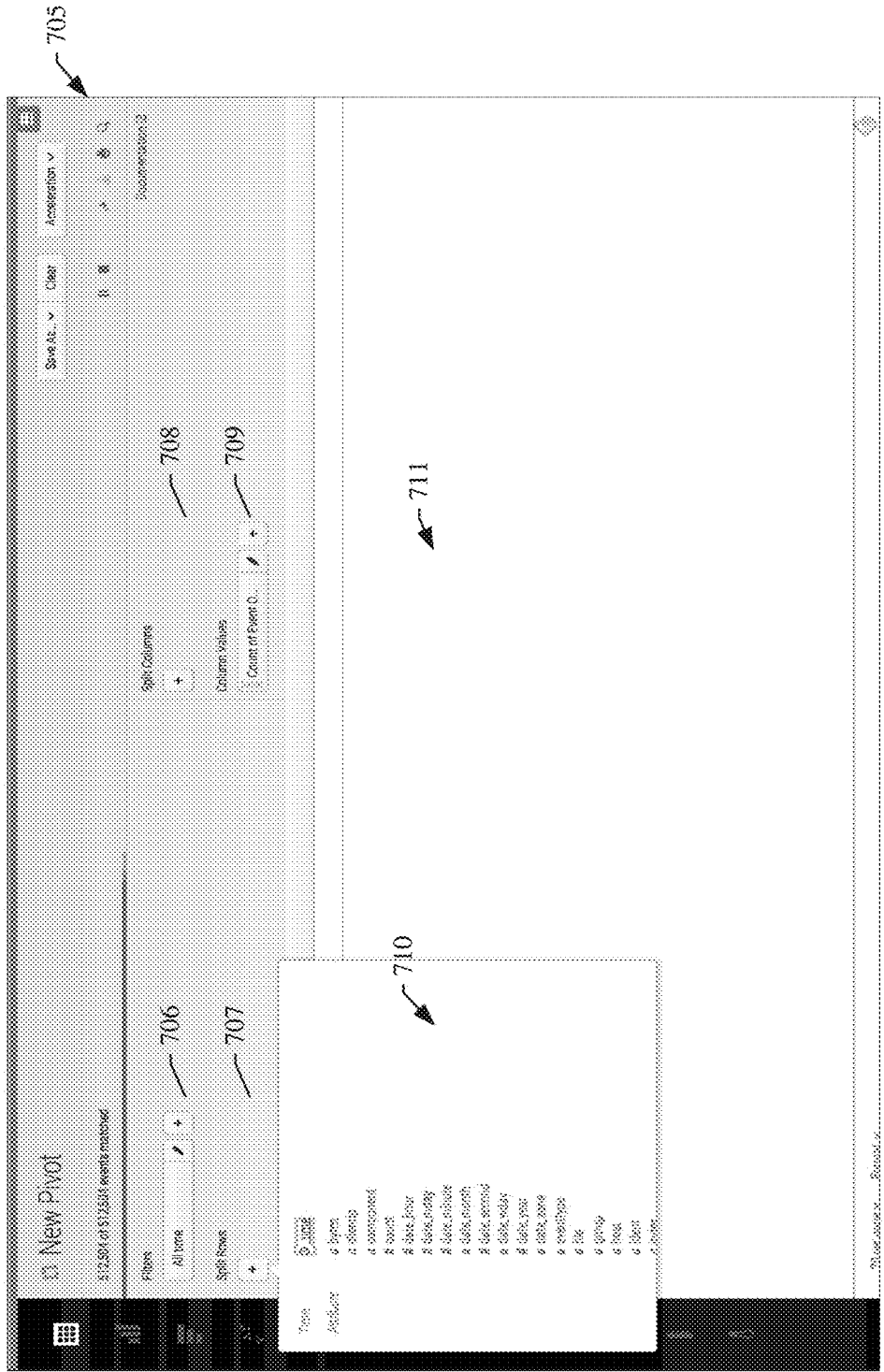
Figure 7C:
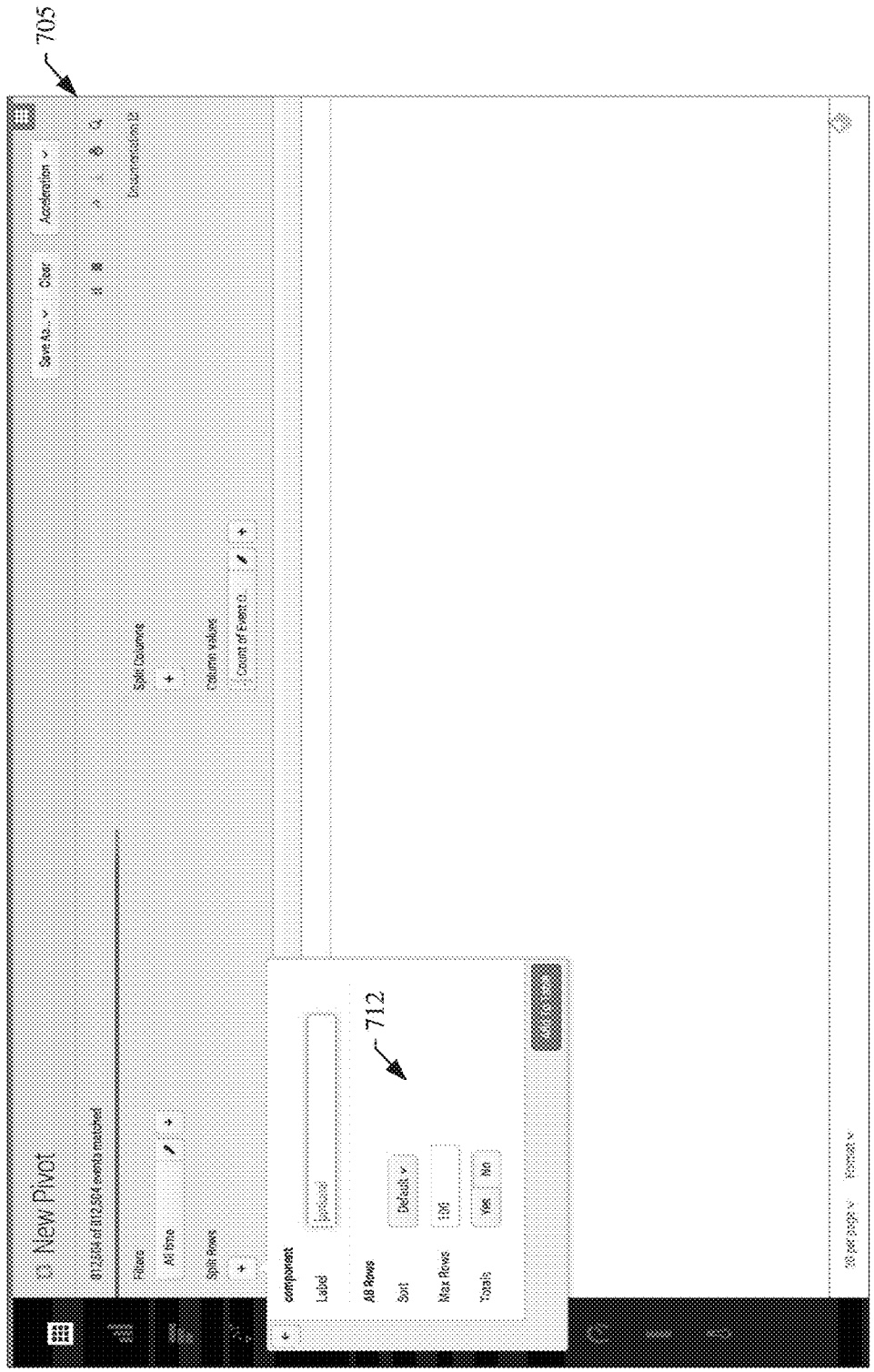

FIG. 7B illustrates a graphical user interface screen 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
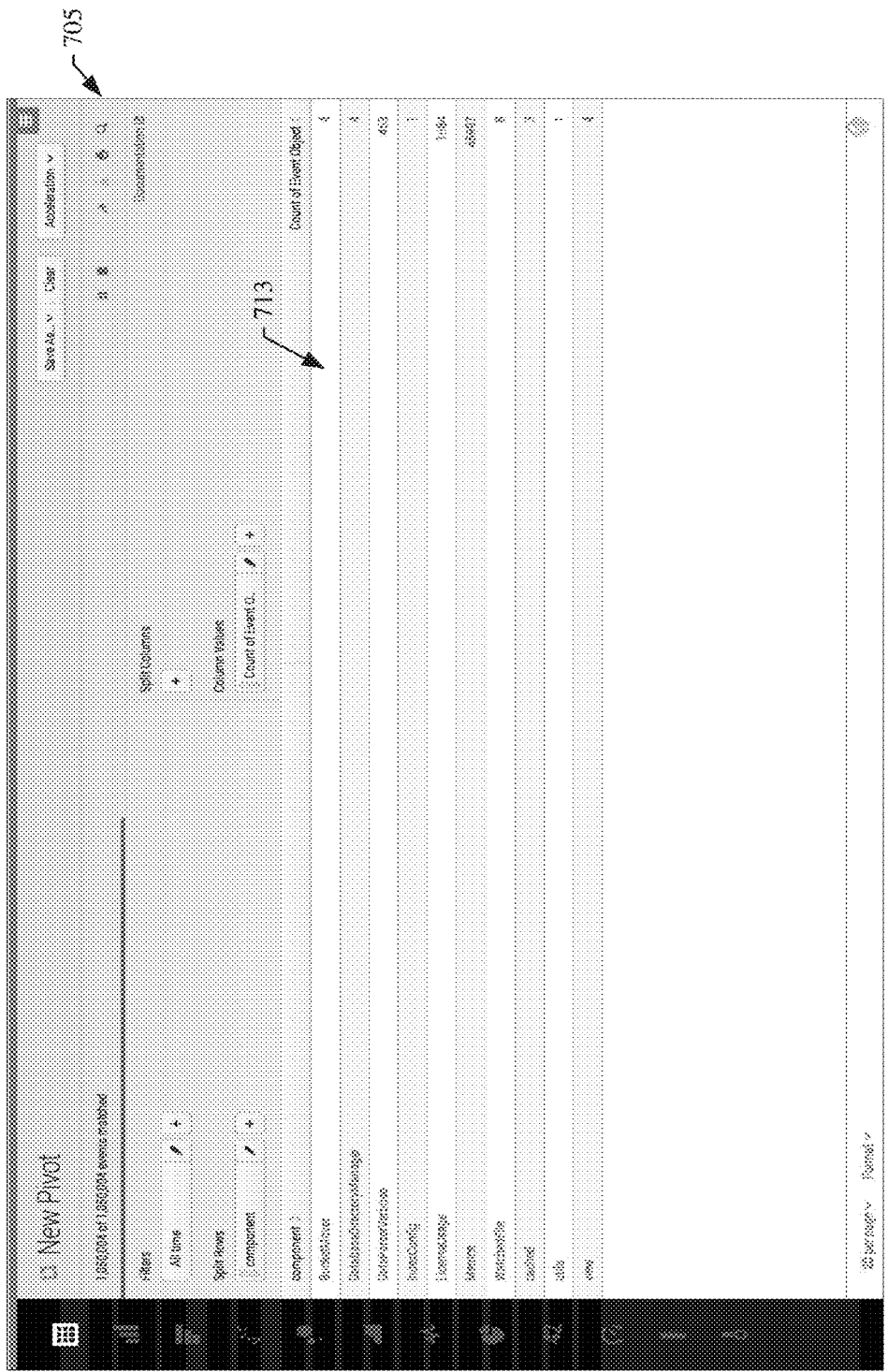

FIG. 7D illustrates an example graphical user interface screen 705 including a table of results 713 based on the selected criteria including splitting the rows by the "component" field.

2.10. Acceleration Technique

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause delays while processing the queries. Fortunately, a number of acceleration techniques have been developed to speed up analysis operations performed at search time. These techniques include: (1) performing search operations in parallel across multiple indexers; (2) using a keyword index; (3) using a high performance analytics store; and (4) accelerating the process of generating reports. These techniques are described in more detail below.

2.10.1. Aggregation Technique

Figure 8:
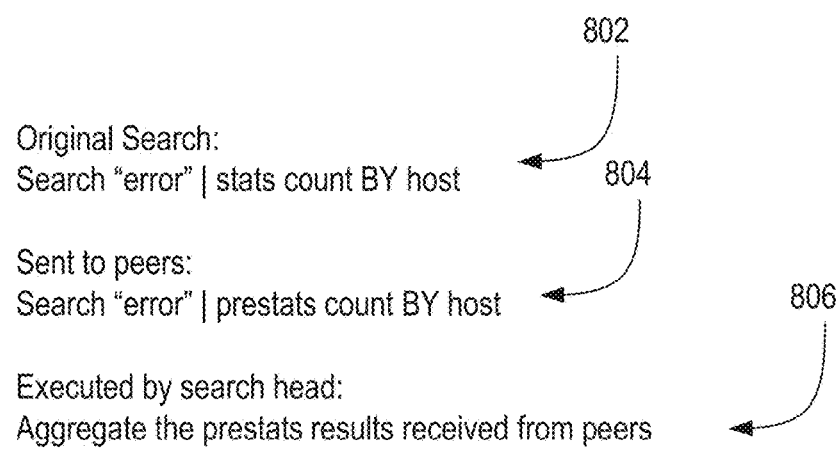
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. Note that by executing the computation in this way, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user or can be scheduled to occur automatically at specific time intervals. A periodic query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, entitled "DISTRIBUTED HIGH PERFORMANCE ANALYTICS STORE", issued on Mar. 25, 2014, and which is hereby incorporated by reference in its entirety for all purposes.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, and U.S. Pat. No. 8,412,696, entitled "REAL TIME SEARCHING AND REPORTING", issued on 2 Apr. 2011, each of which is hereby incorporated by reference in its entirety for all purposes.

2.11. Security Features

The SPLUNK® ENTERPRISE platform provides various schemas, dashboards and visualizations that make it easy for developers to create applications to provide additional capabilities. One such application is the SPLUNK APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. No. 13/956,252, and Ser. No. 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed Jul. 31, 2013, and which is hereby incorporated by reference in its entirety for all purposes.

Figure 9B:
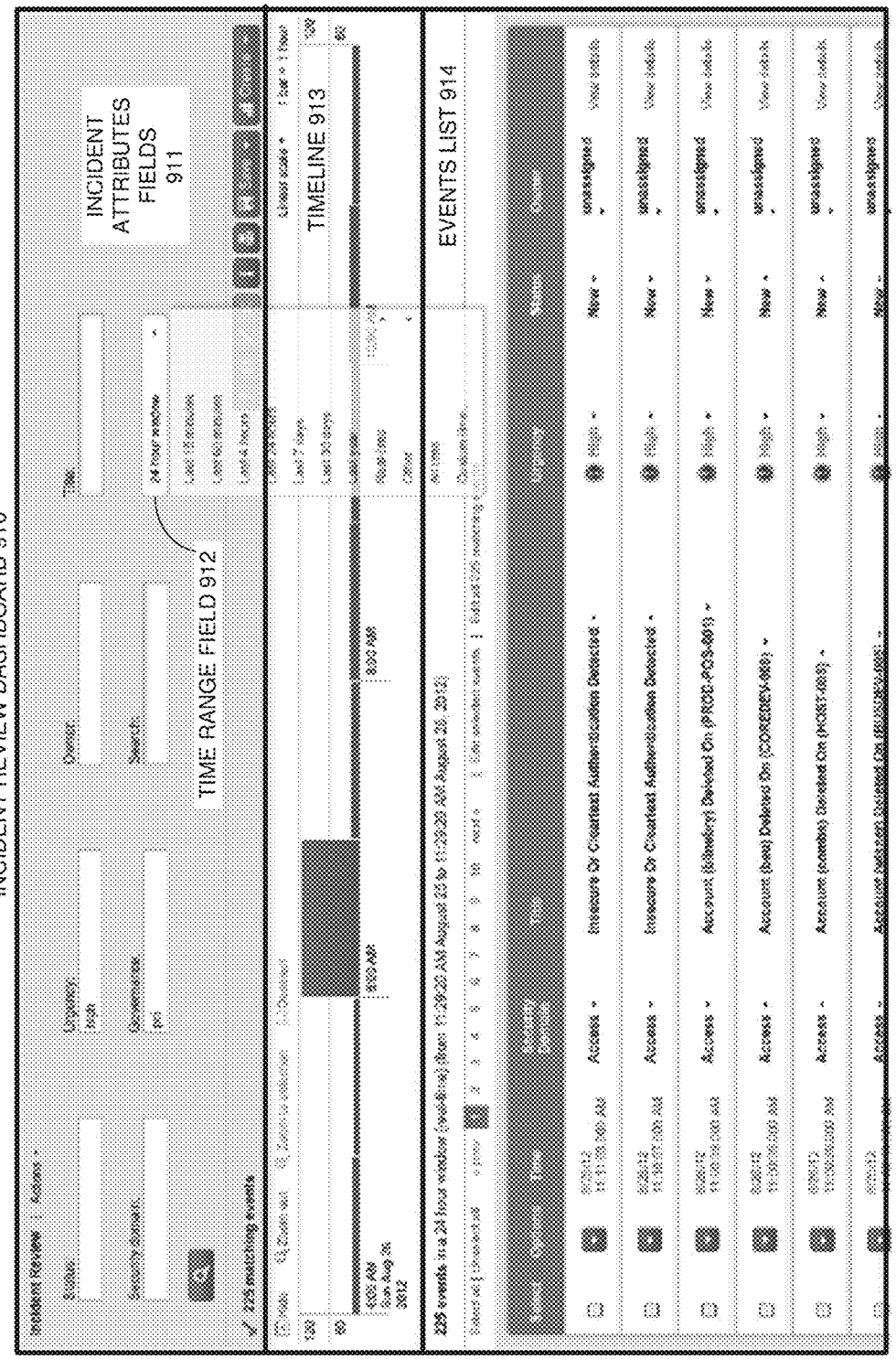
FIG. 9B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in one-hour time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOL- OGY ENVIRONMENT WITH LOG DATA FROM THAT INFORMATION-TECHNOLOGY ENVIRONMENT", filed 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
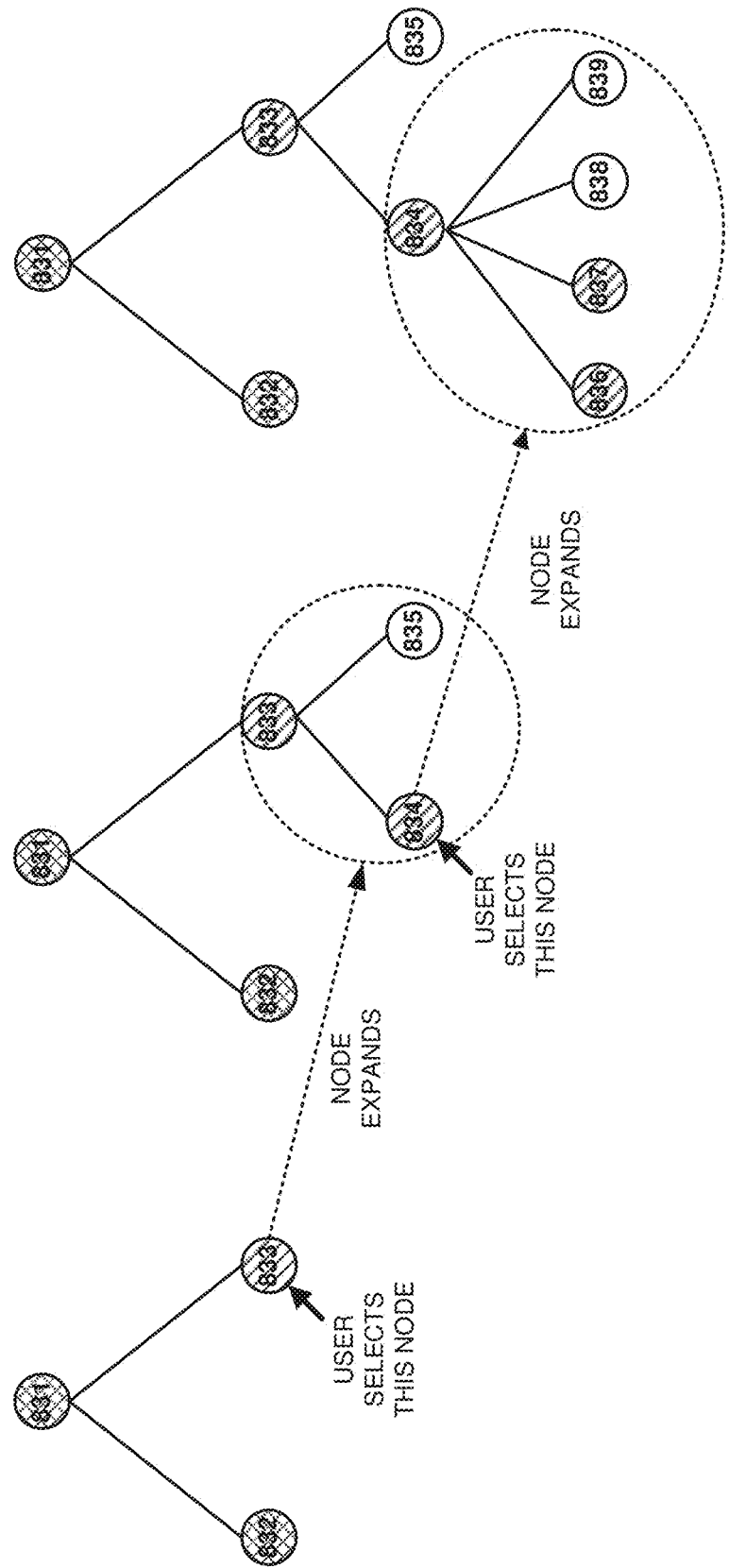
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490, entitled "TRANSMISSION APPARATUS AND METHOD, AND RECEPTION APPARATUS AND METHOD FOR PROVIDING 3D SERVICE USING THE CONTENT AND ADDITIONAL IMAGE SEPARATELY TRANSMITTED WITH THE REFERENCE IMAGE TRANSMITTED IN REAL TIME", filed on 15 Apr. 2014, and which is hereby incorporated by reference in its entirety for all purposes.

Figure 9D:
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution, meaning the system 108 is installed and operates on computing devices directly controlled by the user of the system. Some users may prefer an on-premises solution since it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and providing access to the system to end users via a network. Typically, a user may pay a subscription or other fee to use such a service, and each subscribing user to the cloud-based service may be provided with an account that enables the user to configure a customized cloud-based system based on the user's preferences.

Figure 10:
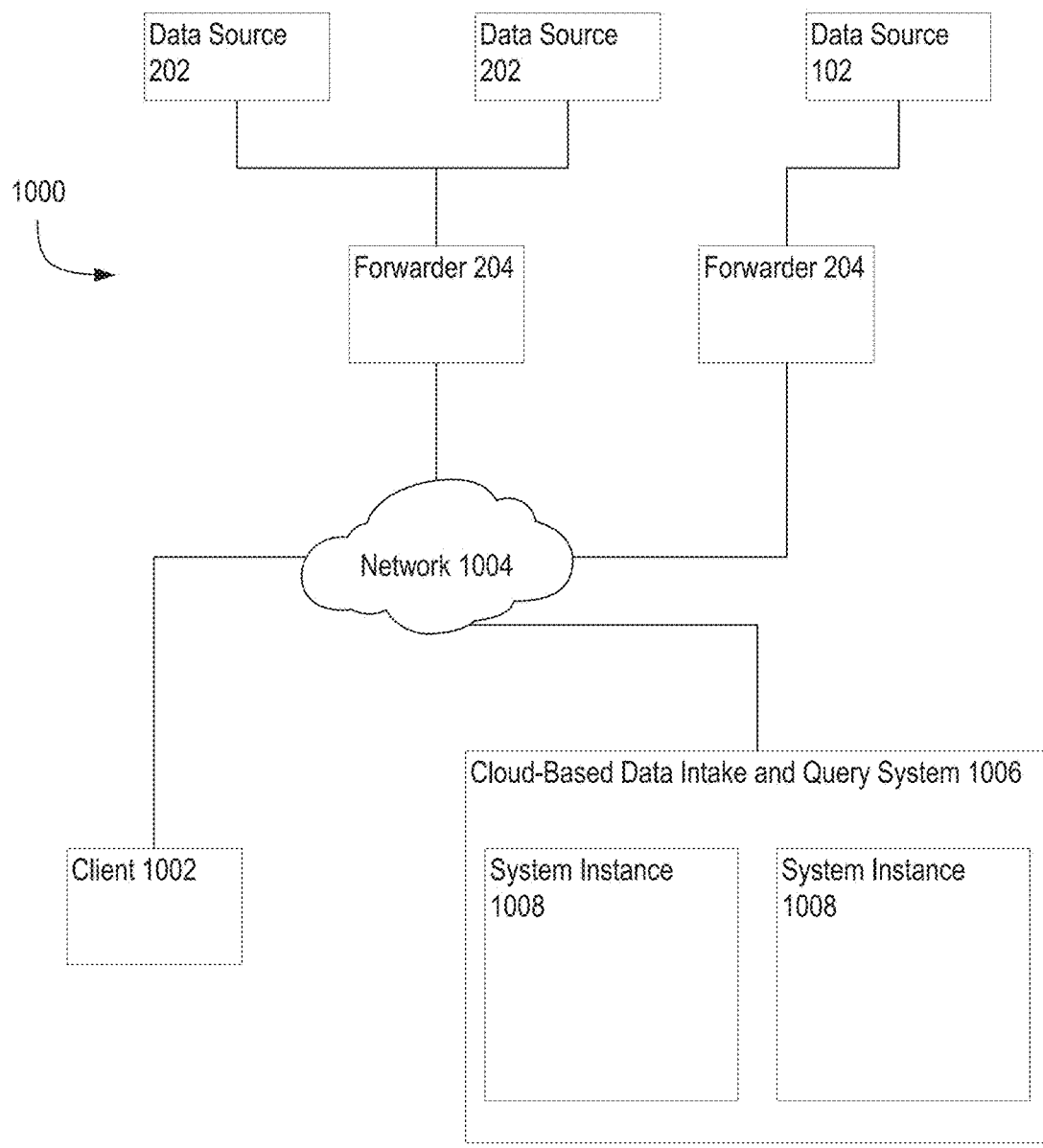
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
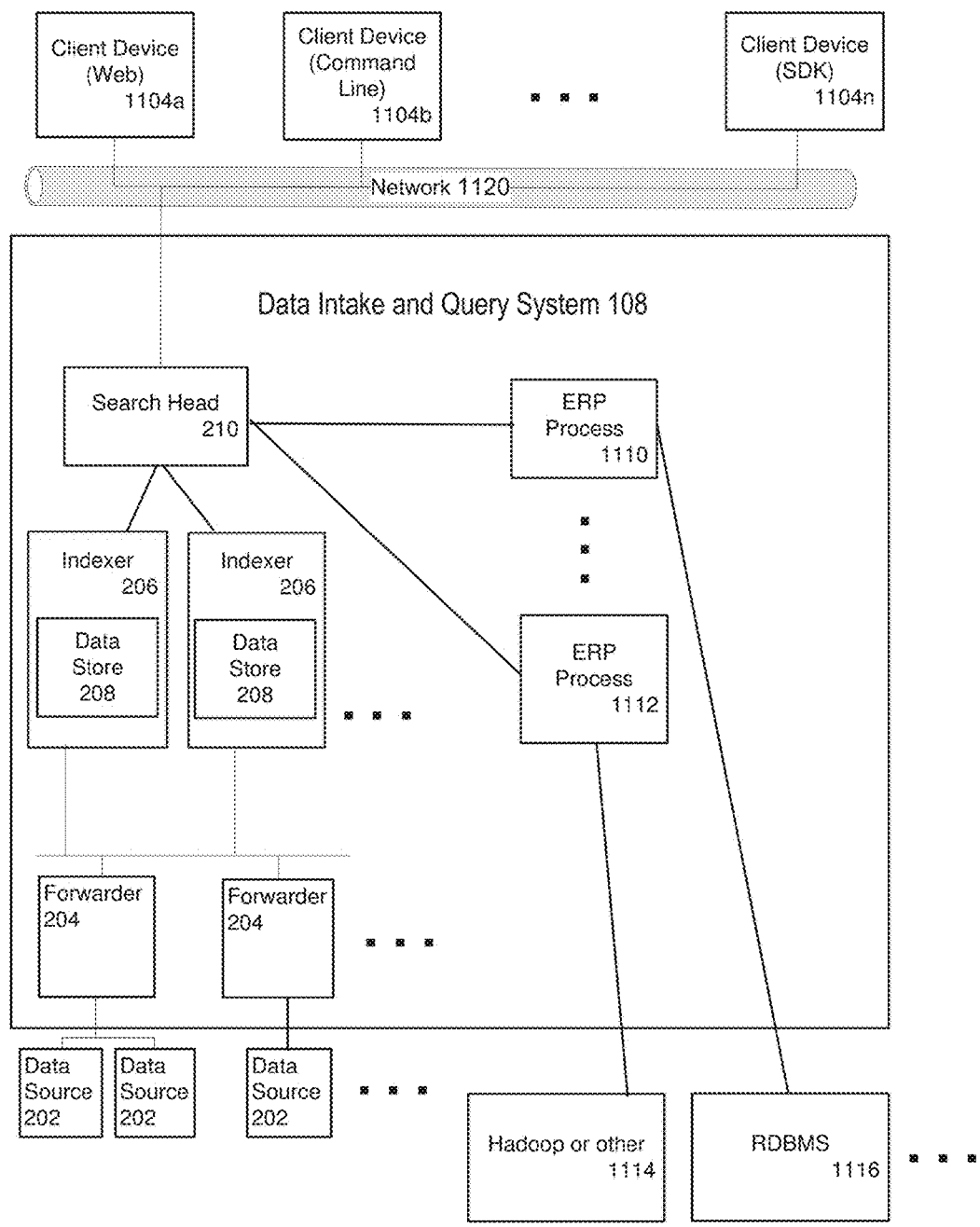
FIG. 11 illustrates a block diagram of an example search support system in accordance with the disclosed embodiments.

FIG. 11 shows a block diagram of an example of a data intake and query system 108 that provides transparent search facilities for data systems that are external to the data intake and query system. Such facilities are available in the HUNK® system produced by Splunk Inc. of San Francisco, Calif. The search head 210 of the data intake and query system receives search requests from one or more client devices 1104 over network connections. As discussed above, the data intake and query system 108 may reside in an enterprise location, in the cloud, etc. FIG. 11 illustrates that multiple client devices 1104*a*, 1104*b*, . . . , 1104*n* may communicate with the data intake and query system 108. The client devices 104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores that can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system is understood to relate to a locally stored and managed data collection, but a search reference to a virtual index is understand to relate to an externally stored and managed data collection, which the search head may access through one or more ERP processes 1110, 1112. FIG. 11 shows two ERP processes 1110, 1112 that connect to respective remote (external) virtual indices, which are indicated as a Hadoop or other system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indexes referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes, and there is also a one-to-many relationship between an ERP process and corresponding virtual indexes that are referred to in a search request. For example, using RDBMS, assume two independent instances of such a system by one vendor, such as one RDBMS for production and another RDBMS used for development. In such a situation, it is likely preferable (but optional) to use two ERP processes, to maintain the independent operation as between production and development data, but both of the ERPs will belong to the same family, because the two RDBMS system types are from the same vendor.

The ERP process 1110, 1112 receives a search request from the search head 210. The search head may optimize the received search request for execution at the respective external virtual index. Alternatively, the ERP process may receive a search request as a result of analysis performed by the search head or by a different system process. The ERP process 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP process 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116 each of which corresponds to the search request received by the search support system 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet. This is described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, and which is hereby incorporated by reference in its entirety for all purposes.

2.14.1. ERP Process Features

The ERP processes described above may include two operation modes, a streaming mode, and a reporting mode. The ERP processes can operate in streaming mode only, or reporting mode only, or in both modes simultaneously. Operating in both modes simultaneously is referred to as mixed mode operation. Further, it will be appreciated that in mixed mode operation, the ERP at some point can stop providing the search head with streaming results and only provide reporting results thereafter, or the search head at some point may start ignoring streaming results it has been using and only use reporting results thereafter.

The streaming mode returns search results in real time with minimal processing, in response to the search request. The reporting mode provides results of a search request with processing of the search results prior to providing them to the requesting search head, which in turn provides results to the requesting client device. ERP operation with such multiple modes provides greater flexibility in the performance of the ERP process with regard to report time, search latency, and resource utilization.

In mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim results to the user at the requesting client device, providing the streaming mode results, while the search head is simultaneously waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and start providing to the client or search requester interim results that are responsive to the query. Meanwhile, in this mixed mode, the ERP also operates concurrently in reporting mode, processing portions of raw data in a manner responsive to the search query. Upon determining that it has results from reporting mode available to return to the search head, the ERP may halt mixed mode at that time (or some later time) by stopping the return of data in streaming mode to the search head, switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation at the point where the higher bandwidth results from the reporting mode outstrips the amount of data processed by the search head in the lower bandwidth streaming mode of ERP operation.

One reason reporting mode is typically higher bandwidth is because the ERP does not have to spend time transferring data to the search head for processing all the raw data, and another reason is because the ERP may optionally direct another processor to do the processing.

One should recognize that it is not necessary to halt at any point the streaming mode of operation to gain the higher bandwidth benefits of reporting mode; the search head could simply stop using the streaming mode results—and start using the reporting mode results—at some point at which the bandwidth of the reporting mode has caught up with or exceeded the amount of bandwidth provided by the streaming mode. Thus, a variety of triggers and ways to accomplish a switch from the search head using or the ERP transferring streaming mode results to reporting mode results may occur to one skilled in the art.

The reporting mode can involve the ERP process (or an external system) performing event breaking, time stamping, filtering of events to match the search query request, and calculating statistics on the results. Whether or not events are the ultimate answer to a search query, or whether or not statistics are the ultimate answer, depends on the search query request specified by the user. The user can request particular types of data, such as where the search query itself involves types of events, or the search request may ask for statistics on data, such as on events that meet the search request; either query phrasing is possible. In either case, the search head understands the query language used in the received query request, which may be a proprietary language. For example, the search head may understand the query language used by the assignee of the application, Splunk Inc. (a query language commonly called SPL, or Splunk Processing Language) and the search head typically understands how to use that language to obtain data from the indexers which store data in a Splunk-specific format.

The ERP processes support the search head, as the search head is not ordinarily configured to understand the format in which data is stored in external data sources such as Hadoop or SQL data systems. Rather, the ERP process performs that translation from the format for what has been requested by the search query that has been submitted in the search support system's native format (e.g., SPL if SPLUNK® ENTERPRISE is used as the search support system) to the format in which a search query request will be accepted by the corresponding external data system. The external data systems typically store data in a different format from that of the search support system's native index format, and utilize a different query language (e.g., SQL or MapReduce, rather than SPL or the like).

As noted, the ERP process can operate in the streaming mode alone. After the ERP process has performed the translation of the query request referred to above, and once the ERP process has returned the raw results from the streaming mode, the search head can operate on the returned data and can integrate the returned data with any data obtained from local data sources (e.g., native to the search support system) and from other external data sources and from other ERP processes (if such operations were required to satisfy the terms of the search query). Thus, one advantage of mixed mode operation is that, in addition to streaming mode, the ERP process is also executing concurrently in the reporting mode, so that the ERP process (rather than the search head) is processing query results (e.g., performing event breaking, timestamping, filtering, possibly calculating statistics if required to be responsive to the search query request, etc.). It should be apparent that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can start returning meaningful results from its reporting mode.

The operation described above illustrates the source of operational latency: streaming mode has low latency (one obtains immediate results) and usually has relatively low bandwidth (fewer results can be returned per unit of time), whereas the concurrently running reporting mode has relatively high latency (it has to perform a lot more processing before returning any of the results) and usually has relatively high bandwidth (more results can be processed per unit of time). For example, when the ERP process does start returning report results, it returns a more (processed) results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request (which may have requested certain types of events, or statistics on those events). Alternatively, the ERP process can be configured to operate in the reporting mode only. Also alternatively, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results, rather, the reporting mode usually performs processing of chunks of events at a time and returns the processing results to the search head for each chunk.

For example, an ERP process can be configured to perform as simply as returning the contents of a search result file verbatim, with little or no processing of results, such that a search head performs all processing such as parsing byte streams into events, filtering, and the like, or the ERP process can be configured to perform more flexibly, such as analyzing the search request and handling all the computation that a native search indexer process would otherwise perform. In this way, the configured ERP process provides greater flexibility in features while operating according to desired preferences in terms of response latency and resource requirements.

3.0. Functional Overview

Approaches, techniques, and mechanisms are disclosed that enable network security analysts and other users to conduct network security investigations efficiently and to produce useful representations of investigation results. As used herein, a network security investigation generally refers to an analysis of one or more detected network events which may pose internal and/or external threats to a computer network under management. For example, one or more of the detected network events may represent notable events, described above in Section 2.11, which generally may correspond to detected malware infections, unusual network traffic, access failure notifications, etc. In one embodiment, a security analyst may conduct such investigations using a network security application such as, for example, the SPLUNK® APP FOR ENTERPRISE SECURITY described above in Section 2.11.

According to one embodiment, a network security application is configured to monitor and log user interactions with the application, also referred to herein as workflow events. For example, as illustrated in FIGS. 9A and 9B, a network security application may generate and display various "dashboards" and other graphical user interfaces (GUIs) that security analysts can use to view and act on various network events stored by the system. In this context, user interactions with the security application generally may include any user interaction with respect to these GUIs and other interfaces such as, for example, viewing a particular dashboard, submitting a search query, filtering a displayed data set, interacting with a notable event, etc. In one embodiment, in response to detecting an occurrence of a particular user interaction, a network security application is configured to store a record of the user interaction in a workflow event log, also referred to as an "actions history," associated with the particular user. Each workflow event log entry, for example, may indicate information about a type of workflow event that occurred, when the workflow event occurred, which user performed the workflow event, etc. A collection of workflow events may generally represent steps taken by an analyst to investigate one or more network security incidents.

According to one embodiment, a network security application is further configured to enable users to collect information related to a particular security investigation easily for display on an interactive investigation timeline. In general, an investigation timeline comprises a collection of investigation events, some or all of which may be selected for addition to the timeline by one or more users associated with the corresponding investigation. Each investigation event generally may represent either a network event (e.g., an event related to one or more components of a computer network), a workflow event (e.g., an event representing a user interaction with the network security application as recorded in a workflow log), or other custom events created by an analyst. A collection of events associated with an investigation timeline, for example, may provide information about the chronology of an investigation, including both a chronological ordering of the occurrence of one or more network events, as well as a chronological ordering of steps taken by one or more analysts to respond to those network events. A combination of both types of events on the same timeline may provide valuable insight into the lifespan of a network security investigation that previously was not easy or possible to obtain.

In one embodiment, a network security application is configured to generate one or more graphical displays that enable a user to view and interact with a workflow event log and investigation timelines. For example, a network security application may provide one or more GUI elements that persist on a user's display as the user navigates various dashboards and other interfaces of the network security application. By providing interfaces which a user can access at virtually any point in a network security application, users can more easily compile information from disparate information sources into a single comprehensive investigation resource.

Figure 12A:
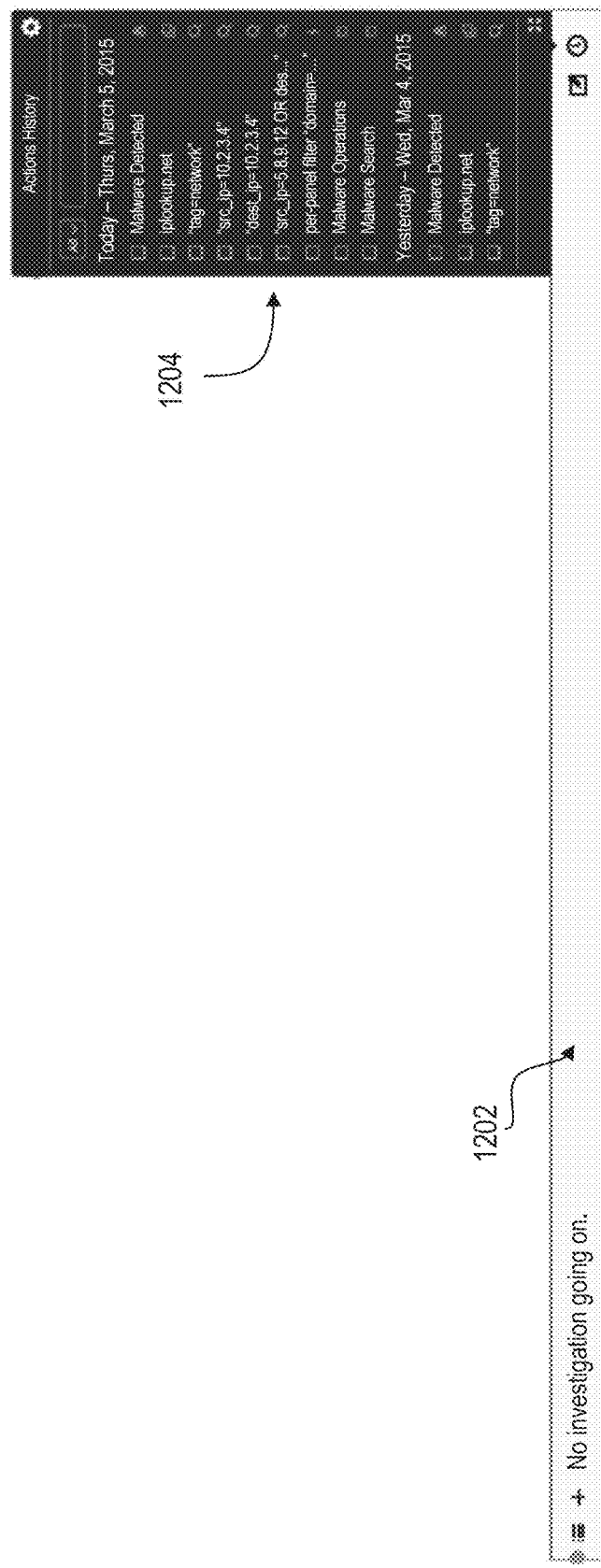
FIG. 12A illustrates a workflow log panel for use in a network security application in accordance with the disclosed embodiments.
Figure 12B:
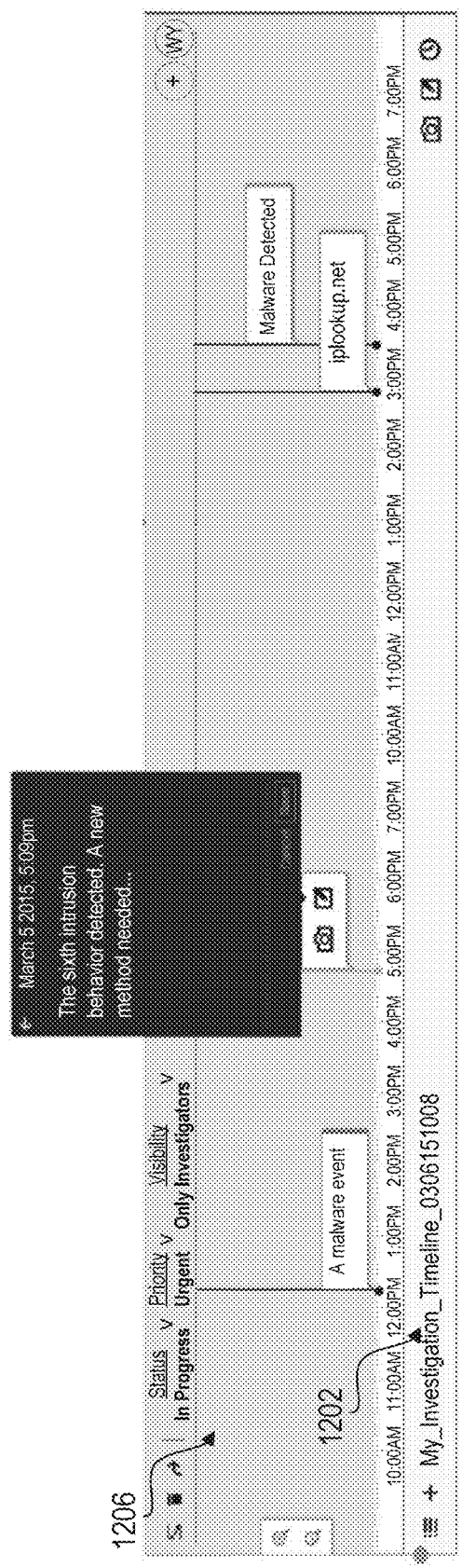
FIG. 12B illustrates an investigation timeline panel for use in a network security application in accordance with the disclosed embodiments.

FIGS. 12A and 12B illustrate a workflow log panel and an investigation timeline panel, respectively, for use in a network security application. FIG. 12A includes an investigation panel 1202 and a workflow event log panel 1204. FIG. 12B includes an investigation timeline panel 1206. The components depicted in FIGS. 12A and 12B are presented as high-level examples of these features, each described in further detail in separate sections hereinafter. Each of the components of FIGS. 12A and 12B generally represents one or more GUI elements that may be displayed individually or in conjunction with other interface elements, including various dashboards and other displays of a network security application.

In an embodiment, an investigation panel 1202 generally represents an interface component which may be used to access various other interface components related to one or more network security investigations, including workflow event logs, investigation timelines, and other features. To enable a user to access these features at any time during use of a network security application, an investigation panel 1202 may be configured as a persistent or "ride along" interface component that is displayed in conjunction with each interface as the user navigates to various different interfaces of the application. For example, if a user is currently viewing an "incident review" dashboard of the network security application, an investigation panel may be configured to display on some portion of the display (e.g., as a menu bar at the top or bottom of the display). The user may subsequently navigate to a different dashboard, and the same investigation panel may continue to be displayed in conjunction with the second dashboard interface. In this manner, a user may seamlessly access and interact with an investigation panel, associated workflow event logs, and investigation timelines, throughout the user's experience with the network security application.

In an embodiment, a workflow event log panel 1204 is configured to display a list of recorded workflow events and enable user interaction with the historical record of workflow events. As described in more detail hereinafter, a user may use a workflow event log panel 1204 to view and search for particular workflow events, to configure how the network security application tracks and displays workflow events, and to add workflow events to one or more investigation timelines.

In an embodiment, an investigation timeline panel 1206 is configured to display one or more investigation timelines, including a display of associated events at particular locations along the timeline. For example, in order to create a representation of a particular network security investigation, a user may select one or more network events and associated workflow events for addition to the timeline. The user may further add one or more user-generated notes and screenshots to the same timeline. To facilitate these actions, an investigation timeline panel 1206 may provide one or more interface components that enable users to compile information from various sources into a single timeline display.

In addition to providing interface elements that enable user interaction with workflow event logs and investigation timelines, as described above, a network security application further may be configured to generate and display one or more GUIs providing an overview of ongoing and completed investigations. In one embodiment, a network security application may provide an investigation management console which provides one or more GUIs displaying status information related to one or more separate investigations. An investigation management console may, for example, provide information indicating a current status of individual investigations (e.g., in progress, under review, closed, etc.), assignments of each investigation to one or more particular analysts, an assigned priority level for particular investigations, and various aggregate metrics based on information related to a plurality of the investigations.

In other aspects, the invention encompasses a computer apparatus and a computer-readable medium configured to carry out the foregoing steps.

3.1. Investigation Workflow Logging

The process of conducting a network security investigation using a network security application generally may involve a large number of steps on the part of one or more security analysts responsible for the investigation. For example, an investigation may begin with an analyst viewing an incident review dashboard (e.g., FIGS. 9A and 9B) and noticing one or more notable events of interest (e.g., corresponding to detected malware infections, security access violations, etc.). This may lead the analyst to navigate various other dashboards provided by the network security application to conduct searches, review other stored events, and generally attempt to provide a context for the notable event(s) relative to other stored network events. As the analyst reviews the information, the analyst may further produce various notes and other user-generated content relating to the analyst's insight into a cause of the events. Details about these steps may provide valuable information about how an analyst (or team of analysts) is responding to particular network security incidents.

In one embodiment, to provide access to such information about an analyst's actions during an investigation, a network security application is configured to monitor and record information about users' interactions with the network security application entries in a "workflow event log." In general, each entry in a workflow event log comprises information about a corresponding user action including the type of user action, a time the user action occurred, an identity of the user that performed the action, etc. For example, types of workflow events that may be recorded in a workflow event log may correspond to a user viewing a particular dashboard, submitting a search query using a dashboard interface, filtering a data set displayed by one or more dashboard elements, changing the status of a notable event, or any other user action that may be detected by the network security application.

In one embodiment, in addition to monitoring and recording workflow events, a network security application is configured to generate and cause display of one or more GUI elements which display and enable user interaction with stored workflow log entries. In general, these GUI elements may be displayed in conjunction with other interfaces of a network security application, enabling users to easily access and utilize aspects of a workflow event log as the analyst navigates various dashboards and other interfaces of the network security application.

Figure 13:
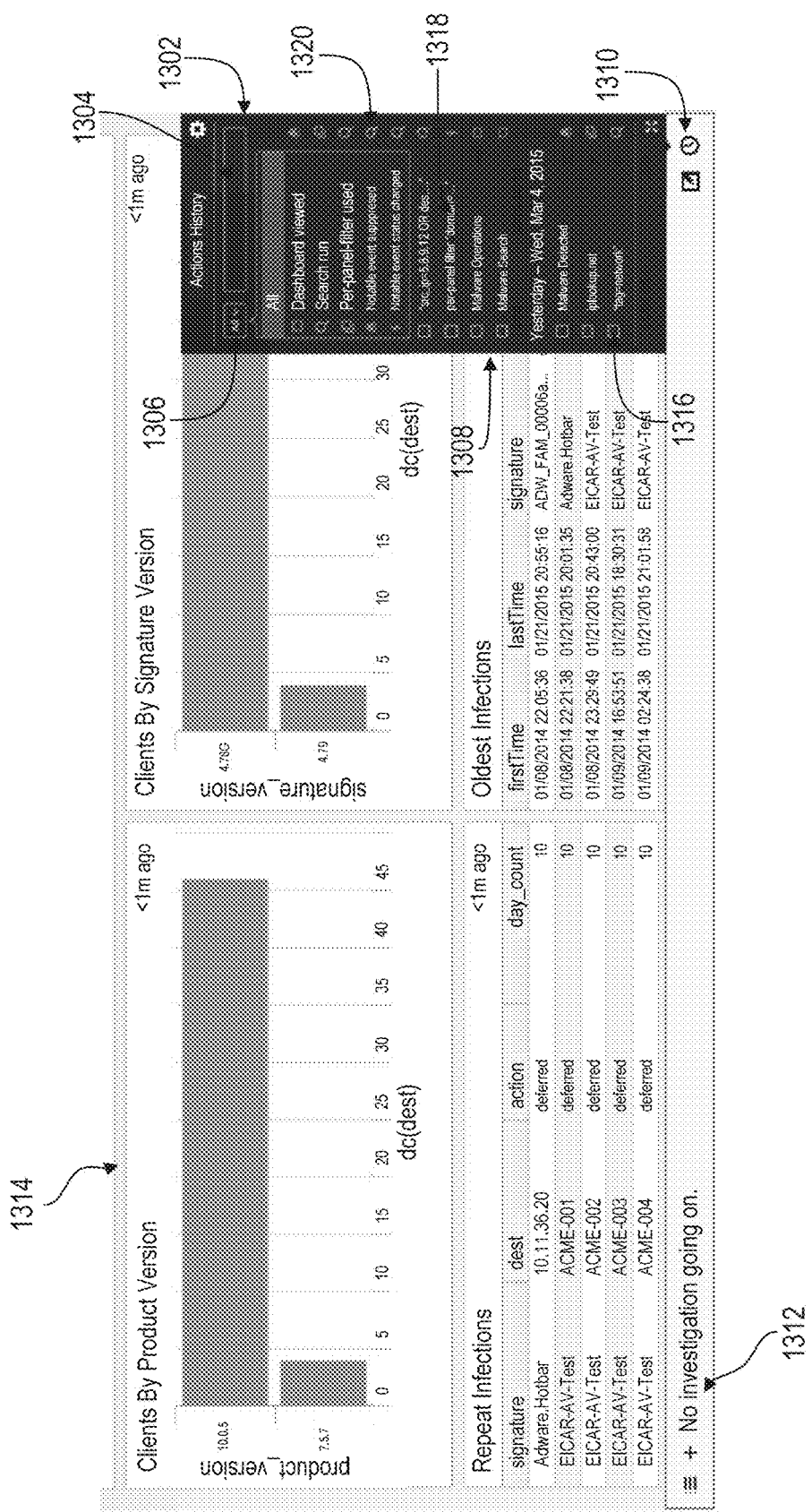
FIG. 13 illustrates a workflow log panel overlaying a dashboard interface in accordance with the disclosed embodiments.

FIG. 13 depicts an example of a workflow event log panel overlaying a dashboard of a network security application. In FIG. 13, a workflow event log panel 1302 includes a search bar 1304, a workflow event type filter 1306, and a workflow event list 1308. A workflow event log panel 1302 may be displayed, for example, in response to a user selecting an event log icon 1310 displayed on an investigation panel 1312, or "investigation bar." As indicated above, an investigation panel 1312 may represent a persistent interface component that is displayed as a user navigates various interfaces of the network security application. As depicted in FIG. 13, the display of the workflow event log panel 1302 may include overlaying the panel on a currently displayed dashboard interface 1314.

In an embodiment, a workflow event log panel 1302 generally displays a list of workflow events in a workflow event list 1308. Each workflow event displayed in the workflow event list 1310 may, for example, correspond to an action previously taken by a user with respect to one or more user interfaces of the network security application. In FIG. 13, workflow event list 1308 displays a number of workflow events grouped into separate timespans (e.g., "Today—Thursday, Mar. 5, 2015" and "Yesterday—Wednesday, Mar. 4, 2015"). Workflow log events displayed in a workflow event list 1310 generally may be grouped in any manner for display, including by week, by day, by hour, by event type, or any other grouping.

In FIG. 13, each of the individual workflow log events in the workflow event list 1308 is displayed with an associated selection box (e.g., selection box 1316), an event label (e.g., event label 1318), and an event type icon (e.g., event type icon 1320). In an embodiment, a selection box enables a user to select one or more particular events from the workflow event list to perform one or more operations with respect to the selected events (e.g., to add the event(s) to an investigation timeline, modify the event(s), delete the event(s), etc.). The addition of workflow events to an investigation timeline is described in more detail hereinafter in Section 3.2. In one embodiment, workflow events may be selected to "re-run" the recorded actions. For example, if a workflow event in event list 1308 corresponds to a search conducted on a particular dashboard, a user may select the corresponding event to cause the previous search results to be redisplayed, or the search may be reprocessed for more current results.

In an embodiment, a workflow event label 1318 provides a textual description of a workflow event. For example, if a particular workflow event corresponds to a user viewing a particular dashboard, a label for the workflow event may indicate a title of the dashboard viewed (e.g., "Malware Operations"). As another example, if a particular workflow event corresponds to a user submitting a search query, an associated event label may indicate a search string and/or search parameters submitted by the user for the search. In an embodiment, a workflow event type icon 1320 displays a particular icon depending on a type of the corresponding workflow event. For example, each workflow event of a workflow event list 1310 may be associated with a different icon depending on whether the workflow event corresponds to a dashboard view, a search, a data set filter, interaction with a notable event, etc.

In an embodiment, a workflow event type filter 1306 enables a user to select and/or deselect one or more particular types of workflow event for display in a workflow event list 1308. For example, a particular user may not desire to view workflow events that correspond to recorded instances of the user viewing particular dashboards. In this example, the user may deselect the "dashboards viewed" event type from the list, thereby causing workflow events of that type to be hidden from the workflow event list 1308 while displaying workflow events of other types.

Figure 14:
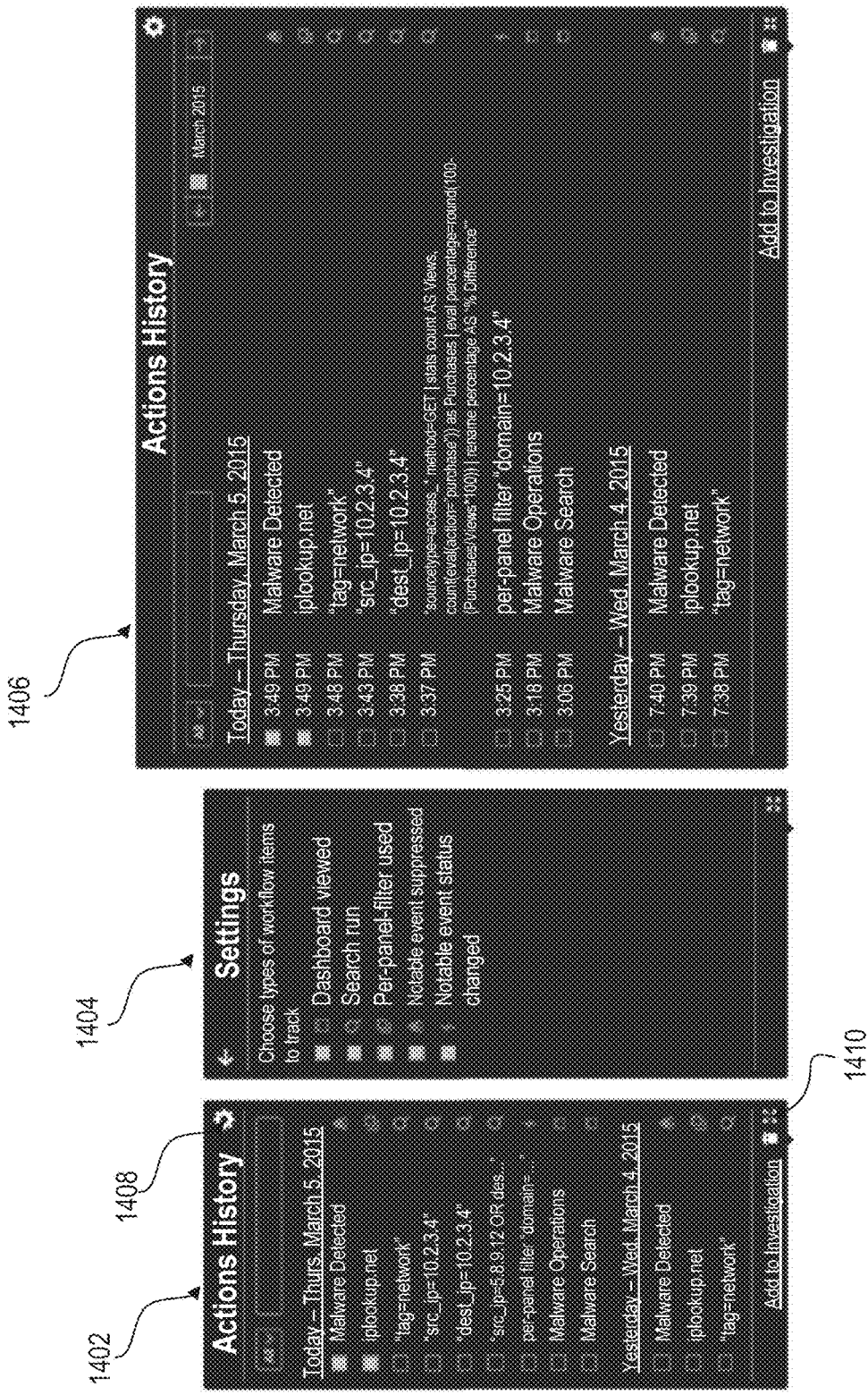
FIG. 14 illustrates a workflow log panel, including a workflow log settings panel and an expanded workflow log panel in accordance with the disclosed embodiments.

FIG. 14 illustrates various associated interfaces of a workflow log panel, including a workflow log settings panel and an expanded workflow log panel. Similar to the workflow event log panel 1302 of FIG. 13, workflow event log panel 1402 displays a standard or "default" view of a workflow event log, including a list of workflow events and various interface elements for interacting with the workflow events.

In one embodiment, a user may select an interface element of a workflow event log panel 1402 or provide other input to cause display of an interface for configuring one or more settings associated with a workflow event log. For example, a workflow event log settings panel 1404 may be displayed in response to a user selecting configuration icon 1408 of a workflow event log 1402. In general, a workflow event log settings panel 1404 may display various interface elements that enable a user to configure how the network security application tracks and displays workflow events for one or more particular users. In FIG. 14, for example, a settings panel 1404 includes a selectable list of workflow event types (e.g., dashboard views, searches, filters, notable event suppressions, and notable event status changes). In an embodiment, the selection of particular event types in a settings panel 1404 may determine which types of workflow events are tracked by the network security application and/or which types of workflow events are displayed in a workflow event log panel 1402 and/or detailed workflow event log panel 1406.

In an embodiment, a detailed workflow event log panel 1406 provides a view of a workflow event log, where each displayed work event may be displayed with more detailed information about the events than that displayed in a standard workflow event log panel 1402. For example, in addition to the information displayed in a workflow event log panel 1402 for each workflow event, each event displayed in a detailed workflow event log panel 1406 may include information indicating timestamp information and a more detailed label describing the event. In one embodiment, a detailed workflow event log panel 1406 may be displayed, for example, in response to a user selecting an expansion icon 1410 on a standard workflow event log panel 1402.

Figure 15:
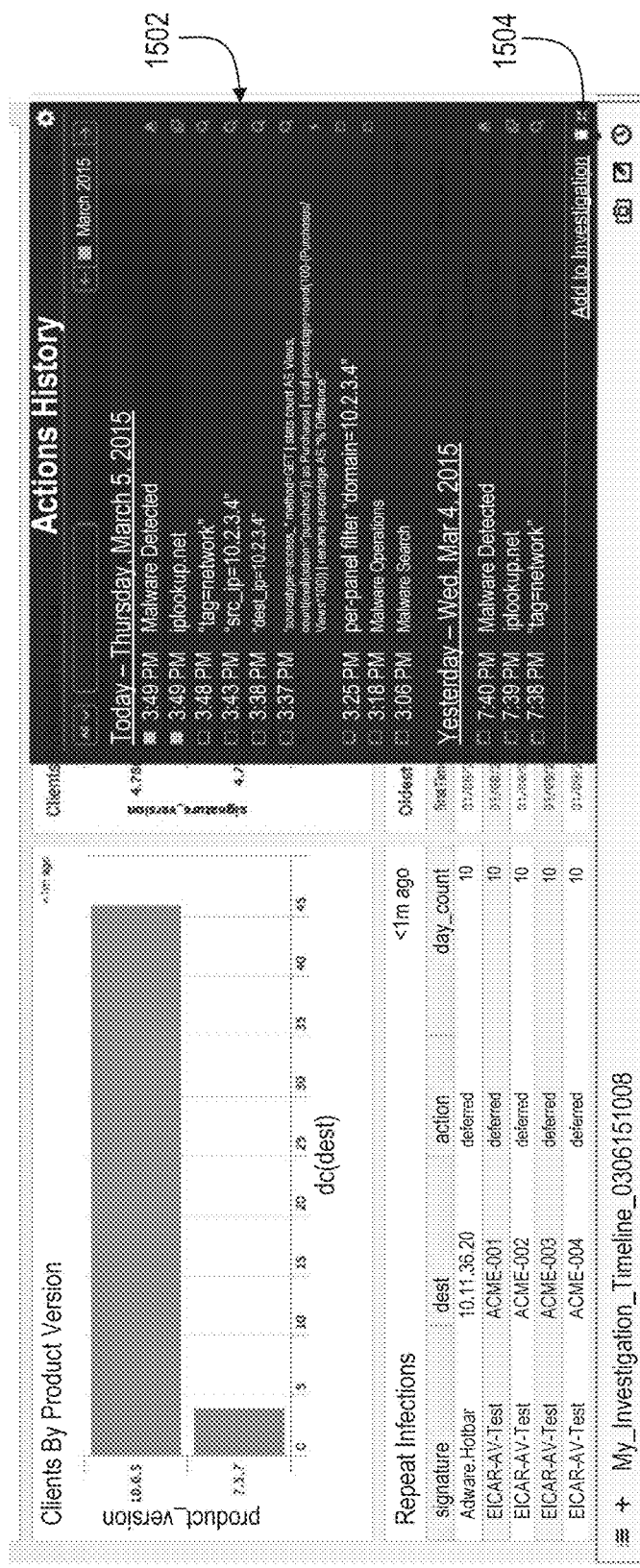
FIG. 15 illustrates a detailed workflow log panel overlaying a dashboard interface in accordance with the disclosed embodiments.

FIG. 15 depicts an example of a detailed workflow log panel overlaying a dashboard interface. As described above in reference to FIG. 14, a detailed workflow log panel 1502 may be displayed, for example, in response to a user selecting a workflow display expansion icon 1504 (which also may be used to revert the display of the workflow event panel to a standard size as depicted in FIG. 13). A detailed workflow log panel 1502 may further include additional interface elements used to modify a currently displayed set of workflow events, such as a calendar picker, other search interface elements, etc.

In addition to automatically monitoring and logging user interactions in a workflow event log, a network security application may also provide one or more interface components that enable users to create and store user-generated information related to a security investigation. In one embodiment, a network security application includes a notes module and a screenshot module. In general, each of these modules provides one or more interface components that enable users to provide information that is saved by the security system and which users may associate with one or more investigation timelines, as described in Section 3.2.

Figure 16:
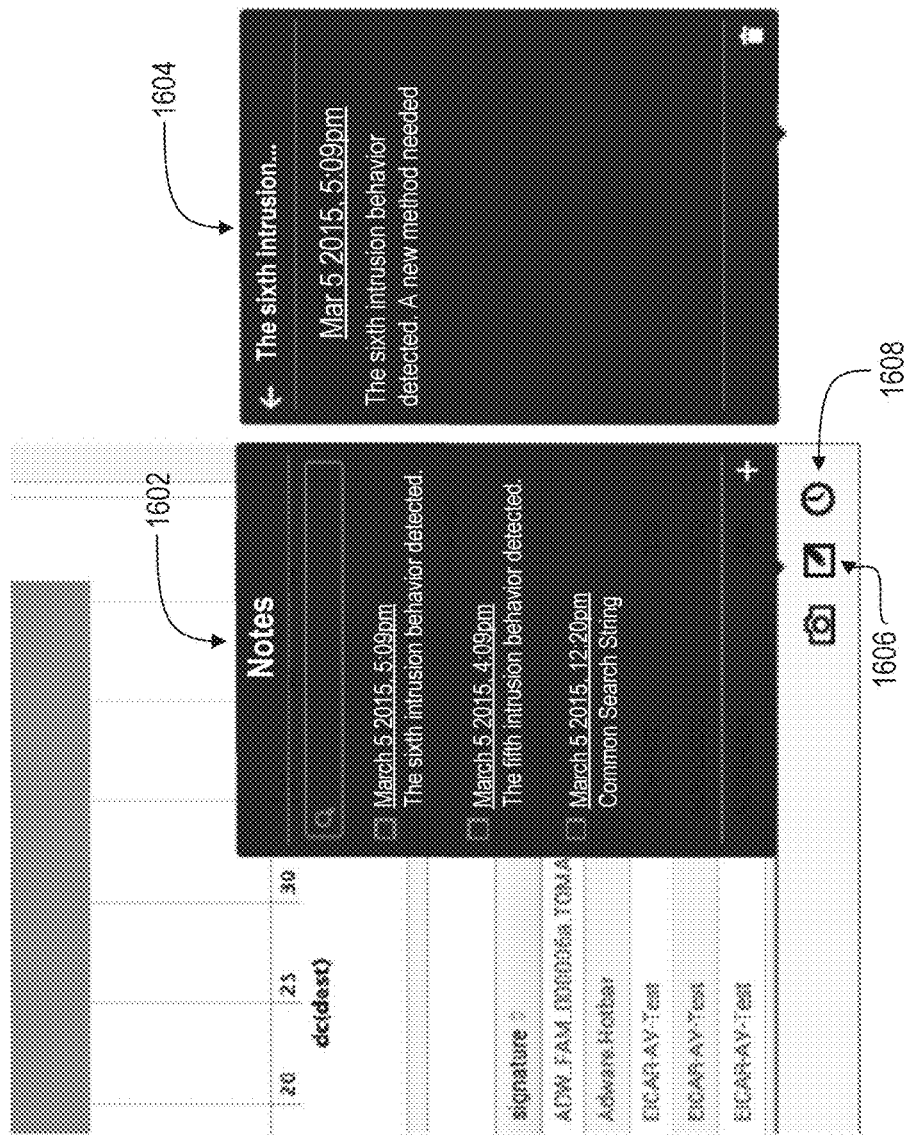
FIG. 16 illustrates a notes panel in accordance with the disclosed embodiments.

FIG. 16, for example, illustrates a notes panel that enables users to store user-generated notes related to one or more investigations. In an embodiment, a notes panel 1602 generally enables a user to provide various types of user-generated content, including text, images, links, etc., which may be saved by the network security application and which a user may associate with one or more investigation timelines, as described in more detail in Section 3.2. For example, during a particular security investigation, a user may create one or more notes to record a user's observations related to particular network events or other aspects of the investigation as the user reviews various dashboards and other information.

In FIG. 16, a notes panel 1602 may be displayed, for example, in response to a user selecting a notes icon 1606 displayed on an investigation panel 1608. In an embodiment, a notes panel 1602 generally may include a search bar and a list of previously created notes. A separate notes panel 1604 displaying a particular note may be displayed, for example, in response to a user selecting a particular note from the notes list displayed in the notes panel 1602 for modification, or in response to selecting an icon to create a new note. Notes panel 1604 generally may enable a user to provide any type of input including text, links, images, etc. to save as a note.

Figure 17:
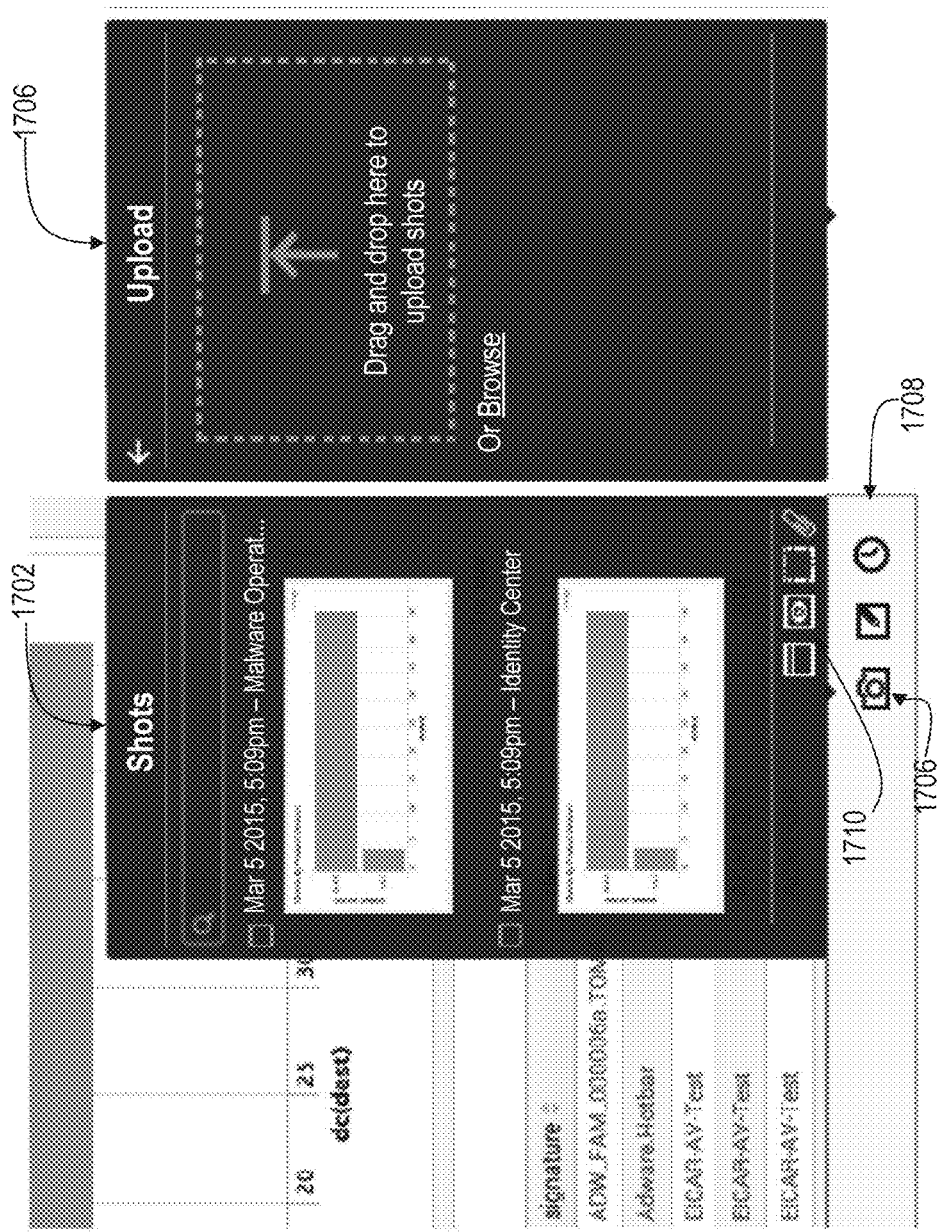
FIG. 17 illustrates a screenshot panel in accordance with the disclosed embodiments.

FIG. 17 illustrates a screenshot panel that enables users to record screenshots within a network security application. In an embodiment, a screenshot panel 1702 generally enables a user to capture a screenshot at any point during the use of a network security application. A screenshot in this context generally refers to an image file that records some or all of a currently displayed interface. For example, if a user is currently viewing a particular dashboard of the network security application, the user may use a screenshot panel 1702 to record a copy of the dashboard as it is displayed, or some portion thereof.

In FIG. 17, a screenshot panel 1702 may be displayed, for example, in response to a user selecting a screenshot icon 1706 on an investigation panel 1708. In an embodiment, a screenshot panel 1702 may include a search bar, a list of previously created screenshots, and various option icons. In general, a screenshot panel 1702 may be configured to enable a user to capture a screenshot, associate a label or other descriptive information with each captured screenshot, and to add captured screenshots to an investigation timeline. Option icons 1710 may include a number of selectable icons that enable a user to perform one or more actions, including creating a new screenshot, editing an existing screenshot, deleting a previously created screenshot, and other operations. A separate screenshot upload panel 1706 may be displayed, for example, in response to a user selection of a particular option icon 1710 and enable a user to upload a screenshot file captured outside of the network security application.

3.2. Investigation Timelines

A security analyst conducting a network security investigation may review a large amount of information from many different sources during the investigation. For example, an analyst may initiate a security investigation in response to reviewing an incident review dashboard and identifying one or more notable events of interest. In response, the analyst may review any number of different dashboards and other interfaces of the network security application to analyze the notable event(s) and to locate other possibly related network events stored by the network security application. While reviewing each of these dashboards, the analyst may perform one or more searches and/or data filters to further locate other events and data of interest. As the user locates and analyzes such data, the user may take various notes and record other information related to the investigation. Some or all of these actions taken by an analyst during a security investigation may be recorded as workflow events as part of a workflow log, as described above in reference to Section 2.1.

In one embodiment, to facilitate the creation of an organized representation of the various events, user actions, notes, etc. that may comprise a security investigation, a network security application enables users to create and view investigation timelines. In general, an investigation timeline is a stored representation of an investigation and may be associated with various types of data including network events, workflow events, user-generated data (e.g., notes and screenshots), and other information. In one embodiment, a display of an investigation timeline may be generated by displaying one or more graphical indications at various points along a timeline, each of the graphical indications representing a particular event or other data point. The creation and display of investigation timelines may, for example, assist analysts and other users with a better understanding of the chronology of events and other information that comprise a security investigation.

In one embodiment, a network security application provides various GUI elements that enable users to easily create and view investigation timelines during use of the application. Similar to the workflow log panels described above in Section 3.1, a network security application may provide an investigation timeline panel which may be displayed in conjunction with other interfaces of the network security application. By providing an investigation timeline panel that is generally accessible across a user's experience with the security application, users can easily compile information into the timeline as the user reviews data from a possibly large number of disparate sources (e.g., various dashboards and other interfaces).

Figure 18:
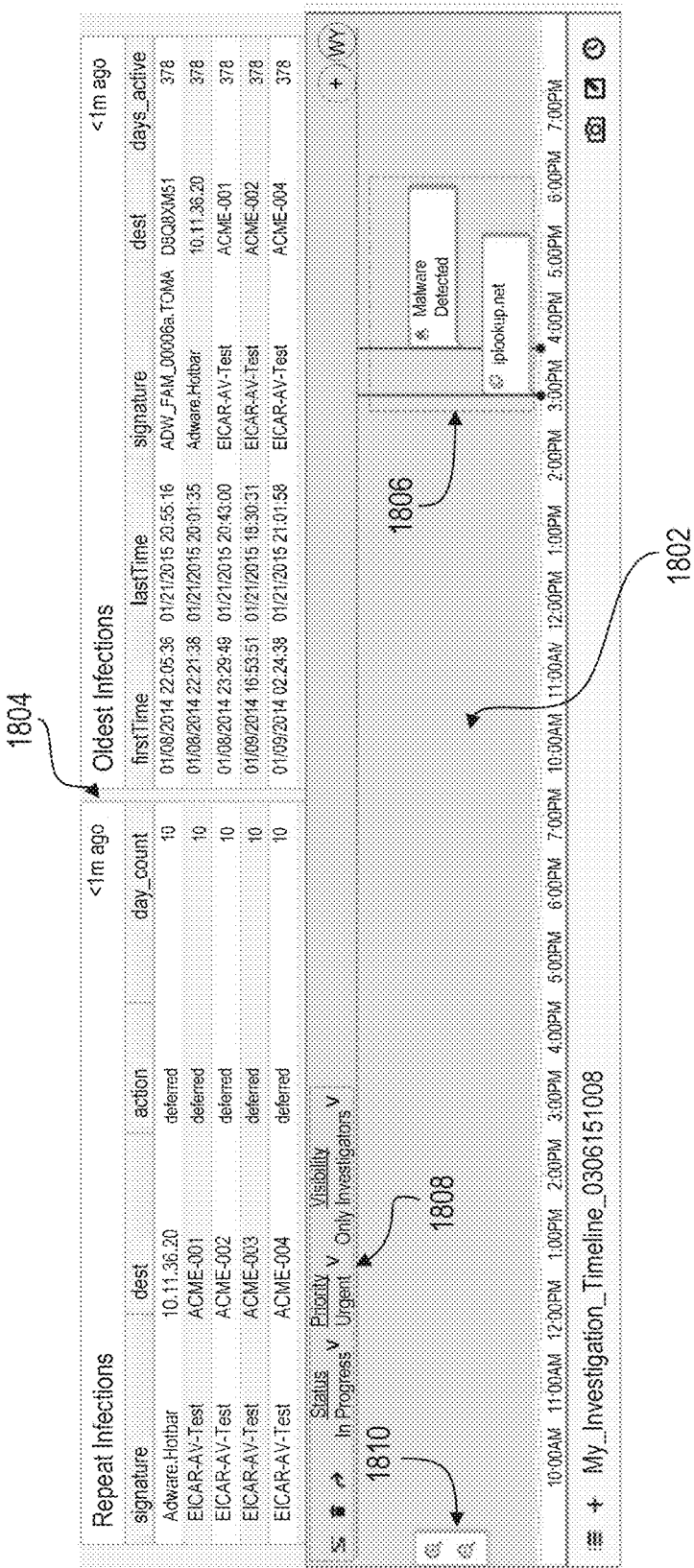
FIG. 18 illustrates an investigation timeline panel displayed in conjunction with a dashboard interface in accordance with the disclosed embodiments.

FIG. 18 illustrates an investigation timeline panel displayed in conjunction with a dashboard interface. In FIG. 18, a timeline panel 1802 is displayed overlaying a dashboard interface 1804. In an embodiment, a timeline panel 1802 may include zero or more timeline events (e.g., timeline events 1806), a timeline options panel 1808, and zoom icons 1810, among other possible elements.

In an embodiment, timeline events 1806 represent one or more events that have been added to the particular investigation timeline, represented by graphical indications that are displayed at a particular location on the investigation timeline. In general, a location at which each timeline event 1806 is displayed on an investigation timeline may correspond to timestamp information associated with the event. For example, if one or more of the events 1806 represents a network event, the network event is associated with timestamp information that is stored with the network event when the event is created. The location at which the network events may be displayed on the timeline thus may correspond to the timestamp information associated with the events.

In an embodiment, zoom icons 1810 may be selected to modify a span of time currently displayed on the investigation timeline. For example, a timeline panel 1802 by default may display a timespan such that all events associated with the timeline are displayed in the view, or the timeline may display a set period of time (e.g., a year, a month, etc.). To adjust the display of the timeline to focus on particular timespans, zoom icons 1810 may be used to increase or decrease the span of time currently displayed in the timeline. As described in more detail in reference to FIG. 32, depending on a current zoom level and an amount of display room available, events may be displayed on the timeline using separate graphical indications, or using a grouped indication if, for example, there is insufficient space to display the graphical indications separately on the timeline.

Figure 19:
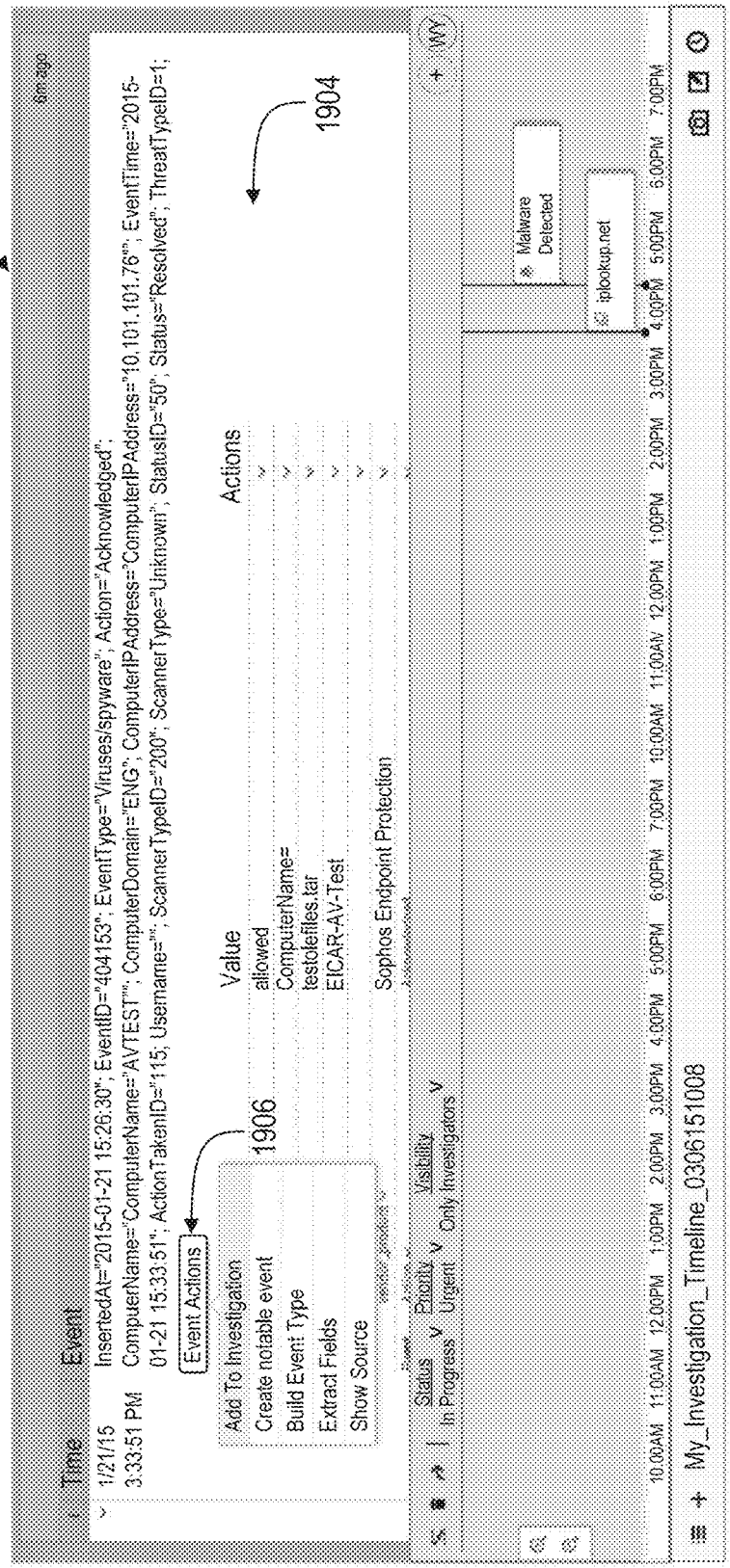
FIG. 19 illustrates an interface for adding an event to an investigation timeline in accordance with the disclosed embodiments.

FIG. 19 illustrates an interface for adding an event to an investigation timeline. In FIG. 19, a dashboard interface 1902 includes a detailed event display 1904, which includes an event action button 1906. The detailed event display 1904 may be displayed, for example, in response to a user selection of a particular event displayed in a particular dashboard, using one or more search options to search for a particular set of events, and/or selecting an event of interest from a search result list. In an embodiment, an event action button 1906 provides a menu that generally enables a user to select one or more actions to perform with respect to the displayed event. For example, an event action button 1906 may include options to identify the event as a notable event, to extract fields from the event, and to show the source of the event.

In one embodiment, an event action button 1906 may include an option to add the associated event to an investigation timeline. For example, a user viewing a particular event may determine that the selected event is relevant to an ongoing investigation, or decide that a particular event is a worthy focus of a new investigation. In such instances, for example, the user may select an option from a menu displayed by an event action button 1906 to add the currently displayed event to an investigation timeline. In response to receiving the user's selection, the event may be automatically added to a particular investigation timeline (e.g., an investigation timeline currently displayed in investigation timeline panel 1904). In another example, a user may be prompted to select a particular investigation timeline to which the event is to be added.

Figure 20:
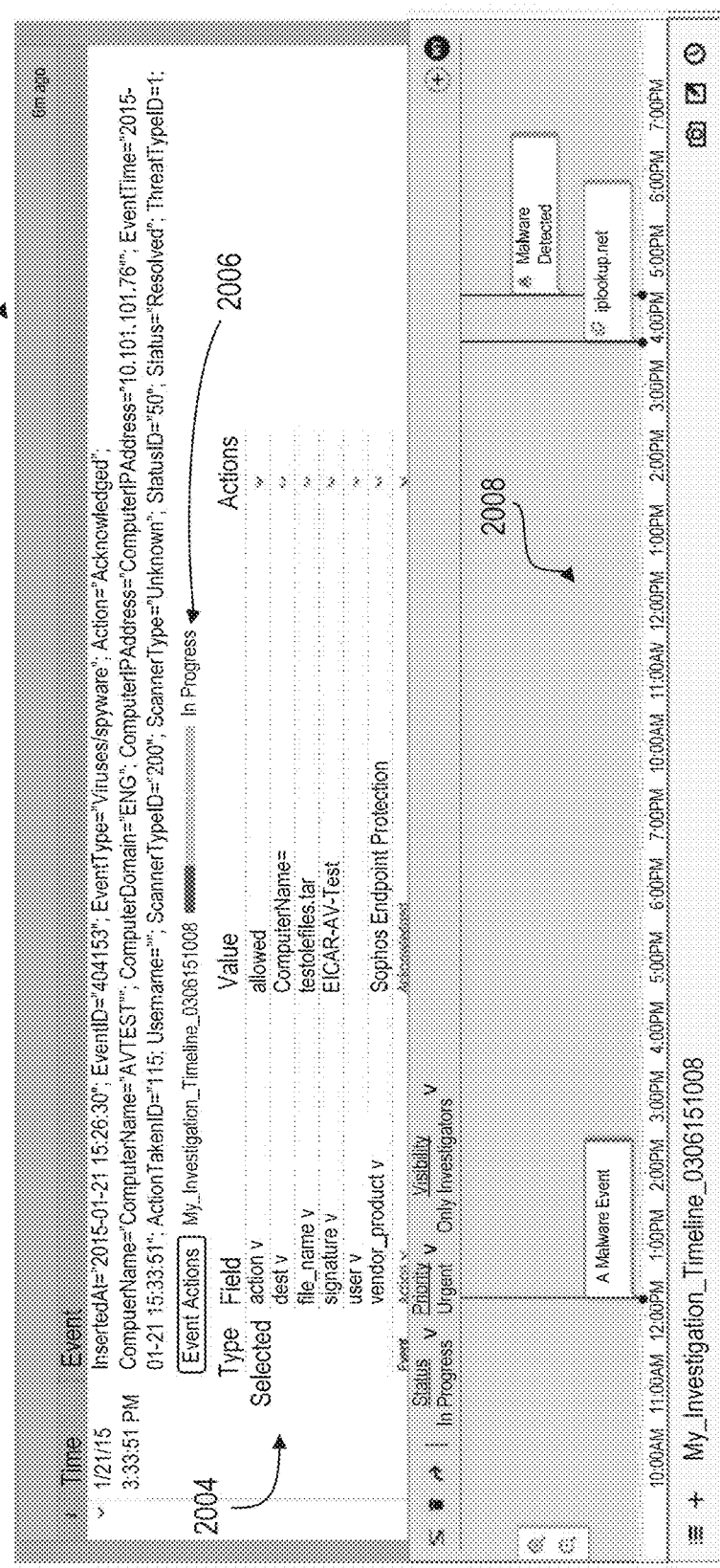
FIG. 20 illustrates an example interface displayed in response to adding an event to an investigation timeline in accordance with the disclosed embodiments.

FIG. 20 depicts an example interface displayed in response to an event being added to an investigation timeline. For example, the dashboard interface 2002 of FIG. 20 may be displayed in response to a user selecting an option from the menu generated by event action button 1904 to add the event associated with the event detail 1902 to an investigation timeline, as described above in reference to FIG. 19.

In FIG. 20, a detailed event display 2004 displays associated timeline information 2006, which generally may indicate information about one or more investigation timelines to which the event has been added. In FIG. 20, for example, the timeline information 2006 displays the label of a particular investigation timeline to which the event has been added (e.g., "My_Investigation_Timeline_0306151008", corresponding to the investigation timeline displayed in panel 2008) and a progress bar indicating that the event is in the process of being added to the investigation timeline. In an embodiment, an event selected for addition to an investigation timeline generally is added to the timeline at a location corresponding to timestamp information associated with the event. In other examples, a user may select a location on the timeline to display an event that is different from a timestamp associated with the event, if desired.

In an embodiment, similar to the addition of a network event to an investigation timeline, a user may use a workflow event log panel or other interface component to add one or more workflow events to an investigation timeline. For example, as described above in reference to FIG. 13, a user may use a workflow event log panel to select one or more particular workflow events and to perform one or more actions with respect to the selected events. In one embodiment, an action may include associating the selected workflow events with one or more particular investigation timelines.

Figure 21:
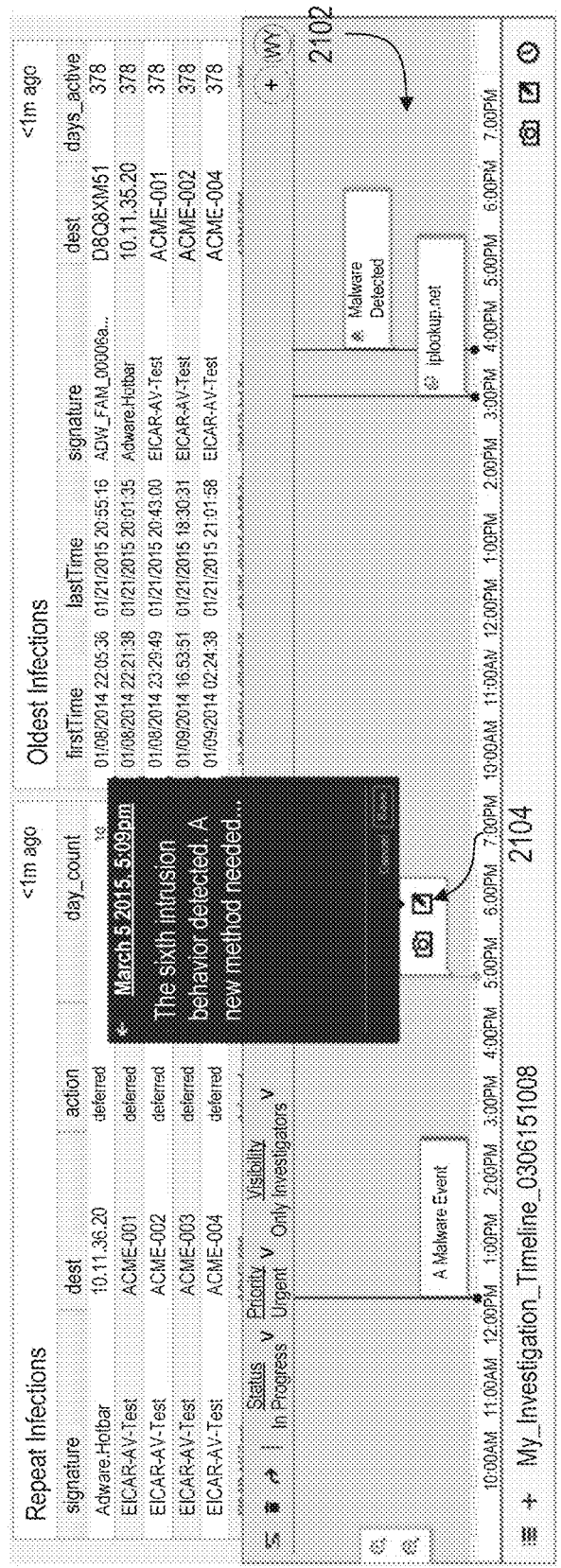
FIG. 21 illustrates an example interface for adding a note at a selected location on an investigation timeline in accordance with the disclosed embodiments.
Figure 22:
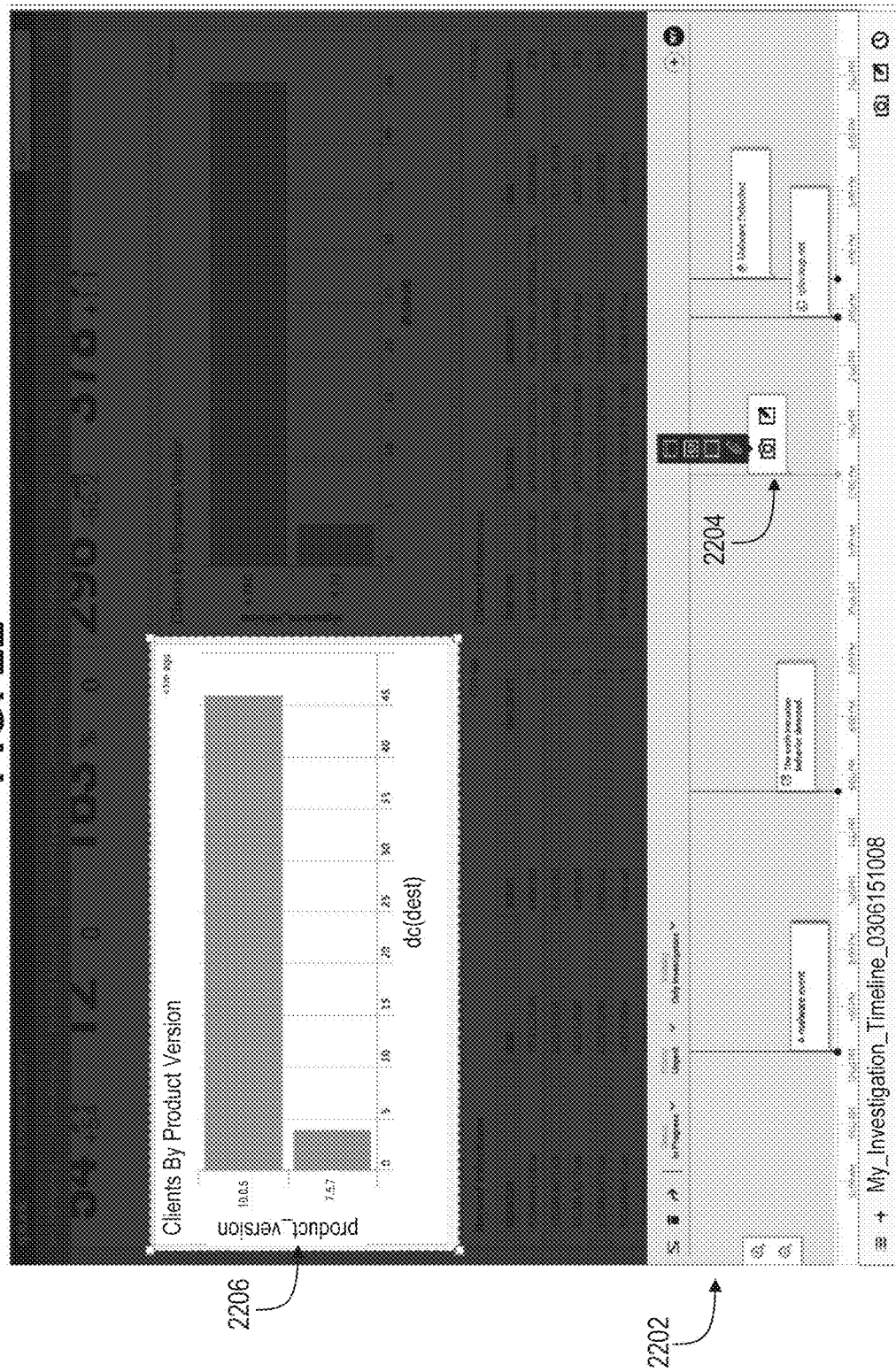
FIG. 22 illustrates an example interface for adding a screenshot at a selected location on an investigation timeline in accordance with the disclosed embodiments.

FIGS. 21 and 22 depict example interfaces for adding a note or screenshot at a particular location on an investigation timeline. In FIG. 21, for example, an investigation timeline panel 2102 includes a user-generated event indication 2104, which includes separate selectable icons for creating a note or a screenshot. The user-generated event indication 2104 may be displayed, for example, in response to a user selecting a particular point on the timeline of the displayed investigation timeline panel 2102. For example, a user may desire to record a note or screenshot related to one or more temporally proximate events on the timeline, or associate a previously created note or screenshot (e.g., using the notes or screenshot module described above in reference FIGS. 16 and 17) with a particular timeline location.

FIG. 22 illustrates an example interface for adding a screenshot at a selected location on an investigation timeline. Similar to FIG. 21, an investigation timeline panel 2202 includes a user-generated event indication 2204, which a user may use to indicate a desire to add a screenshot at the selected location on the investigation timeline. A screenshot bounding box 2206 may be provided to enable a user to select a particular portion of a currently displayed interface. For example, a user may desire to save as a screenshot one or more particular dashboard elements, or the user may save an entire display.

Figure 23:
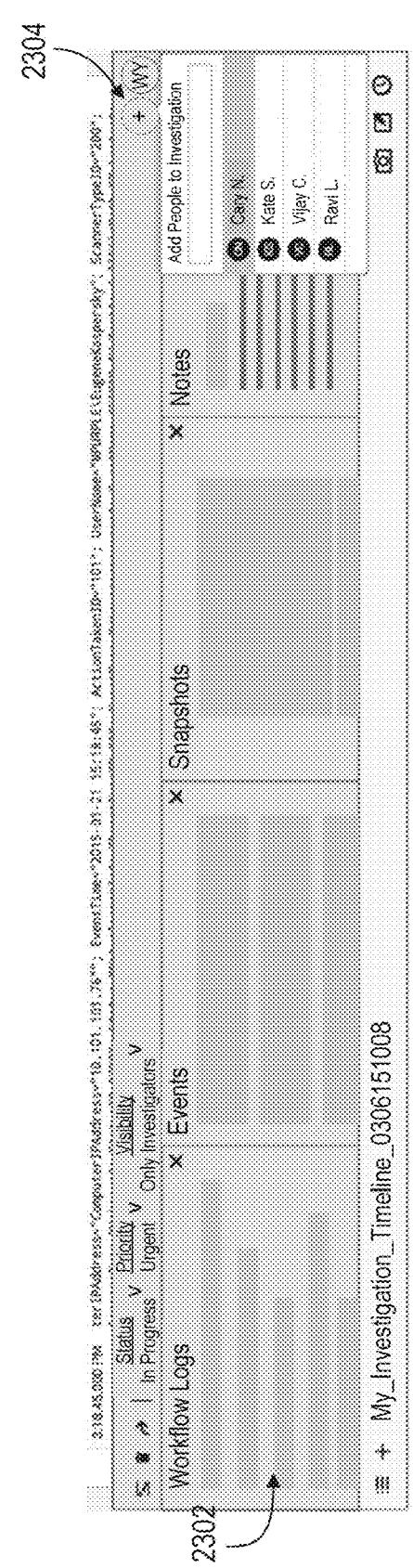
FIG. 23 illustrates an example interface for adding one or more users to an investigation in accordance with the disclosed embodiments.

FIG. 23 illustrates a sample interface for assigning one or more users to an investigation. In an embodiment, assigning a user to a particular investigation timeline generally may grant the user permission to view and modify the investigation timeline, although various permission levels are possible. For example, certain users may be assigned to a particular timeline with view-only permissions, while others may be permitted to view and modify the timeline. Further, permissions may be set that allow or disallow users from assigning additional users to a particular investigation.

In FIG. 23, an investigation timeline panel 2302 includes analyst assignment icons 2304, which generally may enable a user to add or remove other users' access to the particular timeline. For example, if a user selects a particular analyst assignment icon 2304, the user may be presented with a searchable list of other users of the network security application who may be added to the investigation timeline. Analyst icons 2304 may further display graphical indications representing each user currently assigned to the timeline, for example, and provide the ability to select particular users for removal.

As described above in reference to FIGS. 19-23, a network security application may provide any number of mechanisms for adding network events, workflow events, and other information to an investigation timeline. When viewing a particular investigation timeline, or when viewing a particular event, it may often be useful to be able to navigate from one to the other. For example, an analyst may be viewing a particular timeline and desire more information about a particular event displayed on the timeline. In one embodiment, in response to receiving input from the user requesting additional information about an event displayed on a time, a network security application may be configured to cause display of an interface providing information about the selected event. For example, a user may select a particular graphical indication of an event displayed on a timeline panel and, in response, an interface may be displayed with detailed information about the event, such as the detailed event display 1904 of FIG. 19. Similarly, a user viewing a particular event of interest in a dashboard or other interface may select an interface element that causes display of one or more timelines with which the event is associated, if any.

Figure 24:
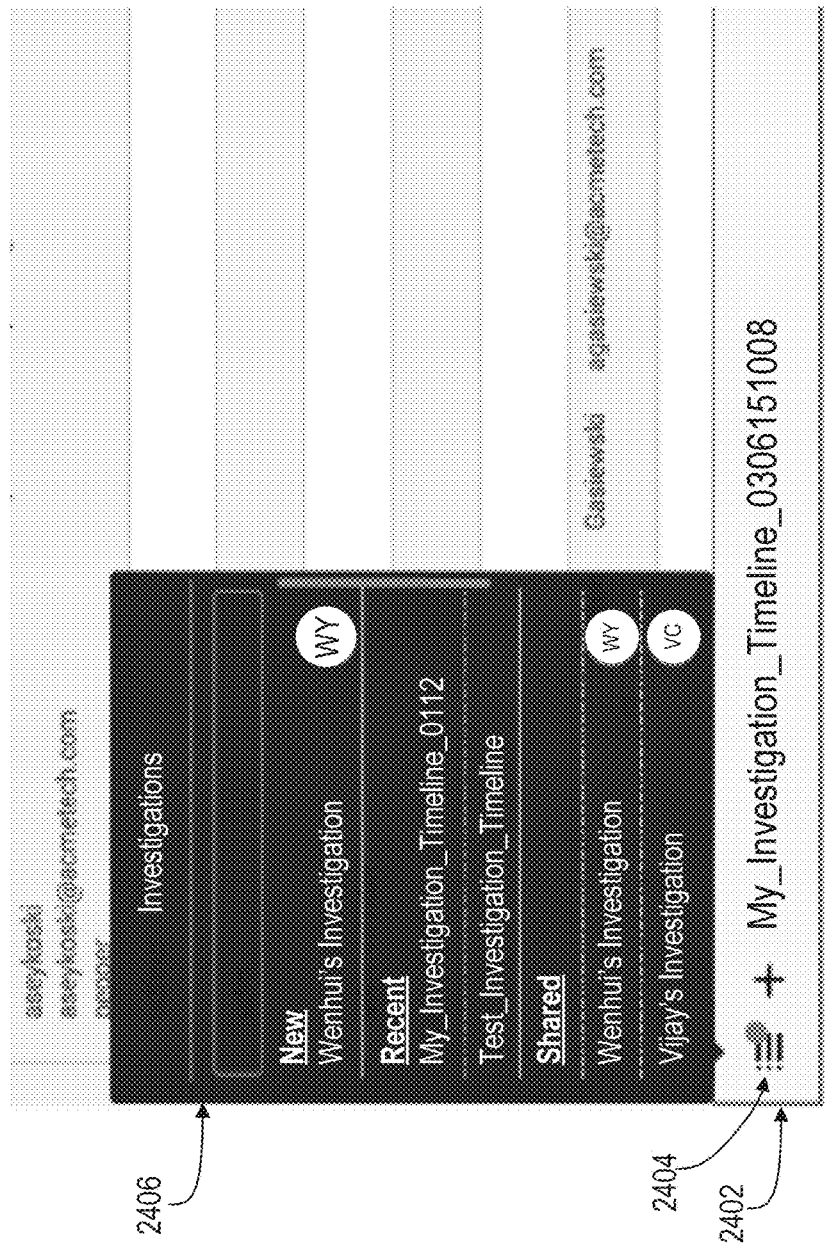
FIG. 24 illustrates an example interface for displaying a list of investigations to which a particular user is assigned in accordance with the disclosed embodiments.

FIG. 24 illustrates an example interface for displaying a list of investigations to which a particular user is currently assigned. In FIG. 24, an investigation panel 2402 is currently displayed in a collapsed state, without display of an associated timeline panel above the investigation panel 2402. In one embodiment, investigation panel 2402 includes an investigation list button 2404 that is configured to display a timeline list panel 2406 upon user selection. In an embodiment, a timeline list panel 2406 generally is configured to display a list of investigation timelines to which the user is currently assigned, for example, either because the user created the investigation timelines or was assigned to the timelines by another user. In an embodiment, a user may select a particular investigation timeline from the list displayed in the panel 2406 to cause the selected timeline to become the active timeline, meaning the timeline is displayed for the user in a timeline panel when requested. In this manner, a user can easily toggle between two or more investigation timelines to which the user is currently assigned.

Figure 25:
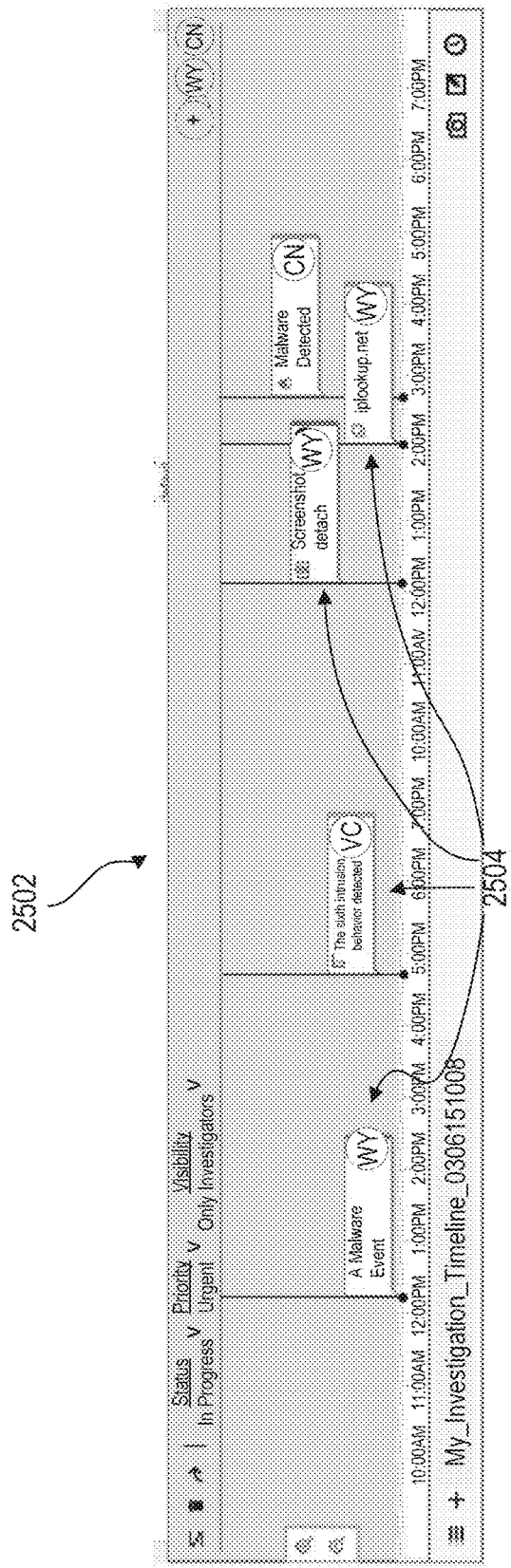
FIG. 25 illustrates an interface displaying an investigation timeline, where the investigation timeline includes multiple event types in accordance with the disclosed embodiments.

FIG. 25 illustrates an interface displaying an investigation timeline, where the investigation timeline includes multiple types of events displayed on the same timeline. In FIG. 25, an investigation timeline panel 2502 is displayed including several graphical indications of events 2504. In an embodiment, each of the graphical indications of events 2504 includes various graphical elements that provide information about the event, including a type of event (e.g., a network event, workflow event, note, screenshot, etc.), a label for the event, and one or more users associated with the event (e.g., a user that selected a particular network event for addition to the timeline, a user associated with a particular workflow event, a user that created a particular note or screenshot, etc.). For example, each of the graphical indications of events 2504 may be displayed using a different color and/or shape depending on a type of event. As another example, each of the graphical indications may include a user's initials or other indication of the user associated with the event.

Figure 26:
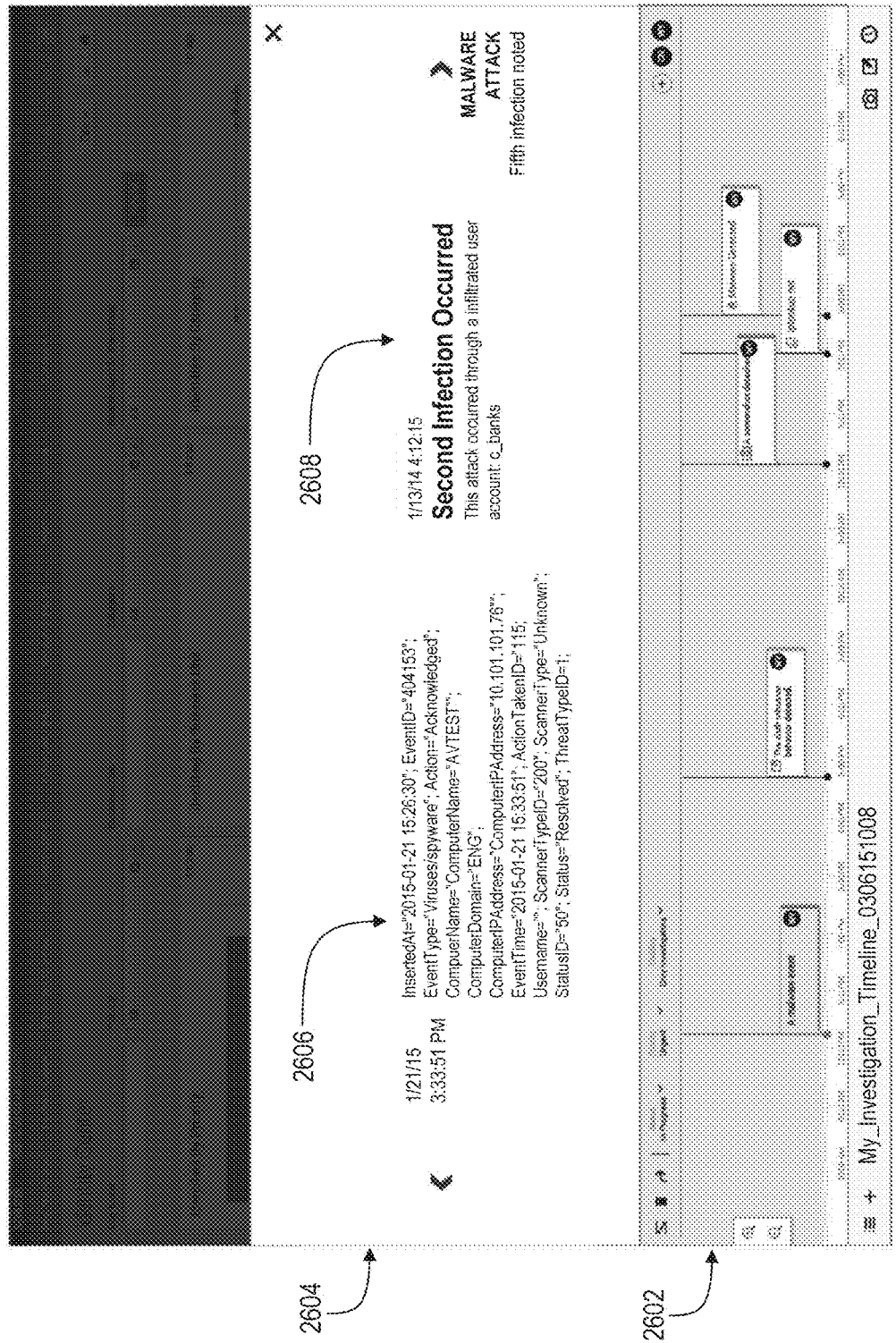
FIG. 26 illustrates a storyboard interface for displaying events associated with a particular investigation timeline in accordance with the disclosed embodiments.

In one embodiment, the events associated with a particular investigation timeline may be displayed in one or more alternative formats. As one example, a network security application may be configured to display a "storyboard" representation of an investigation timeline, enabling users to progress through a display of detailed information about each event of an investigation timeline in an order based on the display of the events in the timeline. FIG. 26 illustrates an investigation timeline displayed in conjunction with an investigation storyboard. In FIG. 26, for example, an investigation timeline panel 2602 is displayed adjacent to a corresponding storyboard panel 2604. Although both of the investigation timeline panel 2602 and the storyboard panel 2604 are displayed on the same display in FIG. 26, in other examples each of the panels may be displayed independently from one another.

In an embodiment, a storyboard panel 2604 generally may enable a user to progress through a series of events associated with a particular investigation timeline in a chronological fashion, for example, by clicking on the arrows on the left and right sides of the storyboard panel 2604. This view may assist a user reviewing the events of a particular investigation timeline by providing an interactive "story" of the events associated with a particular investigation. When a particular event is focused in the storyboard panel 2604, for example, the corresponding event may be highlighted or otherwise noted in the investigation timeline panel 2602. Similarly, if input is received selecting a particular event displayed on the investigation timeline panel 2602, a detailed view of the event may be displayed in the storyboard panel 2604.

In an embodiment, a storyboard panel 2604 generally may include an event information region 2606 that displays detailed information about the particular event. For example, the information displayed about a particular event may include timestamp information, some or all of the raw data associated with the events, and other information. A storyboard panel 2604 may further include user-annotated information about particular events, including a label for the event, notes about the particular event, and other information. For example, a user may select user annotation region 2608 to create or modify one or more annotations for a currently displayed event. Separate timestamp information may be recorded for user annotations indicating when a user provided a particular annotation and/or when the annotation information was last updated.

Figure 27:
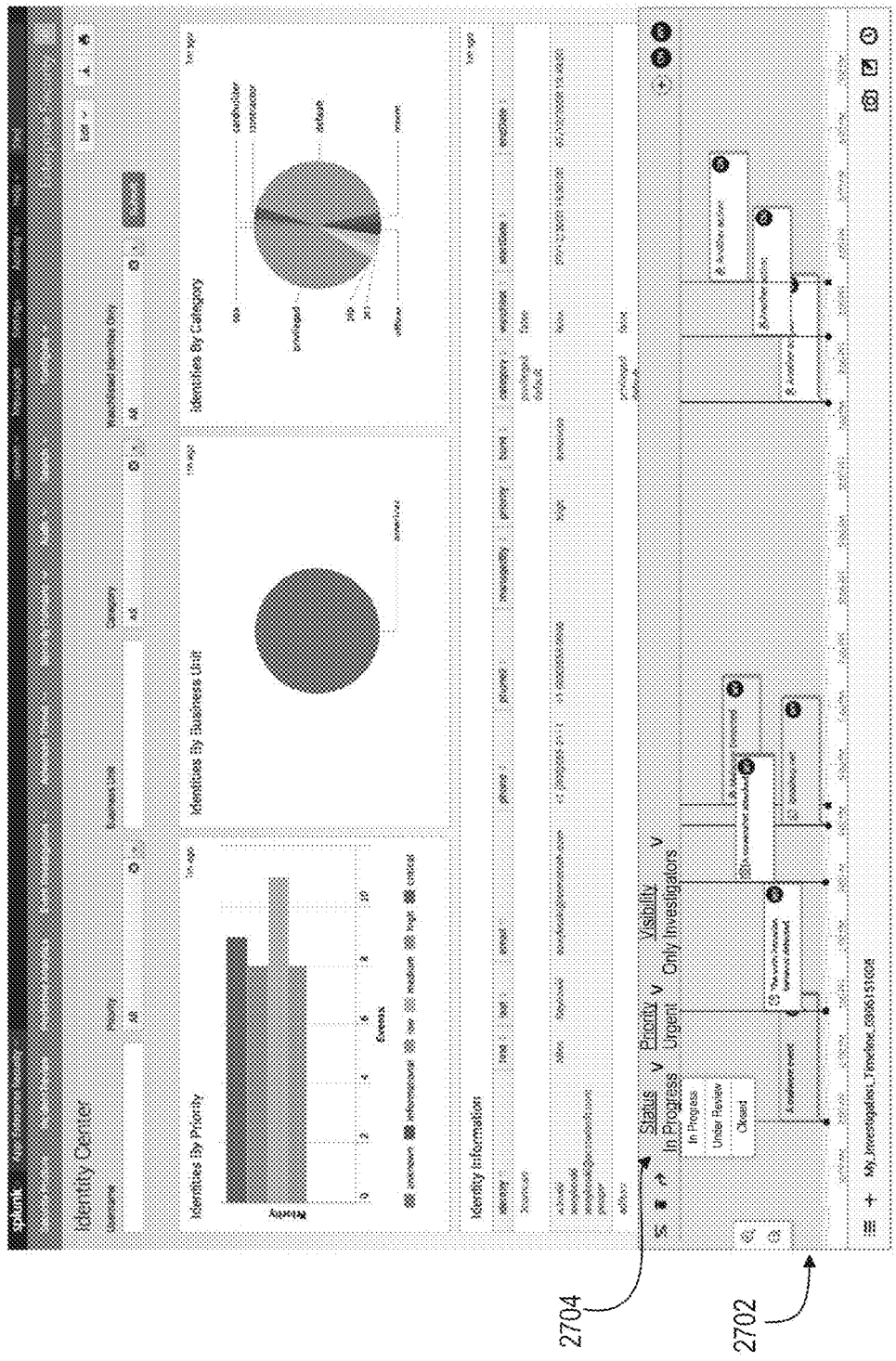
FIG. 27 illustrates an interface element for assigning an investigation status to an investigation timeline in accordance with the disclosed embodiments.
Figure 28:
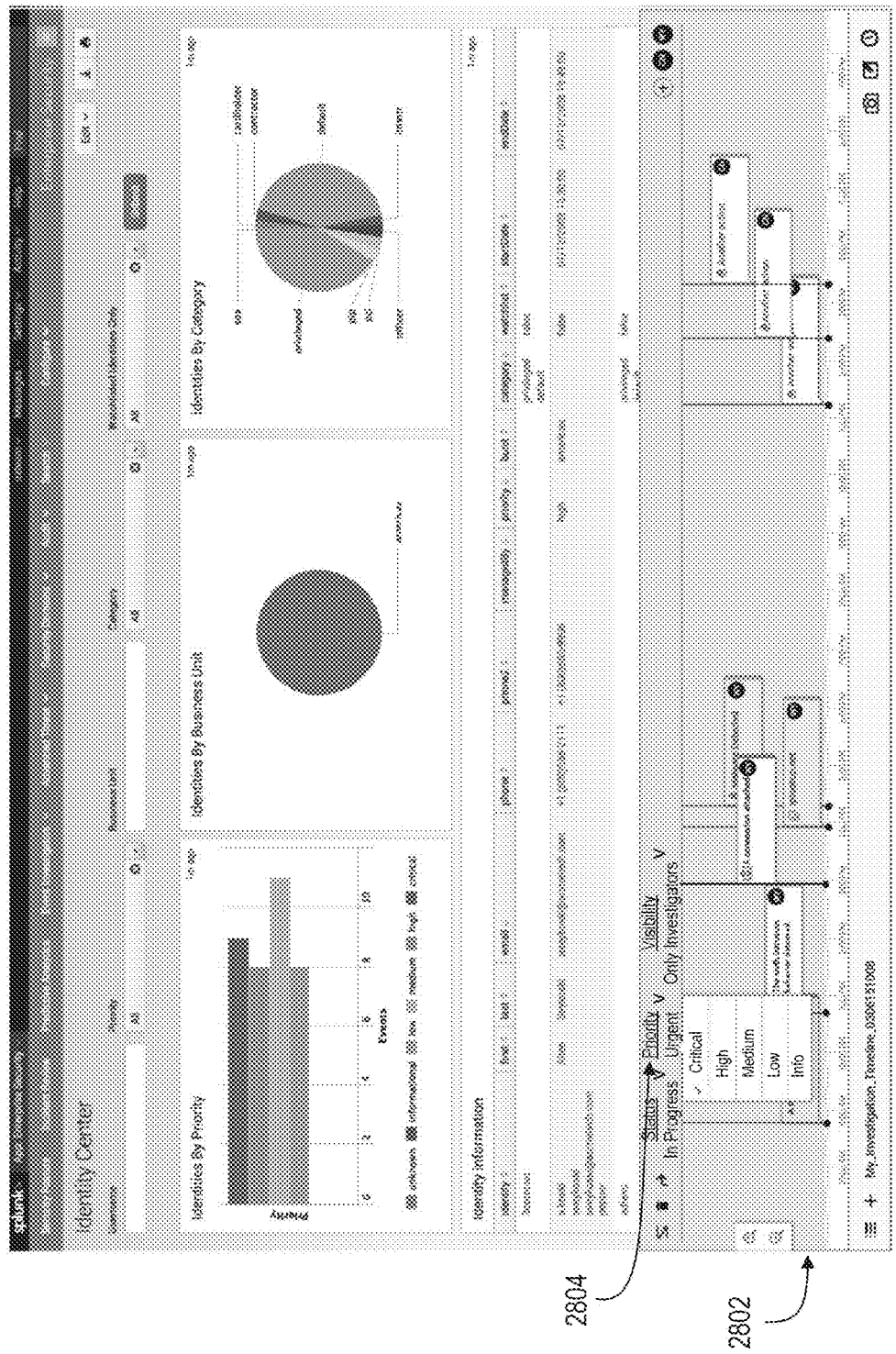
FIG. 28 illustrates an interface element for assigning an priority level to an investigation timeline in accordance with the disclosed embodiments.
Figure 29:
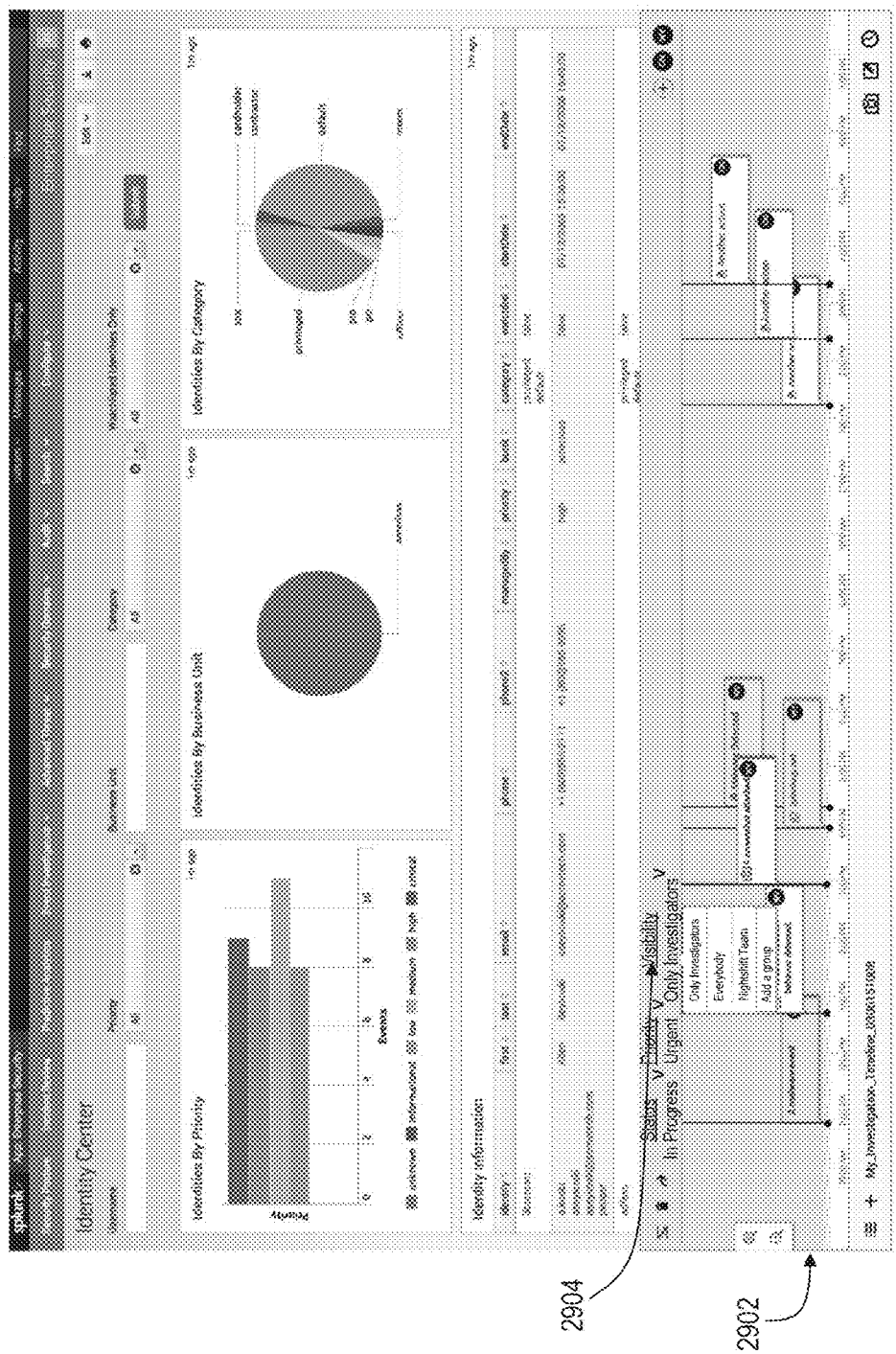
FIG. 29 illustrates an interface element for selecting visibility access controls for an investigation timeline in accordance with the disclosed embodiments.

FIGS. 27-29 each illustrate various interface elements of an investigation timeline panel that enable a user to specify information about an investigation associated with the displayed timeline, including an investigation status, priority level, and visibility level. As described in more detail in reference to an investigation management console described in Section 3.3, the provided information generally may enable a network security manager or other user to better categorize, prioritize, staff, and review a number of currently ongoing investigations.

FIG. 27 illustrates an interface element for assigning an investigation status to an investigation timeline. In FIG. 27, an investigation timeline panel 2702 is displayed and includes an investigation status selector 2704. A user may use an investigation status selector 2704, for example, to assign a particular completion status (e.g., in progress, under review, closed) to an investigation associated with the displayed investigation timeline. The ability for a particular user to change the investigation status for a particular investigation timeline and to change other investigation status information described in FIGS. 28 and 29 may depend on whether the user has permission to modify information about the investigation.

FIG. 28 illustrates an interface element for assigning a priority level to an investigation timeline. In FIG. 28, an investigation timeline panel 2802 includes a priority level selector 2806. For example, a user may use priority level selector 2806 to assign a particular priority level (e.g., critical, high, medium, low, info) to the investigation associated with the displayed investigation timeline. A priority level associated with each investigation may be used, for example, to assist a network security manager or other user in prioritizing investigations for completion and to decide which and how many analysts to assign to particular investigations.

FIG. 29 illustrates an interface element for selecting visibility access controls for an investigation timeline. In FIG. 29, an investigation timeline panel 2902 includes a visibility level selector 2904. In an embodiment, a user may use the visibility level selector 2904 to specify a user or group of users that are permitted to view the associated investigation timeline.

Figure 30:
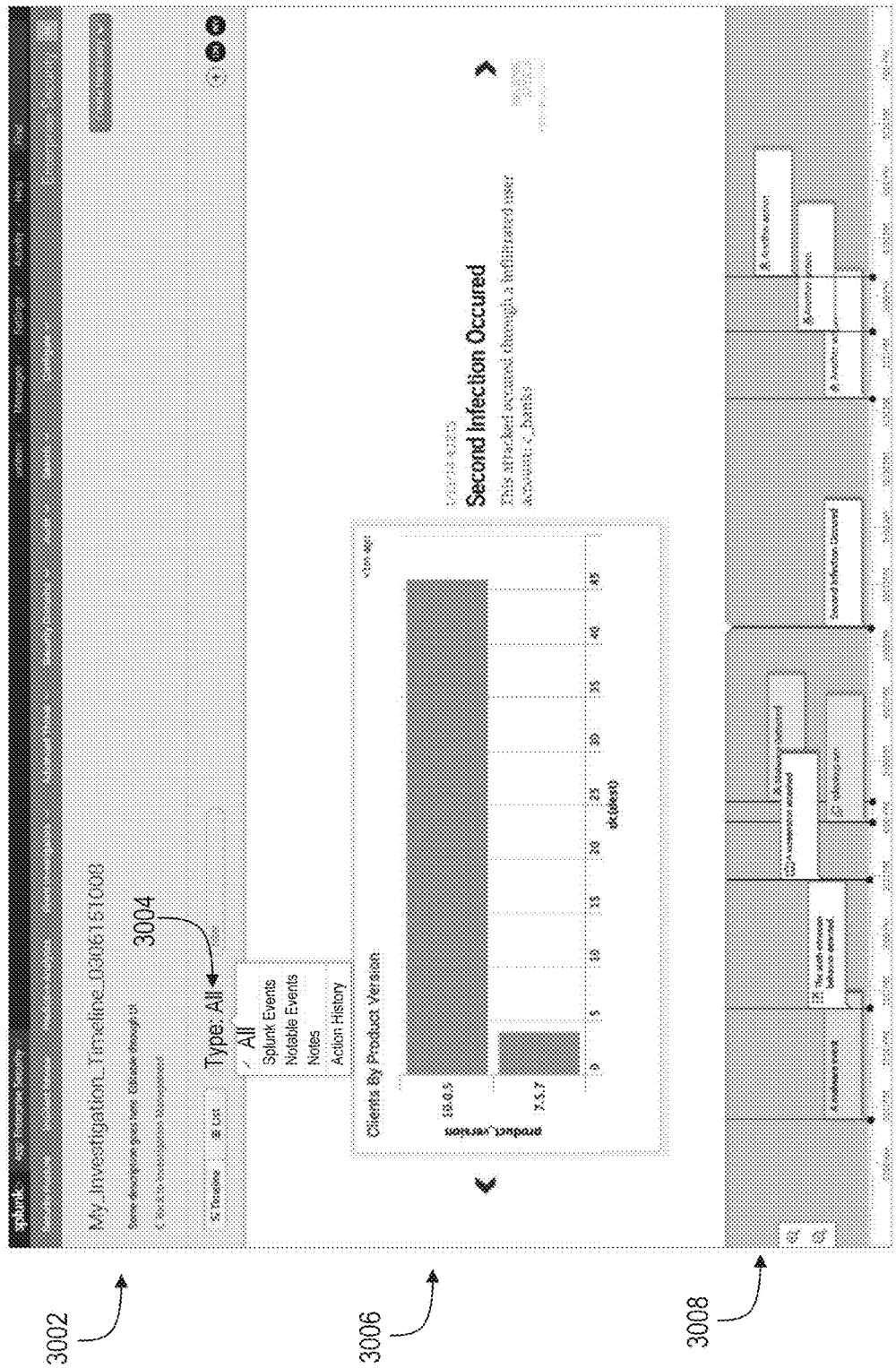
FIG. 30 illustrates an investigation timeline-specific interface in accordance with the disclosed embodiments.

FIG. 30 illustrates an investigation timeline-specific interface. In an embodiment, an investigation timeline-specific interface 3002 may, for example, provide various different views of a particular investigation timeline, including a storyboard view (as illustrated in FIG. 26), and an event list view. An investigation timeline-specific interface 3002 may further provide one or more interface components for filtering a set of events currently displayed on an investigation timeline. For example, a user may use an event type filter 3004 to specify particular types of events (e.g., all events, network events, notable events, user-generated notes and screenshots, and workflow events) to display on an associated investigation timeline. A user may use an event type filter 3004, for example, to generate different displays of a particular investigation timeline without actually adding or removing any of the associated events from the timeline. In FIG. 30, for example, an investigation timeline is displayed in a storyboard format in panel 3006, with a corresponding timeline view displayed in panel 3008.

Figure 31:
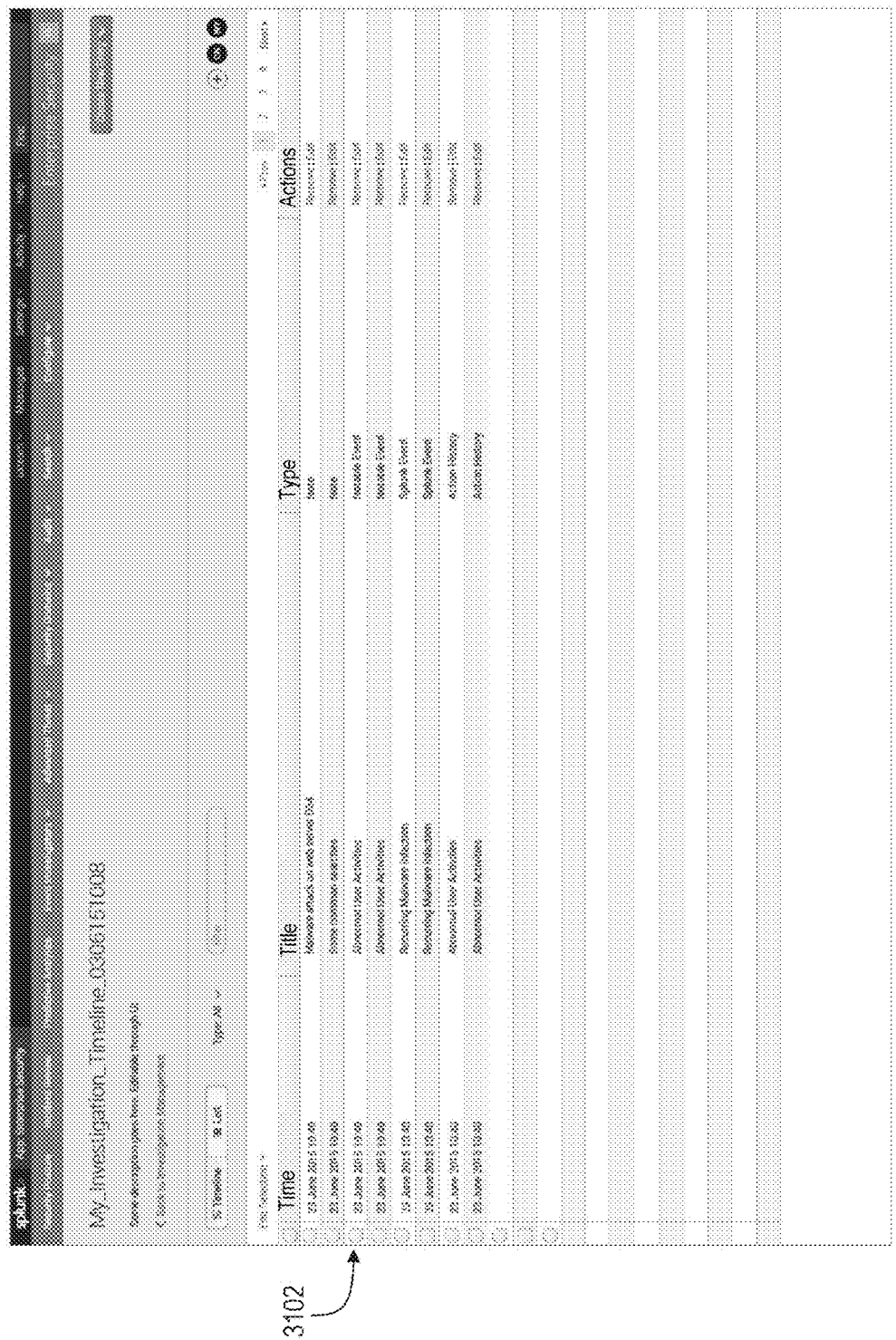
FIG. 31 illustrates an interface for displaying events associated with a particular investigation timeline as a list in accordance with the disclosed embodiments.

FIG. 31 illustrates an event list display for a collection of events associated with a particular timeline. For example, an event list 3102 may display in table form a list of the events associated with a particular investigation timeline, enabling users to sort the events associated with an investigation timeline based on various event attributes (e.g., timestamp information, event label, event type, etc.). In an embodiment, a user may use an event list 3102 to select one or more events for removal from the associated timeline, or to perform other operations on selected events.

In the previous examples, the investigation timelines generally displayed a separate graphical indication for each event associated with the span of the timeline currently in view. However, in some instances, many events associated with a timeline may be associated with a relatively short period of time. In these instances and at particular zoom levels of the timeline, the timeline may not have room to accommodate display of the graphical indications representing each of the temporally proximate events. In one embodiment, to facilitate display of a large number of events that may occur relatively close in time to one another, generation of a timeline view may include grouping two or more events into a single graphical indication.

Figure 32:
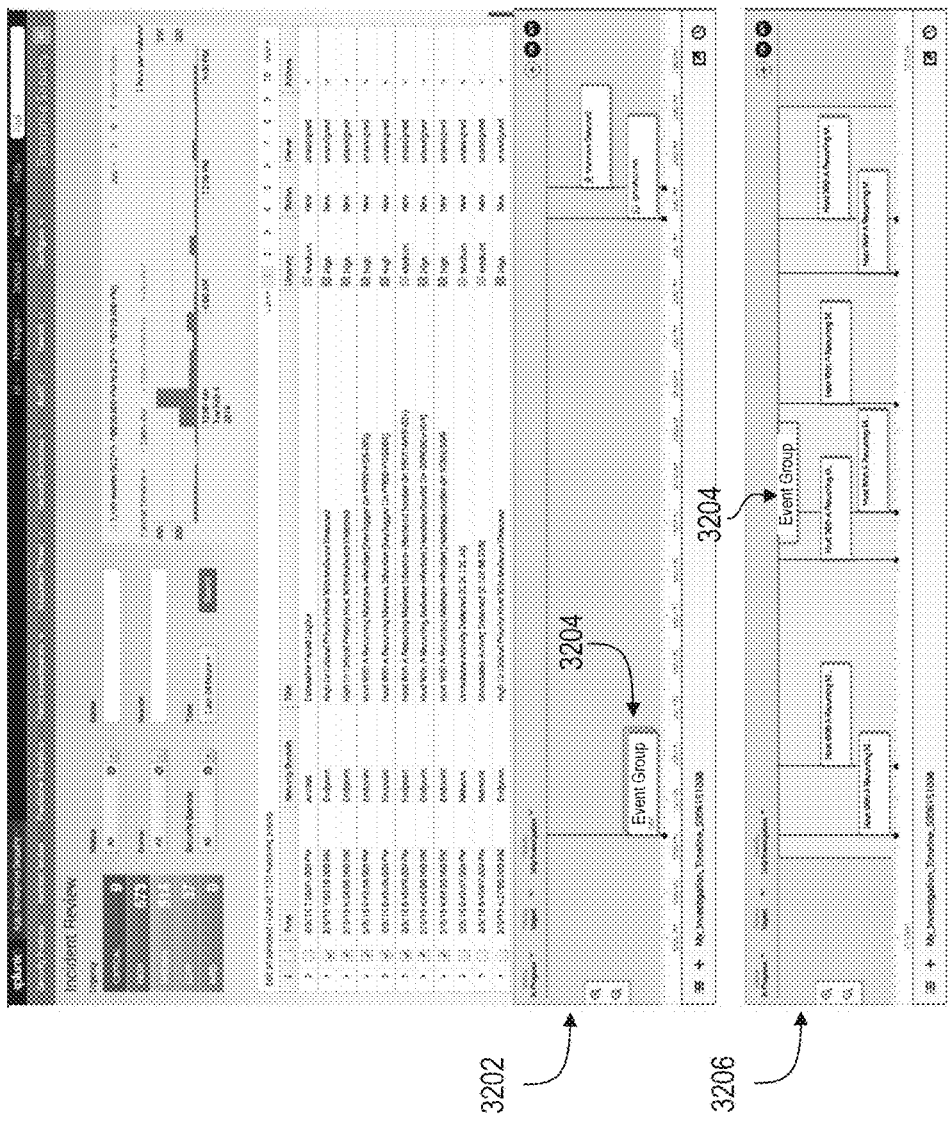
FIG. 32 illustrates grouping event graphical indications based on a timeline zoom level in accordance with the disclosed embodiments.

FIG. 32 illustrates displaying a group of events based on a timeline zoom level. In FIG. 32, an investigation timeline 3202 is displayed, including a number of graphical event indications at various points on the timeline, including an event group 3204. In an embodiment, whereas other events on the timeline are displayed using a single graphical flag, an event group 3406 is displayed as a stacked group of flags to indicate that the graphical indication represents more than one event. The events may be grouped, for example, because at the current zoom level of the timeline, display of the events individually may otherwise result in an overly cluttered display of the events. In general, any type of graphical representation may be used to indicate that a particular graphical indication on a timeline represents an event group.

As indicated above, the grouping of particular events displayed on a timeline may depend on a current zoom level of the timeline, and events displayed as a group at one zoom level may be displayed separately at another zoom level. For example, investigation timeline 3206 represents the same investigation timeline 3202 displayed at a different zoom level. For example, a user may have zoomed in on the temporal region surrounding the event group 3206 by clicking on the graphical indication representing the event group 3206, or using the zoom icons. As depicted in the investigation timeline 3206, each of the events of the event group 3204 is now displayed as a separate graphical indication at a separate point along the timeline. If a user later zooms out the timeline display view, the graphical indication representing event group 3204 may re-collapse into a single graphical indication, as depicted in timeline 3202.

3.3. Investigation Management

In an embodiment, in addition to providing interfaces for creating and viewing individual investigation timelines, a network security application may provide one or more interfaces for managing and viewing information related to any number of ongoing and/or completed investigations. One example of an interface for displaying information about a plurality of investigations is referred to herein as an investigation management console. In general, a management console may provide a single interface in which an analyst, network security team manager, or other user can easily view the status of a plurality of investigations, view aggregate information for the plurality of investigations, and easily navigate between investigations.

Figure 33:
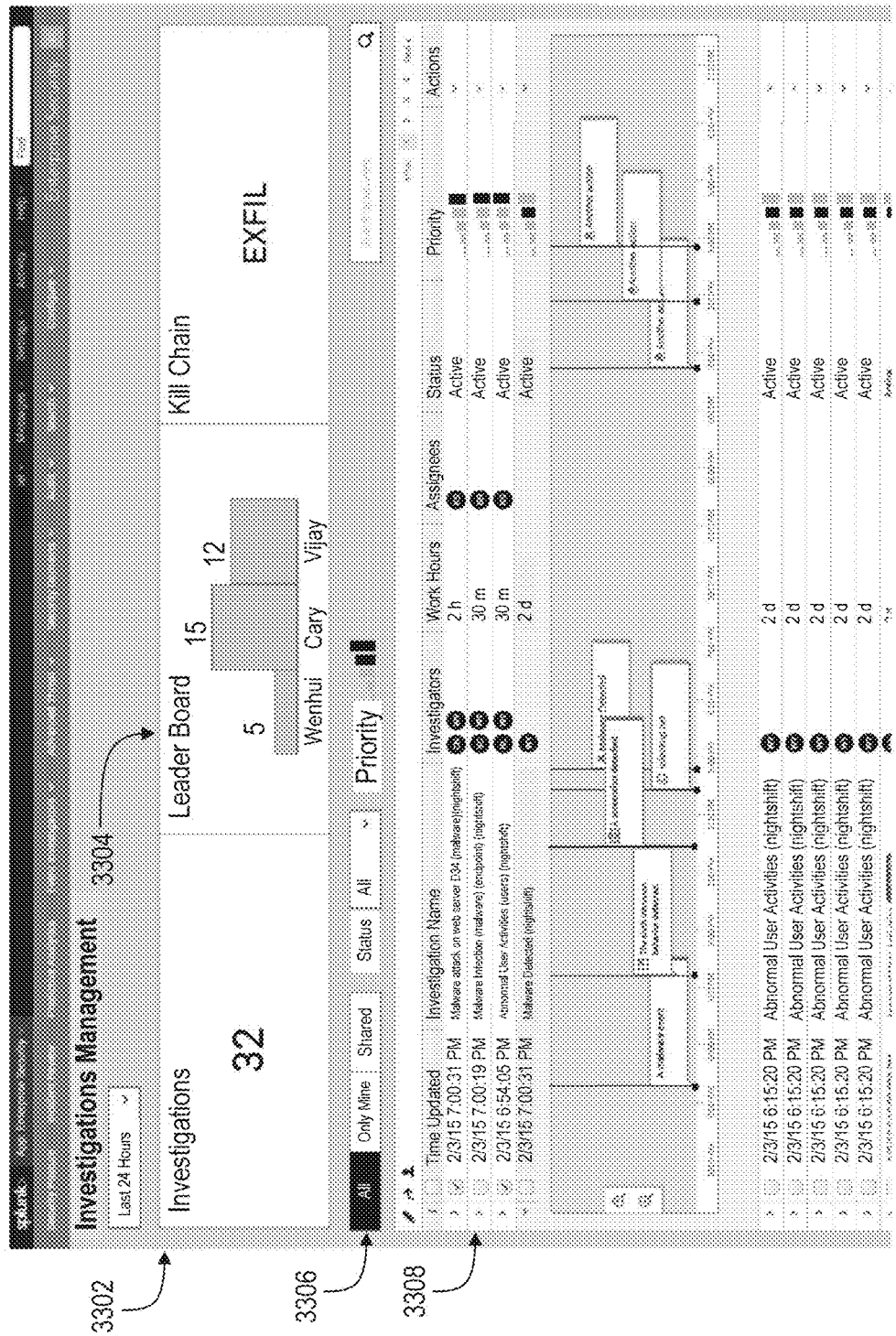
FIG. 33 illustrates an investigations management console in accordance with the disclosed embodiments.

FIG. 33 illustrates an example investigations management console. In FIG. 33, a management console interface 3302 includes an aggregate information panel 3304, one or more investigation filters 3306, and an interactive investigations list 3308.

In one embodiment, aggregate information panel 3304 provides any number of various metrics that may be derived from a set of investigations. In FIG. 33, for example, aggregate information panel 3304 includes a metric indicating a total number of active investigations, a leaderboard tracking a number of investigations completed by different analysts, and a "kill chain" metric. In this context, a kill chain generally refers to an estimated overall health of a computer network based on a stage associated with one or more individual network security incidents. In one embodiment, a kill chain metric may be derived based on calculating a stage associated with each individual investigation timeline stored by the security application, and taking an average of the associated stages.

In an embodiment, an interactive investigations list 3308 provides a table display of any number of investigations, which may be sorted and filtered based on desired criteria. For example, a user may use one or more investigation filters 3306 to filter the displayed list of investigations based on which users are assigned to each investigation, based on a status associated with each investigation, based on a priority level associated with each investigation, or based on a keyword search. Furthermore, an investigations list 3308 may be sorted, for example, based on various attributes associated with each investigation including a creation date, a last update date, an investigation label, users assigned to each investigation, investigation statuses, investigation priority levels, etc.

Figure 34:
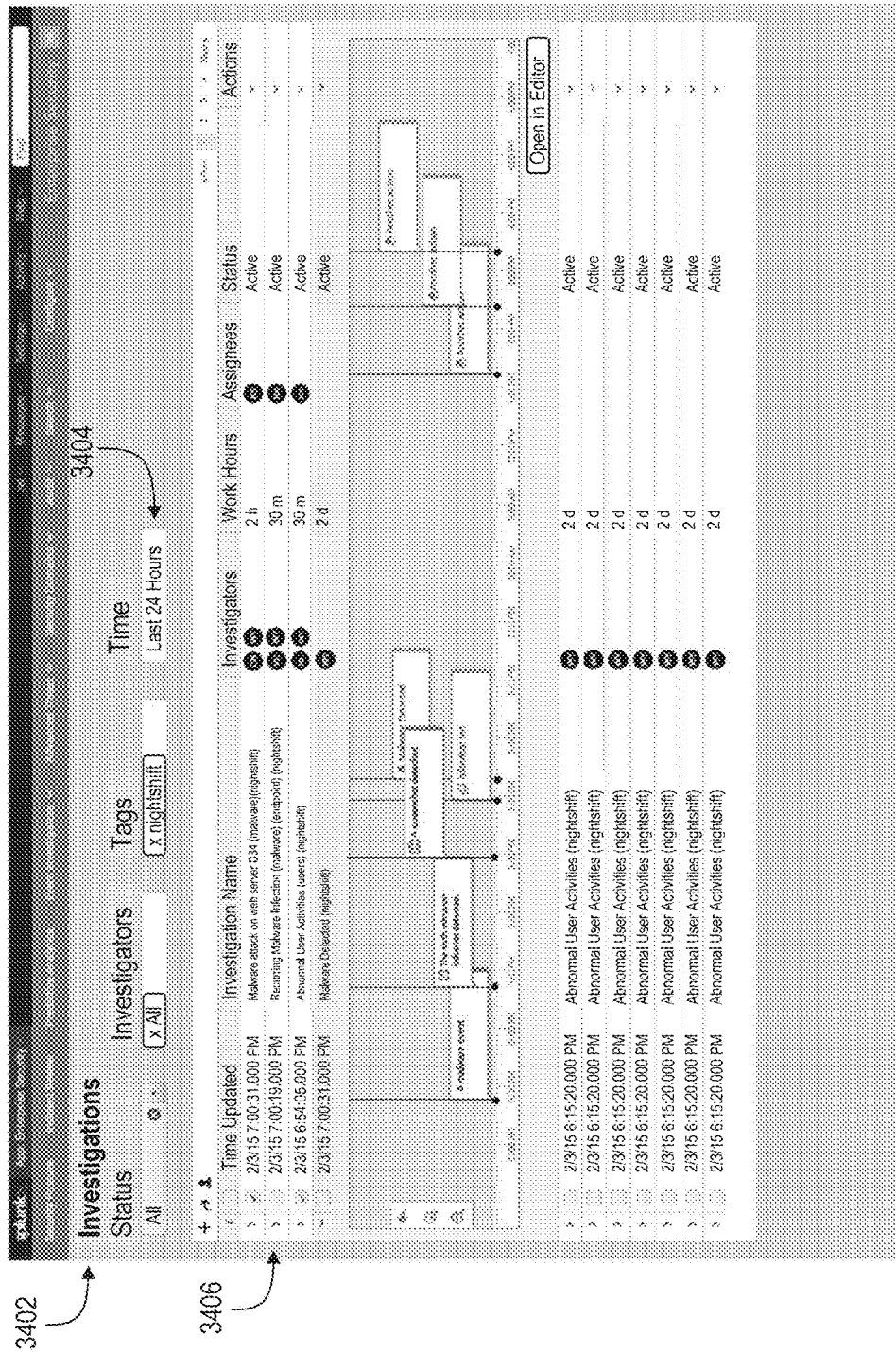
FIG. 34 illustrates a search interface for an investigations management console in accordance with the disclosed embodiments.

In one embodiment, a user may search for particular investigation timelines based on various search parameters. FIG. 34 illustrates an interface for searching for investigations. In FIG. 34, an investigations search interface 3402 includes search parameter inputs 3404 and results list 3406.

In an embodiment, search parameter inputs 3404 generally include various interface elements for a user to provide various search parameters to narrow a search for particular investigations. Examples of search parameter inputs 3404 include an input element to select particular investigation statuses (e.g., active, completed, deferred, etc.), an input element to select particular analysts or groups of analysts assigned to investigations, an input element to specify one or more tags associated with investigations, and an input element to specify one or more timeframes (e.g., last 24 hours, last week, last year, etc.) associated with investigations (e.g., created date, last updated date, completed date, etc.)

Figure 35:
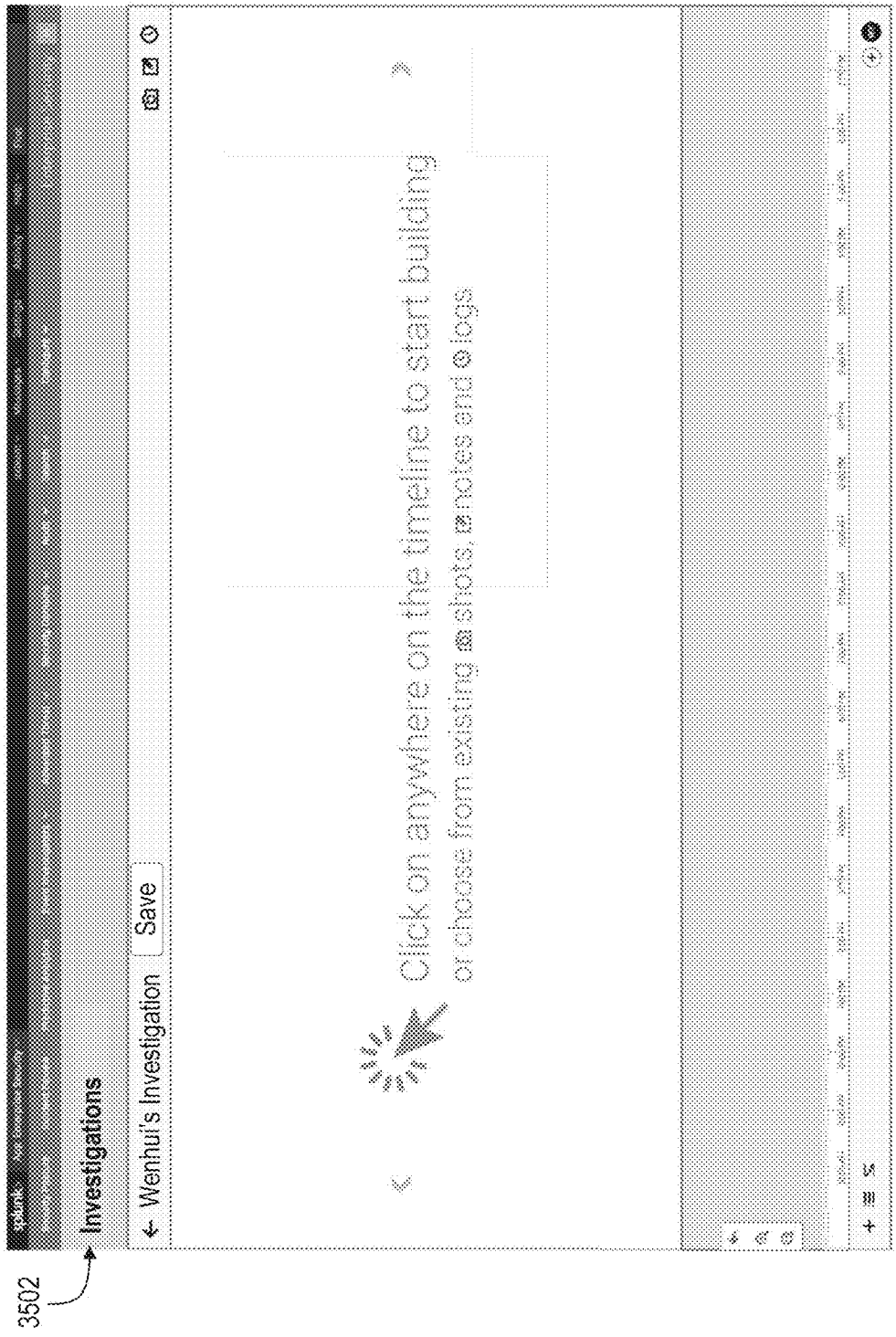
FIG. 35 illustrates a canvas for refining an investigation timeline in accordance with the disclosed embodiments.

In one embodiment, individual investigations displayed in a management console list or elsewhere may be selected for refinement in a dedicated investigation timeline display. For example, FIG. 35 illustrates a canvas for refining an investigation timeline. In an embodiment, an investigation timeline canvas interface 3502 may provide a full screen display of a particular investigation timeline and associated events. For example, a user may use a timeline canvas interface 3502 to add to or remove particular events from a timeline, modify the location or information associated with existing timelines, and/or perform other timeline operations in a larger, dedicated interface.

Figure 36:
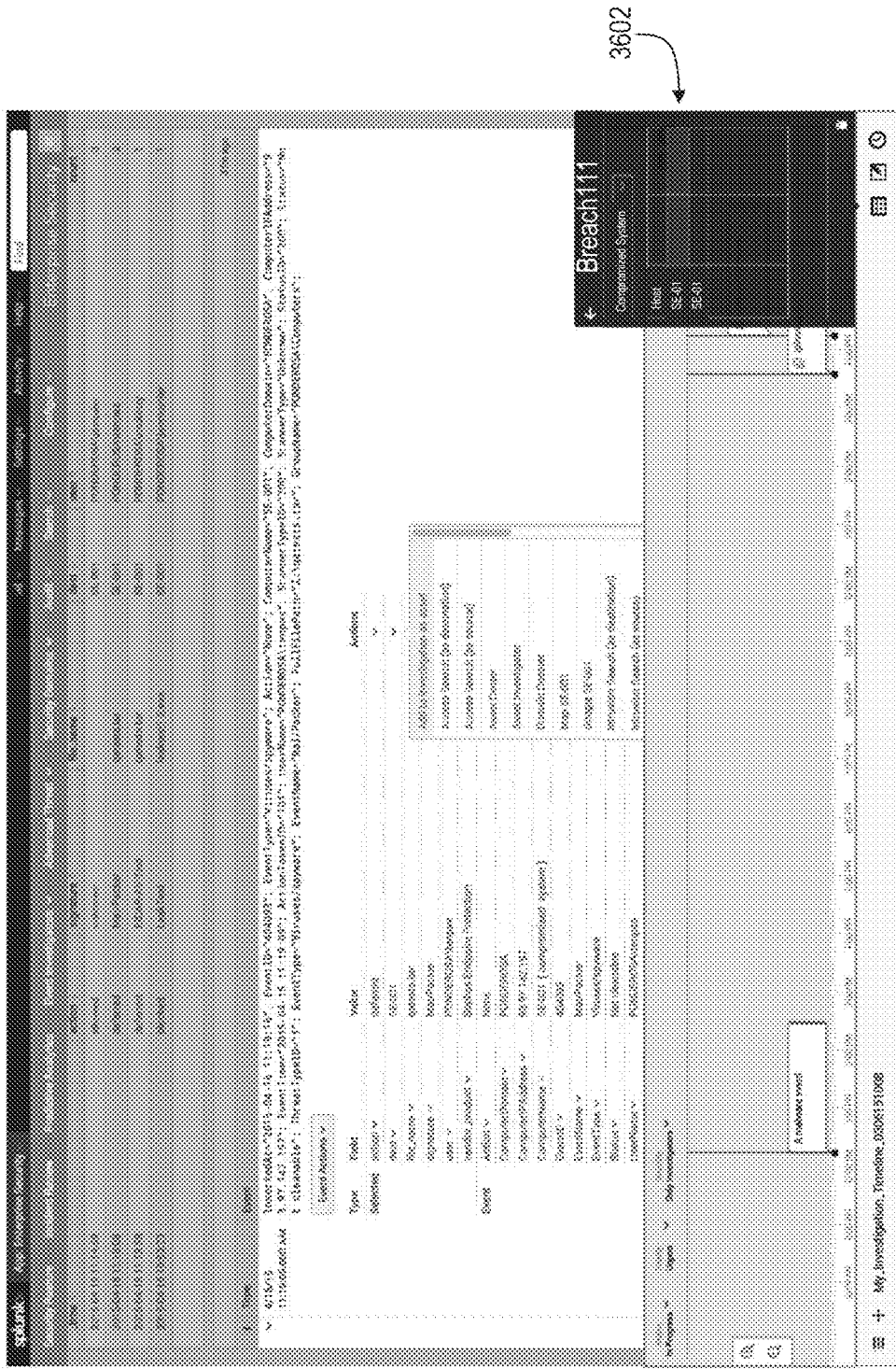
FIG. 36 illustrates an interface for adding an asset to an investigation in accordance with the disclosed embodiments.
Figure 37:
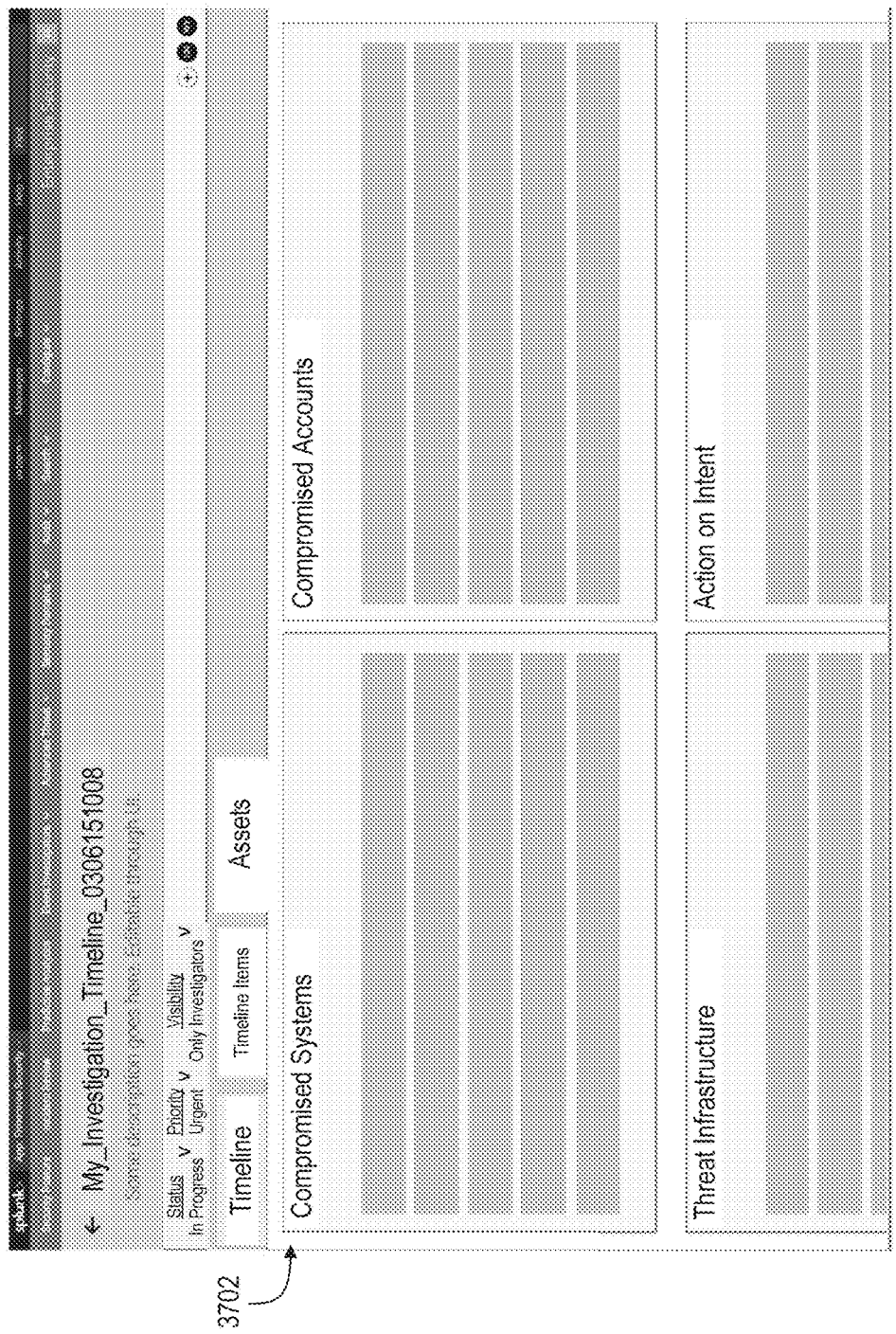
FIG. 37 illustrates an interface for displaying investigation timeline assets in accordance with the disclosed embodiments.

FIG. 36 illustrates an interface for adding an asset to an investigation. For example, an asset generally may represent a component associated with a particular computer network such as, for example, a host device, user account, or other computer network component. A particular asset may, for example, be associated with one or more events of an investigation timeline. For example, if one particular event associated with an investigation timeline represents a security access violation, an asset associated with that event may include a compromised user account associated with the security access violation. In an embodiment, an asset panel 3602 may include one or more interface components for adding, removing, or modifying assets associated with a particular investigation timeline. Similarly, FIG. 37 illustrates an interface for displaying assets associated with a particular investigation timeline. For example, an asset interface 3702 may include a number of grouped lists of assets, where the groups may correspond to compromised systems, compromised accounts, etc.

4.0. Implementation Examples

4.1. Generating Investigation Timeline Views

Figure 38:
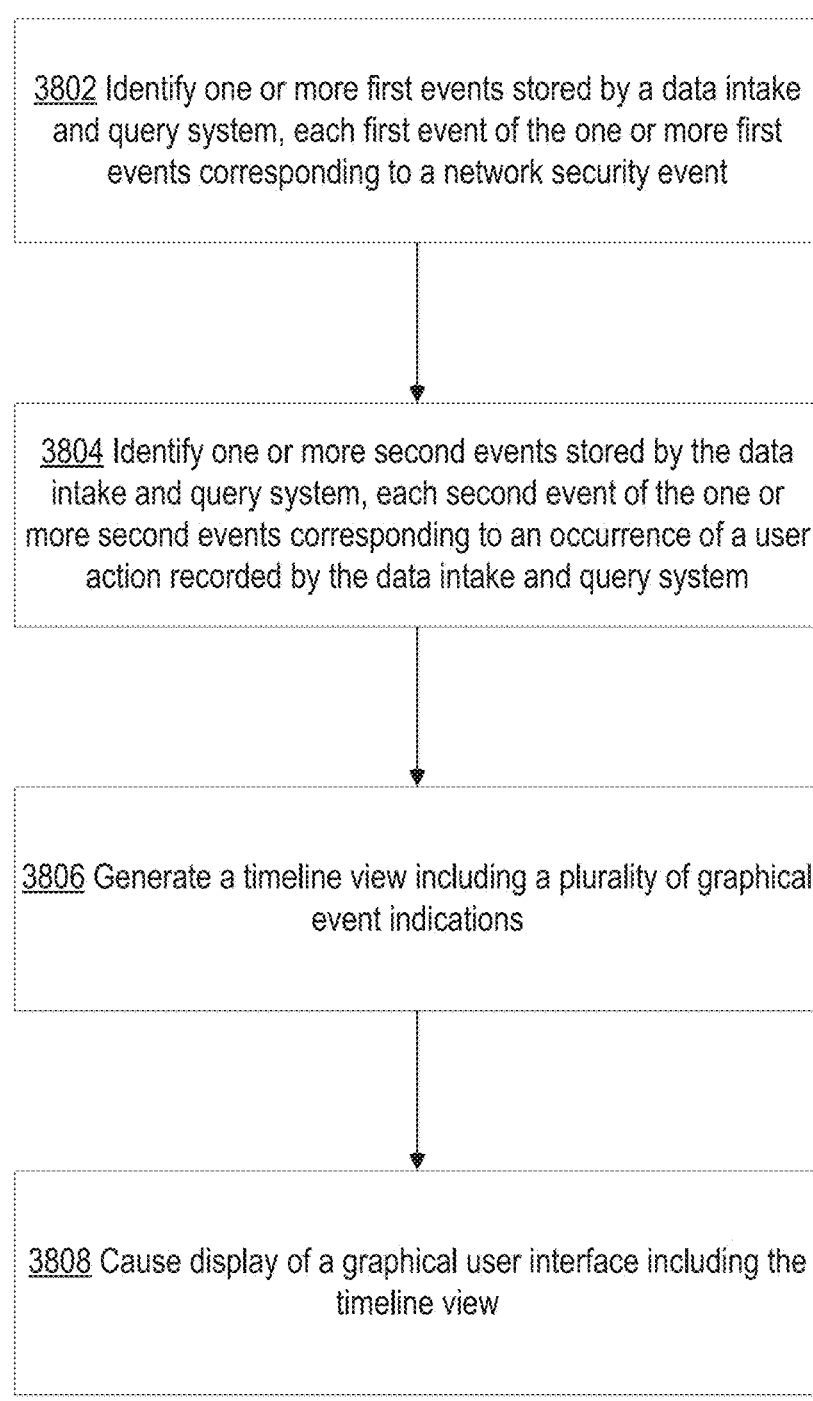
FIG. 38 is a flow diagram that illustrates generation of an investigation timeline display in accordance with the disclosed embodiments.

FIG. 38 illustrates an example flow 3800 for generating an investigation timeline view including a plurality of event indications, according to an embodiment. The various elements of flow 3800 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

At block 3802, one or more first events stored by a data intake and query system are identified, each first event of the one or more first events corresponding to a computer network security event. In general, the identified events may correspond to events for display on an investigation timeline view. For example, a network security application may identify events associated with a particular investigation timeline view in response to a request for display of the investigation timeline (e.g., display of an investigation timeline 1802 in conjunction with a dashboard interface, as illustrated in FIG. 18).

In one embodiment, the identified one or more first events may include network events selected by one or more users for addition to a particular investigation timeline. For example, referring to FIG. 19, a user may be viewing an interface displaying of one or more network events, and the user may select particular network events for addition to a particular investigation timeline (e.g., using an event action button 1906). In an embodiment, the selection of one or more particular events by a user for addition to a particular investigation timeline may include generating a reference to the event data stored by the data intake and query system and which is stored as part of the investigation timeline. In another embodiment, in response to selection of one or more particular events for addition to an investigation timeline, a network security application may create a separate copy of the events for storage in association with the investigation timeline.

In an embodiment, one or more network events associated with an investigation timeline may be added to an investigation timeline automatically. For example, one or more notable events may be automatically associated with a particular investigation timeline based on a severity level or other attributes associated with the notable events. As another example, one or more events may be automatically added to a timeline based on a relationship determined between the automatically added events and one or more events previously selected for addition to the timeline by a user.

At block 3804, one or more second events stored by the data intake and query system are identified, each second event of the one or more second events corresponding to an occurrence of a user action recorded by the data intake and query system. For example, as illustrated by FIGS. 13-15, the one or more second events may include workflow log events selected by a user from a workflow event log for addition to a particular investigation timeline.

In an embodiment, one or more other types of events may be identified for display on an investigation timeline, including one or more notes and/or screenshots created by a user and saved in association with a particular investigation timeline. For example, a user may create and save the notes and/or screenshots in association with a particular investigation timeline using a notes and/or screenshot module, as described in reference to FIGS. 16-17, or by adding the notes and/or screenshots directly to particular locations on an investigation timeline, as described in reference to FIGS. 21-22.

At block 3806, a timeline view is generated including a plurality of graphical event indications, the plurality of graphical event indications including (a) at least one first graphical event indication corresponding to an event from the first events, and (b) at least one second graphical event indication corresponding to an event from the second events. In one embodiment, generating a timeline view may include generating presentation information that specifies one or more graphical indications for display and a location on a timeline where to display the graphical indications. For example, in reference again to FIG. 18, display of an investigation timeline 1802 may be based on presentation information generated by a security application that indicates how and where to display the investigation timeline and various elements thereof. The presentation information generally may include any of, for example, HTML, CSS, graphic images, and/or any other information specifying how to display an investigation timeline at a client device.

In an embodiment, generating the timeline view may include configuring each of the plurality of graphical event indications for display at a location on the timeline view based on a timestamp associated with a respective event. For example, each network event, workflow event, and user-generated event generally may be associated with timestamp data, and a network security application may generate a timeline view such that a graphical indication of each event associated with the timeline is displayed at a location on the timeline corresponding to the event's timestamp data.

At block 3808, a network security application causes a graphical user interface including the timeline view to be displayed. For example, the presentation information indicating one or more graphical indications for display on an investigation timeline, and information indicating a location where to display each graphical indication on the timeline, may be sent to a client device that then displays the timeline according to the presentation information.

In one embodiment, generating a timeline view may include generating a portable representation of the timeline view. For example, a portable representation of a timeline view may comprise any data representation of the investigation timeline that enables the timeline view to be displayed and possibly modified outside of the network security application. One example of a portable representation may include a collection of HTML, XML, image files, etc. that enable users to view an investigation timeline in other applications.

4.2. Generating Workflow Event Log Views

Figure 39:
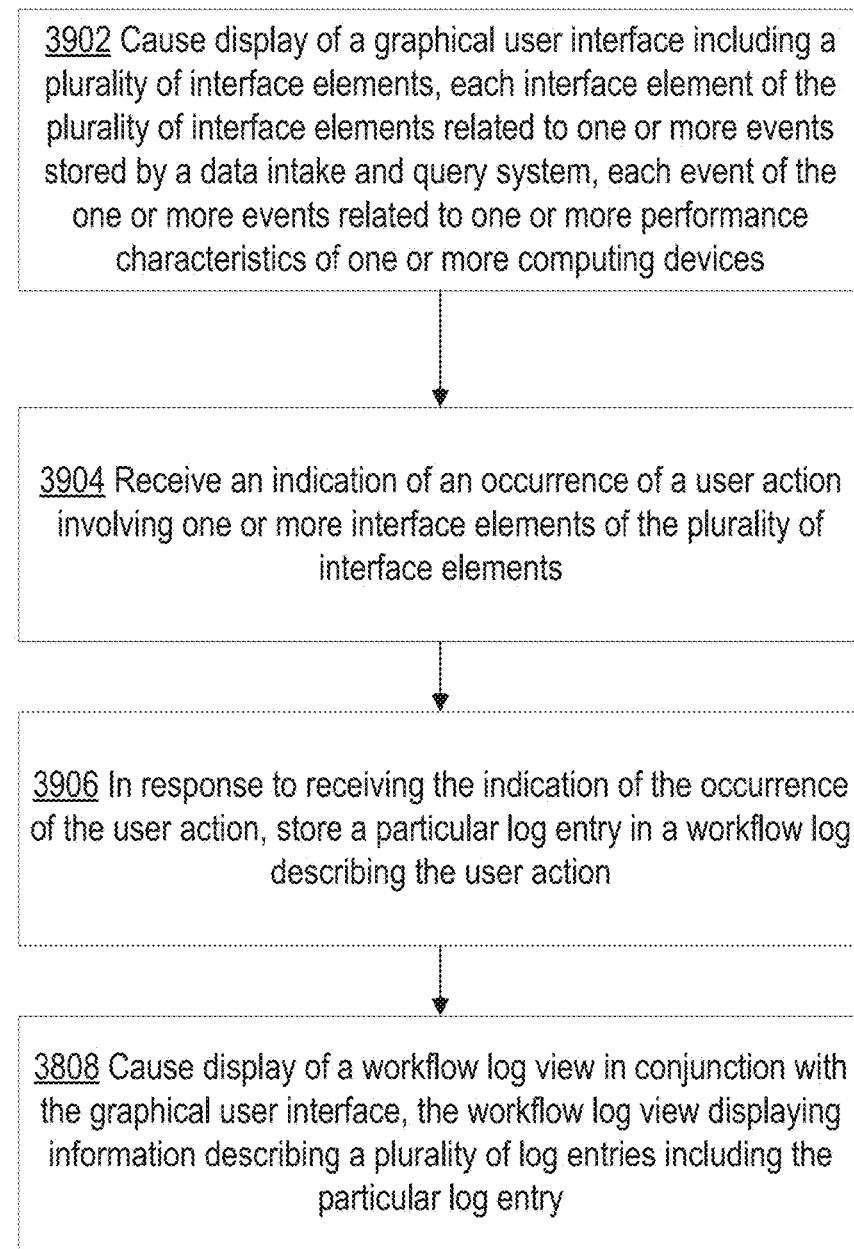
FIG. 39 is a flow diagram that illustrates monitoring and logging investigation workflow events and causing display of a workflow event log view in accordance with the disclosed embodiments.

FIG. 39 is a flow diagram 3900 that illustrates monitoring and logging investigation workflow events and causing display of a workflow event log view, according to an embodiment. At block 3902, a network security application causes display of a graphical user interface including a plurality of interface elements. In an embodiment, each interface element of the plurality of interface elements is related to one or more events stored by a data intake and query system, where each event of the one or more events is related to one or more performance characteristics of one or more computing devices.

In one embodiment, a graphical user interface displayed by the network security application generally may include any dashboard or other interface of a network security application. For example, the interface may be displayed in response to a user selecting a particular dashboard of interest to view while navigating the network security application. An interface element of a graphical user interface may include any aspect of the interface, including a search bar, a data filter, displayed text or icons (e.g., text or icons representing one or more notable events).

At block 4004, an indication of an occurrence of a user action involving one or more interface elements of the plurality of interface elements is received. For example, in response to a user interacting with a particular interface element, the interface element may be configured to cause data to be recorded about the interaction by the network security application. The indication of the occurrence of the user action generally may include, for example, a request generated directly by the user action (e.g., submission of a search query, or a request to view a particular dashboard) or comprise an indication specifically generated to notify the network security application of the action's occurrence (e.g., a trigger associated with an interface element that sends an indication to the network security application in response to a user interacting with the interface element).

At block 4006, in response to receiving the indication of the occurrence of the user action, the network security application stores a particular log entry in a workflow log describing the user action. In an embodiment, information stored as part of a particular log entry may include, for example, an identification of the particular interface element involved in the user action, a time at which the action occurred, an identity of the user causing the action, etc. In general, log entries of a workflow event log may be stored in any format. In one embodiment, workflow log entries may be stored in a format similar to network events, where each workflow log entry is stored as a corresponding "workflow event" by the network security application.

At block 4008, a network security application causes display of a workflow log view in conjunction with the graphical user interface, the workflow log view displaying information describing a plurality of log entries including the particular log entry. In general, display of a workflow log view in conjunction with the graphical user interface may include displaying the workflow log view at a particular location as part of the graphical user interface, displayed overlaying one or more portions of the graphical user interface, or displayed in a separate user interface. For example, in reference to FIG. 13, a network security application may cause display of a workflow log view overlaying one or more dashboards or other interfaces, where the workflow log view displays one or more recorded workflow events. In an embodiment, display of information describing a plurality of workflow log entries may include, for example, an indication of a type of the workflow event, a label for the workflow event, a time at which the workflow event occurred, etc.

4.3. Generating Management Console Views

FIG. 40 is a flow diagram 4000 that illustrates generation of an investigation management console display, according to an embodiment. At block 4002, a network security application causes display of a graphical user interface including a plurality of interface elements representing a plurality of investigation timelines. In an embodiment, each investigation timeline of the plurality of investigation timelines is associated with: (a) one or more first events corresponding to computer network security events stored by a data intake and query system; and (b) one or more second events corresponding to occurrences of user actions recorded by the data intake and query system. For example, referring to FIG. 33, a management console interface 3302 may display a plurality of interface elements representing various investigation timelines stored by the network security application as part of an investigation list 3308.

In an embodiment, each of the plurality of interface elements representing the plurality of investigation timelines may display various information related to the respective timeline. For example, each interface element may include information indicating one or more users assigned to the investigation timeline, a status of the investigation, a priority level assigned to the investigation timeline, a number of hours users have worked on the investigation timeline, a label for the investigation timeline, etc.

In one embodiment, the graphical user interface displays one or more aggregate metrics related to the plurality of investigation timelines. For example, as illustrated by the aggregate information panel 3304 of FIG. 33, the one or more aggregate metrics may include a total investigation count, an investigation completion leaderboard, and a kill chain status.

At block 4004, a selection of a particular interface element of the plurality of interface elements is received, where the particular interface element represents a particular investigation timeline. Referring again to FIG. 33, for example, a user may select one or more of the interface elements from the investigations list 3308 corresponding to particular investigations to view additional information related to the selected investigations.

At block 4006, in response to receiving the selection of the particular interface element, a network security application causes display of the particular investigation timeline. For example, again in reference to FIG. 33, in response to a user selecting a particular interface element corresponding to a particular investigation timeline from the investigation list, the selected investigation timeline may be displayed. As illustrated in the investigations list 3308, for example, unselected interface elements from the list may initially be displayed in a collapsed state without displaying an associated timeline and, upon selection, an associated timeline may be displayed in the management console interface. In another example, the selection of the particular interface element may cause display of the particular investigation timeline in another interface such as, for example, a timeline canvas interface 3502 as illustrated in FIG. 35.

In one embodiment, a user may select two or more graphical interface elements of the plurality of interface elements corresponding to a plurality of investigation timelines, where selecting the plurality of interface elements causes the plurality of investigation timelines to be displayed juxtaposed with one another. For example, the selected investigation timelines may be displayed in a stacked arrangement such that a user can compare the placement of events on each of the respective timelines. A juxtaposed display of a plurality of investigation timelines may be useful, for example, if an analyst is attempting to determine whether two or more separate investigations may be related. For example, a collection of network events corresponding to security access violations may initially appear unrelated to one or more analysts and may be added as part of separate investigations. However, after viewing the separate investigations and noticing a temporal similarity between the events on each of the timelines, the analyst(s) may determine that the investigations are related to a same threat.

5.0. Example Embodiments

Examples of some embodiments are represented, without limitation, in the following numbered clauses:

In an embodiment, a method or non-transitory computer readable medium comprises: identifying one or more first events stored by a data intake and query system, each first event of the one or more first events corresponding to a computer network security event; identifying one or more second events stored by the data intake and query system, each second event of the one or more second events corresponding to an occurrence of a user action recorded by the data intake and query system; generating a timeline view including a plurality of graphical event indications, the plurality of graphical event indications including (a) at least one first graphical event indication corresponding to an event from the first events, and (b) at least one second graphical event indication corresponding to an event from the second events; wherein each graphical indication of the plurality of graphical indications is configured for display at a location on the timeline view based on a timestamp associated with a respective event; and causing display of a graphical user interface including the timeline view.

In an embodiment, a method or non-transitory computer readable medium comprises: wherein each second event of the one or more second events corresponds to an entry in a workflow log, the workflow log including a plurality of log entries corresponding to user actions involving one or more graphical user interfaces.

In an embodiment, a method or non-transitory computer readable medium comprises: wherein each second event of the one or more second events corresponds to an entry in a workflow log, the workflow log including a plurality of log entries corresponding to user actions involving one or more graphical user interfaces; causing display of a workflow log view displaying information describing one or more log entries of the plurality of log entries.

In an embodiment, a method or non-transitory computer readable medium comprises: wherein at least one graphical event indication of the plurality of graphical event indications corresponds to a plurality of events from a set including the one or more first events and the one or more second events.

In an embodiment, a method or non-transitory computer readable medium comprises: receiving input to add a note to the timeline view; and in response to receiving the input to add the note to the timeline view, causing display of a graphical indication of the note at a particular location on the timeline view.

In an embodiment, a method or non-transitory computer readable medium comprises: receiving input to add a screenshot to the timeline view; and in response to receiving the input to add the screenshot to the timeline view, causing display of a graphical indication of the screenshot at a particular location on the timeline view.

In an embodiment, a method or non-transitory computer readable medium comprises: wherein access to the timeline view is granted a first user; receiving input from the first user to grant a second user access to the timeline view; and granting the second user access to the timeline view; in response to receiving input selecting a priority level, associating the priority level with the timeline view.

In an embodiment, a method or non-transitory computer readable medium comprises: wherein the graphical user interface includes a plurality of interface elements; receiving an indication of an occurrence of a particular user action involving one or more interface elements of the plurality of interface elements; and in response to receiving the indication of the occurrence of the particular user action, storing a log entry describing the particular user action in a workflow log.

In an embodiment, a method or non-transitory computer readable medium comprises: receiving input selecting a particular graphical event indication from the plurality of graphical event indications, the particular graphical event indication corresponding to a particular event from the set including the one or more first events and the one or more second events; and in response to receiving the selection of the particular graphical event indication, causing display of a detail view of the particular event.

In an embodiment, a method or non-transitory computer readable medium comprises: causing display of a detail view of a particular event, the detail view of the particular event including an indication of a particular timeline view with which the particular event is associated; receiving input selecting the indication of the timeline view; and in response to receiving the input selecting the indication of the timeline view, causing display of the particular timeline view, the particular timeline view displaying a graphical indication of at least the particular event.

In an embodiment, a method or non-transitory computer readable medium comprises: wherein causing display of the graphical user interface includes overlaying the timeline view on the graphical user interface.

In an embodiment, a method or non-transitory computer readable medium comprises: wherein the graphical user interface is a first graphical user interface; receiving input requesting display of a second graphical user interface that is different from the first graphical user interface; and causing display of the second graphical user interface including the same timeline view.

In an embodiment, a method or non-transitory computer readable medium comprises: creating a portable representation of the timeline view, the portable representation including instructions for displaying the timeline view.

In an embodiment, a method or non-transitory computer readable medium comprises: wherein the one or more first events are identified based on user input selecting the one or more first events, and wherein the one or more second events are identified based on user input selecting the one or more second events.

In an embodiment, a method or non-transitory computer readable medium comprises: wherein a first event of the one or more first events corresponds to a detected malware infection, a security access violation, or network traffic.

In an embodiment, a method or non-transitory computer readable medium comprises: causing display of a graphical user interface including a plurality of interface elements, each interface element of the plurality of interface elements related to one or more events stored by a data intake and query system, each event of the one or more events related to one or more performance characteristics of one or more computing devices; receiving an indication of an occurrence of a user action involving one or more interface elements of the plurality of interface elements; in response to receiving the indication of the occurrence of the user action, storing a particular log entry in a workflow log describing the user action; and causing display of a workflow log view with the graphical user interface, the workflow log view displaying information describing a plurality of log entries including the particular log entry.

In an embodiment, a method or non-transitory computer readable medium comprises: receiving input to add one or more particular log entries of the plurality of log entries displayed in the workflow log view to a timeline view; and causing display of the timeline view including one or more graphical event indications corresponding to the one or more particular log entries.

In an embodiment, a method or non-transitory computer readable medium comprises: wherein the particular log entry includes a timestamp indicating when the user action occurred.

In an embodiment, a method or non-transitory computer readable medium comprises: wherein the particular log entry indicates an action type of the user action, wherein the action type is one or more of a search, an interface view, an alert response, an alert status change, and a data set filter.

In an embodiment, a method or non-transitory computer readable medium comprises: wherein the user action is a search and wherein the log entry includes a search string associated with the search.

In an embodiment, a method or non-transitory computer readable medium comprises: wherein the user action is viewing a particular interface and wherein the log entry includes an indication of a particular interface viewed.

In an embodiment, a method or non-transitory computer readable medium comprises: wherein the displayed plurality of log entries are sorted based on a timestamp associated with each log entry of the plurality of log entries.

In an embodiment, a method or non-transitory computer readable medium comprises: wherein the displayed plurality of log entries are sorted based on an action type associated with each log entry of the plurality of log entries.

In an embodiment, a method or non-transitory computer readable medium comprises: wherein the displayed plurality of log entries are sorted based on a label associated with each log entry of the plurality of log entries.

In an embodiment, a method or non-transitory computer readable medium comprises: receiving input selecting one or more user action types to log.

In an embodiment, a method or non-transitory computer readable medium comprises: receiving input selecting one or more user action types to display in the workflow log view.

In an embodiment, a method or non-transitory computer readable medium comprises: receiving input selecting a particular graphical event indication of a plurality of graphical event indications displayed on a timeline view, the particular graphical event indication corresponding to a particular log entry of the plurality of log entries; and in response to receiving the selection of the particular graphical event indication, causing display of the particular log entry in the workflow log view.

In an embodiment, a method or non-transitory computer readable medium comprises: wherein a particular event of the one or more events corresponds to a detected malware infection, a security access violation, or network traffic.

In an embodiment, a method or non-transitory computer readable medium comprises: receiving input specifying a search string for one or more log entries in the workflow log stored by the data intake and query system; causing display of the workflow log view displaying a plurality of log entry results, each log entry result of the plurality of log entry results including information matching the search string.

In an embodiment, a method or non-transitory computer readable medium comprises: receiving input specifying an action type filter for one or more log entries in the workflow log stored by the data intake and query system; causing display of the workflow log view displaying a plurality of log entry results, each log entry result of the plurality of log entry results including information matching the action type filter.

In an embodiment, a method or non-transitory computer readable medium comprises: receiving input specifying one or more timeframes for one or more log entries in the workflow log stored by the data intake and query system;

causing display of the workflow log view displaying a plurality of log entry results, each log entry result of the plurality of log entry results associated with a timestamp matching at least one timeframe of the one or more timeframes.

In an embodiment, a method or non-transitory computer readable medium comprises: causing display of a graphical user interface including a plurality of interface elements representing a plurality of investigation timelines, each investigation timeline of the plurality of investigation timelines associated with (a) one or more first events corresponding to computer network security events stored by a data intake and query system, and (b) one or more second events corresponding to occurrences of user actions recorded by the data intake and query system; receiving a selection of a particular interface element of the plurality of interface elements, the particular interface element representing a particular investigation timeline; and in response to receiving the selection of the particular interface element, causing display of the particular investigation timeline.

In an embodiment, a method or non-transitory computer readable medium comprises: wherein each interface element of the plurality of interface elements displays an indication of one or more users assigned to a respective investigation timeline.

In an embodiment, a method or non-transitory computer readable medium comprises: wherein each interface element of the plurality of interface elements displays a status of a respective investigation timeline.

In an embodiment, a method or non-transitory computer readable medium comprises: wherein each interface element of the plurality of interface elements displays a priority level assigned to a respective investigation timeline.

In an embodiment, a method or non-transitory computer readable medium comprises: wherein the graphical user interface displays an indication of a total number of currently active investigation timelines.

In an embodiment, a method or non-transitory computer readable medium comprises: wherein the graphical user interface displays an indication of a number of investigations completed by each of one or more users.

In an embodiment, a method or non-transitory computer readable medium comprises: wherein the graphical user interface displays an indication of a kill chain status of a computer network based on a status associated with each of the plurality of investigation timelines.

In an embodiment, a method or non-transitory computer readable medium comprises: receiving a selection of a first interface element and a second interface element of the plurality of interface elements, the first interface element representing a first investigation timeline and the second interface element representing a second investigation timeline; and in response to receiving the selection of the first interface element and the second interface element, causing display of the first investigation timeline juxtaposed with the second investigation timeline.

In an embodiment, a method or non-transitory computer readable medium comprises: wherein a particular event of the one or more first events corresponds to a detected malware infection, a security access violation, or network traffic.

In an embodiment, a method or non-transitory computer readable medium comprises: wherein each second event of the one or more second events corresponds to an entry in a workflow log, the workflow log including a plurality of log entries corresponding to user actions involving one or more graphical user interfaces.

In an embodiment, a method or non-transitory computer readable medium comprises: wherein causing display of the particular investigation timeline includes displaying a plurality of graphical event indications, each graphical indication of the plurality of graphical event indications configured for display at a location on the particular investigation based on a timestamp associated with a respective event.

In an embodiment, a method or non-transitory computer readable medium comprises: wherein causing display of the particular investigation timeline includes displaying a plurality of graphical event indications, each graphical indication of the plurality of graphical event indications configured for display at a location on the particular investigation timeline based on a timestamp associated with a respective event; and wherein at least one graphical event indication of the plurality of graphical event indications corresponds to a plurality of events from a set including the one or more first events and the one or more second events.

In an embodiment, a method or non-transitory computer readable medium comprises: wherein causing display of the particular investigation timeline includes displaying a plurality of graphical event indications, each graphical indication of the plurality of graphical event indications configured for display at a location on the particular investigation timeline based on a timestamp associated with a respective event; receiving input selecting a particular graphical event indication of the plurality of graphical event indications, the particular graphical event indication corresponding to a particular event from the set including the one or more first events and the one or more second events; in response to receiving the selection of the particular graphical event indication, causing display of a detail view of the particular event, the detail view of the particular event including a timestamp associated with the particular event and a label associated with the particular event.

In an embodiment, a method or non-transitory computer readable medium comprises: wherein causing display of the particular investigation timeline includes displaying a plurality of graphical event indications, each graphical indication of the plurality of graphical event indications configured for display at a location on the particular investigation timeline based on a timestamp associated with a respective event; receiving input selecting a particular graphical event indication of the plurality of graphical event indications, the particular graphical event indication corresponding to a particular event from the set including the one or more first events and the one or more second events; in response to receiving the selection of the particular graphical event indication, causing display of a detail view of the particular event, the detail view of the particular event including display of at least a portion of raw data associated with the particular event.

In an embodiment, a method or non-transitory computer readable medium comprises: causing display of a detail view of a particular event from the set including the one or more first events and the one or more second events, the detail view of the particular event including an interface component for receiving a user annotation associated with the particular event.

In an embodiment, a method or non-transitory computer readable medium comprises: causing display of a detail view of a particular event from the set including the one or more first events and the one or more second events, the detail view of the particular event including an interface component for receiving a user annotation associated with the particular event.

In an embodiment, a method or non-transitory computer readable medium comprises: creating a portable representation of the particular investigation timeline, the portable representation including instructions for displaying the particular investigation timeline.

In an embodiment, a method or non-transitory computer readable medium comprises: receiving a selection of an assignment filter, the assignment filter indicating a request display of investigation timelines assigned to a particular user; wherein causing display of the graphical user interface including the plurality of interface elements representing a plurality of investigation timelines includes causing display of only interface elements representing investigation timelines assigned to the particular user.

In an embodiment, a method or non-transitory computer readable medium comprises: receiving a selection of an assignment filter, the assignment filter indicating a request display of investigation timelines assigned to a group of users; wherein causing display of the graphical user interface including the plurality of interface elements representing a plurality of investigation timelines includes causing display of only interface elements representing investigation timelines assigned to the group of users.

In an embodiment, a method or non-transitory computer readable medium comprises: wherein each interface element of the plurality of interface elements displays a total number of hours worked on the respective investigation timeline by users assigned to the respective investigation timeline.

In an embodiment, a method or non-transitory computer readable medium comprises: wherein each interface element of the plurality interface elements displays a number of hours worked on the respective investigation timeline by each user assigned to the respective investigation timeline.

In an embodiment, a method or non-transitory computer readable medium comprises: wherein the plurality of interface elements representing the plurality of investigation timelines are sorted based on a time each investigation timeline was last updated.

In an embodiment, a method or non-transitory computer readable medium comprises: wherein the plurality of interface elements representing the plurality of investigation timelines are sorted based on a time each investigation timeline was created.

In an embodiment, a method or non-transitory computer readable medium comprises: wherein the plurality of interface elements representing the plurality of investigation timelines are sorted based on a text label associated with each investigation timeline of the plurality of investigation timelines.

In an embodiment, a method or non-transitory computer readable medium comprises: wherein the plurality of interface elements representing the plurality of investigation timelines are sorted based on a set of users assigned to each investigation timeline of the plurality of investigation timelines.

In an embodiment, a method or non-transitory computer readable medium comprises: wherein the plurality of interface elements representing the plurality of investigation timelines are sorted based on a status associated with each investigation timeline of the plurality of investigation timelines.

In an embodiment, a method or non-transitory computer readable medium comprises: wherein the plurality of interface elements representing the plurality of investigation timelines are sorted based on a priority level associated with each investigation timeline of the plurality of investigation timelines In an embodiment, a method or non-transitory computer readable medium comprises: wherein the plurality of interface elements representing the plurality of investigation timelines are sorted based on one or more tags associated with each investigation timeline of the plurality of investigation timelines.

Other examples of these and other embodiments are found throughout this disclosure.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 41:
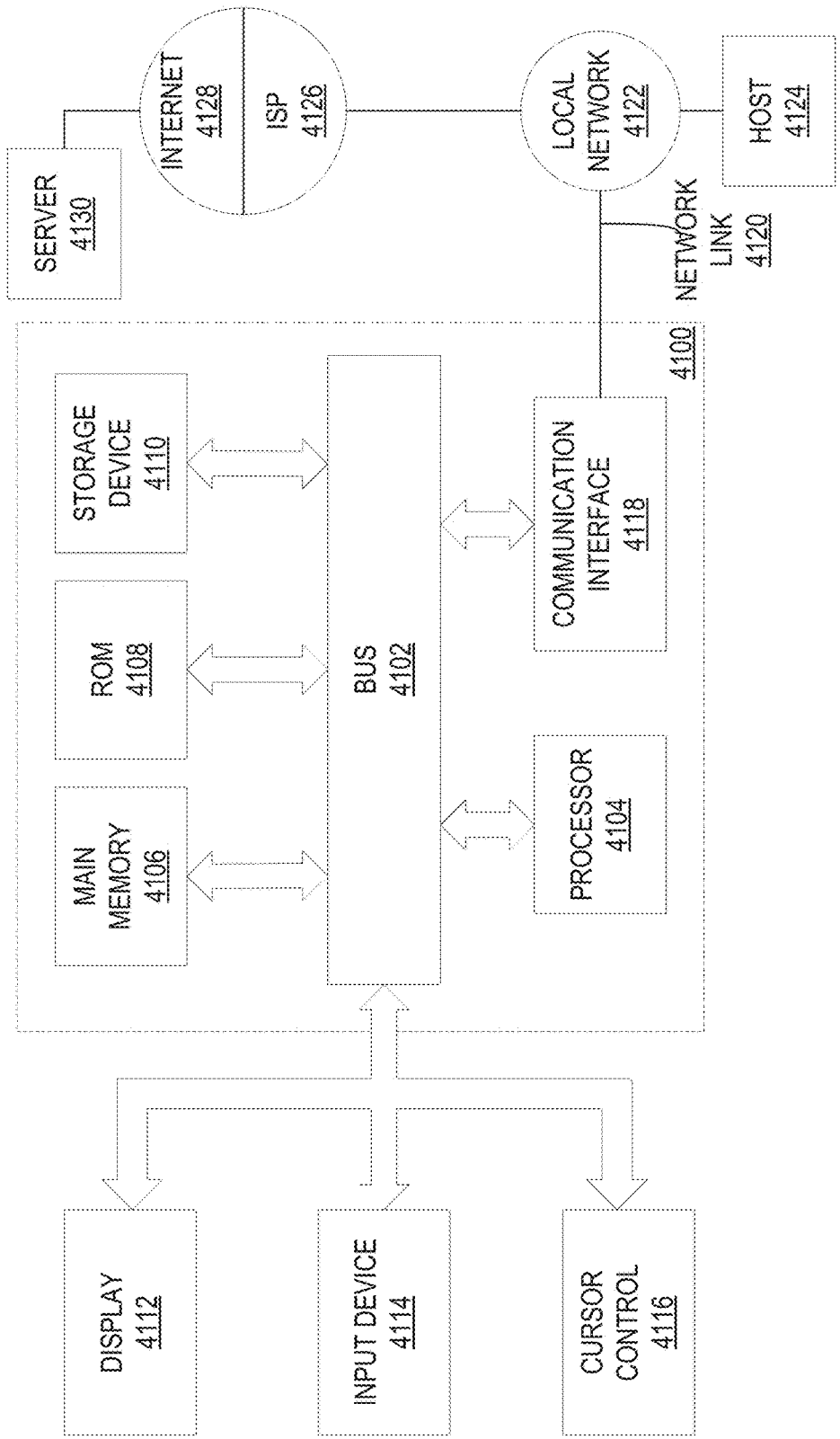
FIG. 41 illustrates a computer system upon which an embodiment may be implemented.

FIG. 41 is a block diagram that illustrates a computer system 4100 utilized in implementing the above-described techniques, according to an embodiment. Computer system 4100 may be, for example, a desktop computing device, laptop computing device, tablet, smartphone, server appliance, computing mainframe, multimedia device, handheld device, networking apparatus, or any other suitable device.

Computer system 4100 includes one or more busses 4102 or other communication mechanism for communicating information, and one or more hardware processors 4104 coupled with busses 4102 for processing information. Hardware processors 4104 may be, for example, general purpose microprocessors. Busses 4102 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 4100 also includes a main memory 4106, such as a random access memory (RAM) or other dynamic or volatile storage device, coupled to bus 4102 for storing information and instructions to be executed by processor 4104. Main memory 4106 also may be used for storing temporary variables or other intermediate information during execution of instructions to be executed by processor 4104. Such instructions, when stored in non-transitory storage media accessible to processor 4104, render computer system 4100 a special-purpose machine that is customized to perform the operations specified in the instructions.

Computer system 4100 further includes one or more read only memories (ROM) 4108 or other static storage devices coupled to bus 4102 for storing static information and instructions for processor 4104. One or more storage devices 4110, such as a solid-state drive (SSD), magnetic disk, optical disk, or other suitable non-volatile storage device, is provided and coupled to bus 4102 for storing information and instructions.

Computer system 4100 may be coupled via bus 4102 to one or more displays 4112 for presenting information to a computer user. For instance, computer system 4100 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 4112 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 4112.

One or more input devices 4114 are coupled to bus 4102 for communicating information and command selections to processor 4104. One example of an input device 4114 is a keyboard, including alphanumeric and other keys. Another type of user input device 4114 is cursor control 4116, such as a mouse, a trackball, or cursor direction keys for communicating direction information and command selections to processor 4104 and for controlling cursor movement on display 4112. This input device typically has two degrees of freedom in two axes, a first axis (e.g., x) and a second axis (e.g., y), that allows the device to specify positions in a plane. Yet other examples of suitable input devices 4114 include a touch-screen panel affixed to a display 4112, cameras, microphones, accelerometers, motion detectors, and/or other sensors. In an embodiment, a network-based input device 4114 may be utilized. In such an embodiment, user input and/or other information or commands may be relayed via routers and/or switches on a Local Area Network (LAN) or other suitable shared network, or via a peer-to-peer network, from the input device 4114 to a network link 4120 on the computer system 4100.

A computer system 4100 may implement techniques described herein using customized hard-wired logic, one or more ASICs or FPGAs, firmware and/or program logic which in combination with the computer system causes or programs computer system 4100 to be a special-purpose machine. According to one embodiment, the techniques herein are performed by computer system 4100 in response to processor 4104 executing one or more sequences of one or more instructions contained in main memory 4106. Such instructions may be read into main memory 4106 from another storage medium, such as storage device 4110. Execution of the sequences of instructions contained in main memory 4106 causes processor 4104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 4110. Volatile media includes dynamic memory, such as main memory 4106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 4102. Transmission media can also take the form of acoustic or light waves, such as those generated during radio-wave and infra-red data communications.

Various forms of media may be involved in carrying one or more sequences of one or more instructions to processor 4104 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 4100 can receive the data on the network and demodulate the signal to decode the transmitted instructions. Appropriate circuitry can then place the data on bus 4102. Bus 4102 carries the data to main memory 4106, from which processor 4104 retrieves and executes the instructions. The instructions received by main memory 4106 may optionally be stored on storage device 4110 either before or after execution by processor 4104.

A computer system 4100 may also include, in an embodiment, one or more communication interfaces 4118 coupled to bus 4102. A communication interface 4118 provides a data communication coupling, typically two-way, to a network link 4120 that is connected to a local network 4122. For example, a communication interface 4118 may be an integrated services digital network (ISDN) card, cable modem, satellite modem, or a modem to provide a data communication connection to a corresponding type of telephone line. As another example, the one or more communication interfaces 4118 may include a local area network (LAN) card to provide a data communication connection to a compatible LAN. As yet another example, the one or more communication interfaces 4118 may include a wireless network interface controller, such as a 802.11-based controller, Bluetooth controller, Long Term Evolution (LTE) modem, and/or other types of wireless interfaces. In any such implementation, communication interface 4118 sends and receives electrical, electromagnetic, or optical signals that carry digital data streams representing various types of information.

Network link 4120 typically provides data communication through one or more networks to other data devices. For example, network link 4120 may provide a connection through local network 4122 to a host computer 4124 or to data equipment operated by a Service Provider 4126. Service Provider 4126, which may for example be an Internet Service Provider (ISP), in turn provides data communication services through a wide area network, such as the world wide packet data communication network now commonly referred to as the "Internet" 4128. Local network 4122 and Internet 4128 both use electrical, electromagnetic or optical signals that carry digital data streams. The signals through the various networks and the signals on network link 4120 and through communication interface 4118, which carry the digital data to and from computer system 4100, are example forms of transmission media.

In an embodiment, computer system 4100 can send messages and receive data, including program code and/or other types of instructions, through the network(s), network link 4120, and communication interface 4118. In the Internet example, a server 4130 might transmit a requested code for an application program through Internet 4128, ISP 4126, local network 4122 and communication interface 4118. The received code may be executed by processor 4104 as it is received, and/or stored in storage device 4110, or other non-volatile storage for later execution. As another example, information received via a network link 4120 may be interpreted and/or processed by a software component of the computer system 4100, such as a web browser, application, or server, which in turn issues instructions based thereon to a processor 4104, possibly via an operating system and/or other intermediate layers of software components.

In an embodiment, some or all of the systems described herein may be or comprise server computer systems, including one or more computer systems 4100 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   causing display of one or more identifiers, each identifier identifying an investigation timeline associated with first data representing one or more computer network security events stored by a data intake and query system, and second data representing one or more actions taken by a user to investigate a network security incident, each identifier includes an indication of one or more users assigned to a corresponding investigation timeline;
   receiving a selection of a particular identifier from the displayed identifiers; and
   causing display of the investigation timeline identified by the selected identifier.

2. The method of claim 1, wherein each identifier displays a status of a corresponding investigation timeline.

3. The method of claim 1, wherein each identifier displays a priority level assigned to a corresponding investigation timeline.

4. The method of claim 1, further comprising displaying an indication of a total number of currently active investigation timelines.

5. The method of claim 1, further comprising displaying an indication of a number of investigations completed by each of one or more users.

6. The method of claim 1, further comprising displaying an indication of a kill chain status of a computer network, the kill chain status based on a status associated with a plurality of investigation timelines.

7. The method of claim 1, further comprising:
   receiving a selection of a first identifier and a second identifier from the one or more identifiers, the first identifier representing a first investigation timeline and the second identifier representing a second investigation timeline; and
   in response to receiving the selection of the first identifier and the second identifier, causing display of the first investigation timeline juxtaposed with the second investigation timeline.

8. The method of claim 1, wherein a particular computer network security event of the one or more computer network security events corresponds to a detected malware infection, a security access violation, or network traffic.

9. The method of claim 1, wherein the user actions taken by a user to investigate a network security incident include one or user interactions with a graphical user interface.

10. The method of claim 1, wherein the user actions taken by a user to investigate a network security incident include submitting a search query.

11. The method of claim 1, wherein causing display of the investigation timeline includes displaying a plurality of event identifiers, each event identifier of the plurality of event identifiers configured for display at a location on the investigation timeline based on a timestamp associated with a corresponding event.

12. The method of claim 1, wherein causing display of the investigation timeline includes displaying a plurality of event identifiers, each event identifier of the plurality of event identifiers configured for display at a location on the investigation timeline based on a timestamp associated with a corresponding event; and
wherein at least one event identifier of the plurality of event identifiers corresponds to a plurality of events from a set including the one or more first events and the one or more second events.

13. The method of claim 1, further comprising:
wherein causing display of the investigation timeline includes displaying a plurality of event identifiers, each event identifier of the plurality of event identifiers configured for display at a location on the investigation timeline based on a timestamp associated with a corresponding event;
receiving input selecting a particular event identifier of the plurality of event identifiers, the particular event identifier corresponding to a particular event from a set of events derived from the first data and the second data;
in response to receiving the selection of the particular event identifier, causing display of a detail view of the particular event, the detail view of the particular event including a timestamp associated with the particular event and a label associated with the particular event.

14. The method of claim 1, further comprising:
wherein causing display of the investigation timeline includes displaying a plurality of event identifiers, each event identifier of the plurality of event identifiers configured for display at a location on the investigation timeline based on a timestamp associated with a respective event;
receiving input selecting a particular event identifier of the plurality of event identifiers, the particular event identifier corresponding to a particular event from a set of events derived from the first data and the second data;
in response to receiving the selection of the particular event identifier, causing display of a detail view of the particular event, the detail view of the particular event including display of at least a portion of raw data associated with the particular event.

15. The method of claim 1, further comprising causing display of a detail view of a particular event from a set of events derived from the first data and the second data, the detail view of the particular event including an interface component for receiving a user annotation associated with the particular event.

16. The method of claim 1, further comprising causing display of a detail view of a particular event from a set of events derived from the first data and the second data, the detail view of the particular event including a storyboard panel that displays the particular event as part of a series of events.

17. The method of claim 1, further comprising creating a portable representation of the displayed investigation timeline, the portable representation including instructions for displaying the displayed investigation timeline using other application programs.

18. The method of claim 1, further comprising:
receiving a selection of an assignment filter, the assignment filter indicating a request to display investigation timelines assigned to a particular user;
wherein causing display of the one or more identifiers includes causing display of only identifiers representing investigation timelines assigned to the particular user.

19. The method of claim 1, further comprising:
receiving a selection of an assignment filter, the assignment filter indicating a request to display investigation timelines assigned to a group of users;
wherein causing display of the one or more identifiers includes causing display of only identifiers representing investigation timelines assigned to the group of users.

20. The method of claim 1, wherein each identifier of the one or more identifiers includes a total number of hours worked on the corresponding investigation timeline by all users assigned to the respective investigation timeline.

21. The method of claim 1, wherein each identifier of the one or more identifiers includes a number of hours worked on the corresponding investigation timeline for each user assigned to the respective investigation timeline.

22. The method of claim 1, wherein the one or more identifiers are sorted based on a time each corresponding investigation timeline was last updated.

23. The method of claim 1, wherein the one or more identifiers are sorted based on a time each corresponding investigation timeline was created.

24. The method of claim 1, wherein the one or more identifiers are sorted based on a text label associated with each corresponding investigation timeline.

25. The method of claim 1, wherein the one or more identifiers are sorted based on a set of users assigned to each corresponding investigation timeline.

26. The method of claim 1, wherein the one or more identifiers are sorted based on a status associated with each corresponding investigation timeline.

27. The method of claim 1, wherein the one or more identifiers are sorted based on a priority level associated with each corresponding investigation timeline.

28. One or more non-transitory computer-readable storage media, storing instructions, which when executed by one or more processors cause performance of:
causing display of one or more identifiers, each identifier identifying an investigation timeline associated with first data representing one or more computer network security events stored by a data intake and query system, and second data representing one or more actions taken by a user to investigate a network security incident, each identifier includes an indication of one or more users assigned to a corresponding investigation timeline;
receiving a selection of a particular identifier from the displayed identifiers; and
causing display of the investigation timeline identified by the selected identifier.

29. An apparatus, comprising:
a display subsystem, implemented at least partially in hardware, that causes display of one or more identifiers, each identifier identifying an investigation timeline associated with first data representing one or more computer network security events stored by a data intake and query system, and second data representing one or more actions taken by a user to investigate a network security incident, each identifier includes an indication of one or more users assigned to a corresponding investigation timeline;

an input receiver subsystem, implemented at least partially in hardware, that receives a selection of a particular identifier from the displayed identifiers; and wherein the display subsystem further causes, in response to receiving the selection of the particular identifier, display of the investigation timeline identified by the selected identifier.

* * * * *